US011373244B2

(12) United States Patent
Nadler

(10) Patent No.: US 11,373,244 B2
(45) Date of Patent: Jun. 28, 2022

(54) SEARCHING PRE-GENERATED DATA STRUCTURES FOR EVENT IMPACT DISCOVERY

(71) Applicant: Kensho Technologies, LLC, Cambridge, MA (US)

(72) Inventor: Daniel Nadler, Cambridge, MA (US)

(73) Assignee: Kensho Technologies, LLC, Cambridge, MA (US)

( * ) Notice: Subject to any disclaimer, the term of this patent is extended or adjusted under 35 U.S.C. 154(b) by 0 days.

(21) Appl. No.: 16/945,264

(22) Filed: Jul. 31, 2020

(65) Prior Publication Data

US 2020/0364796 A1 Nov. 19, 2020

Related U.S. Application Data

(63) Continuation of application No. 15/814,672, filed on Nov. 16, 2017, now abandoned, which is a continuation of application No. 14/279,310, filed on May 15, 2014, now abandoned.

(60) Provisional application No. 61/899,649, filed on Nov. 4, 2013, provisional application No. 61/823,793, filed on May 15, 2013.

(51) Int. Cl.

| | |
|---|---|
| ***G06Q 40/00*** | (2012.01) |
| ***G06Q 40/06*** | (2012.01) |
| ***G06Q 10/06*** | (2012.01) |

(52) U.S. Cl.
CPC ........... *G06Q 40/06* (2013.01); *G06Q 10/067* (2013.01)

(58) Field of Classification Search
CPC ....................................................... G06Q 40/00
USPC ....................................................... 705/36 R
See application file for complete search history.

(56) References Cited

U.S. PATENT DOCUMENTS 5,761,386 A 6/1998 Lawrence
7,246,090 B1 7/2007 Thomas
8,069,101 B1 * 11/2011 von Groll .............. G06Q 30/02 705/36 R (Continued)

OTHER PUBLICATIONS

Communication Pursuant to Article 94(3) EPC, in application serial No. 14734592.2, dated Feb. 6, 2018, 8 pages.

(Continued)

*Primary Examiner* — Ojo O Oyebisi
(74) *Attorney, Agent, or Firm* — Fish & Richardson P.C.

(57) ABSTRACT

Techniques for prediction of financial instrument returns, identifying statistical history, the discovery of pricing anomalies, and financial instrument visualization are disclosed. In one particular exemplary embodiment, the techniques may be realized as a method for identifying financial instrument returns and pricing anomalies including matching, using at least one computer processor one or more portions of current market data associated with a financial instrument with historical market data, averaging outcomes of matched historical market data, and providing a probabilistic outcome for financial instrument returns, pricing anomalies, or other metrics based on the matched historical market data and the current market data. Techniques for financial instrument analysis may also include processing event data, correlating the event data using a large volume of historical market data to identify a predicted impact on returns of a financial instrument and/or pricing anomalies, and presenting the predicted impact to a user (e.g., in near real time).

12 Claims, 60 Drawing Sheets

(56) References Cited

U.S. PATENT DOCUMENTS

| | | | |
|---|---|---|---|
| 9,411,857 | B1 | 8/2016 | Chechik et al. |
| 2005/0004862 | A1 | 1/2005 | Kirkland et al. |
| 2006/0248009 | A1 | 11/2006 | Hicks et al. |
| 2010/0121726 | A1 | 5/2010 | Coulter et al. |
| 2011/0225289 | A1 | 9/2011 | Prasad et al. |
| 2013/0328909 | A1 | 12/2013 | Pacheco et al. |
| 2015/0127632 | A1 | 5/2015 | Khaitan et al. |

OTHER PUBLICATIONS

PCT International Preliminary Report on Patentability in International Appln. No. PCT/US2014/038292, dated Nov. 17, 2015, 7 pages.
PCT International Search Report and Written Opinion in International Appln. No. PCT/US2014/034847, dated Jul. 28, 2017, 15 pages .
PCT international Search Report and Written Opinion in International Appln. No. PCT/US2014/038292, dated Mar. 16, 2015, 8 pages.

* cited by examiner

Matching

Exemplary *Matching* *(One Embodiment, Not Intended to Limit Possible Dimensions of Matching)*

Real-Time Current Market Conditions:

| Dimension | Current, Live Market Data Metrics |
|---|---|
| Ticker | AAPL |
| Minutes Left in Trading Day | 30 |
| % Change Since Open | 1.25% |
| Volume Since Open | 300,000 |
| Volatility | 8% |
| Overall Market % Change Since Open | -0.25% |
| End of Day Outcome | ???/TBD |

Key:

1. Perfect Match Along One Dimension = Higher Weight to End of Day Outcome of Historical Data Record 2. Proximity Match Along One Dimension = Some Weight to End of Day Outcome of Historical Data Record 3. No Match Along One Dimension = No Weight to End of Day Outcome of Historical Data Record 4. The > the # of Perfect of Proximity Matches Along Multiple Dimension of a Historical Data Record, the > the Weight Applied to End of Day Outcome of Historical Data Record

| **Prefect Match** *(To Real-Time Current Market Conditions)* | **Proximity Match** *(To Real-Time Current Market Conditions)* | | |
|---|---|---|---|
| | | Record 1: April 9, 2006 | |
| | | Historical Data Metrics | |
| | | AAPL | Ticker |
| ✓ | | 30 | Minutes Left in Trading Day |
| | ✓ | 1.23% | % Change Since Open |
| | ✓ | 323,000 | Volume Since Open |
| | | 14% | Volatility |
| | | 1.24% | Overall Market % Change Since Open |
| | | | |
| | | 1.30% | End of Day Outcome of Historical Data Record |
| | | | |
| | | Record 2: September 15, 2003 | |
| | | Historical Data Metrics | |
| | | AAPL | Ticker |
| | | 180 | Minutes Left in Trading Day |
| | | -1.54% | % Change Since Open |
| | | 50,000 | Volume Since Open |
| | ✓ | 7% | Volatility |
| ✓ | | -0.25% | Overall Market % Change Since Open |
| | | | |
| | | -2.50% | End of Day Outcome of Historical Data Record |
| | | | |
| | | | |
| | | Record 3: September 5,1998 | |
| | | Historical Data Metrics | |
| | | AAPL | Ticker |
| | ✓ | 27 | Minutes Left in Trading Day |
| | ✓ | 1.33% | % Change Since Open |
| ✓ | | 300,000 | Volume Since Open |
| ✓ | | 8% | Volatility |
| | | 0.00% | Overall Market % Change Since Open |
| | | | |
| | | 1.40% | End of Day Outcome of Historical Data Record |

Record 'N':...." "

FIG. 10

Real Data, Website-Live, Actual Implementation of Real-Time Odds of Apple Closing Positive Changing on April 12 2012, then hosted at www.robitrage.com Real Data, Website-Live, Actual Implementation of Real-Time Odds of Apple Closing Positive Changing on April 12 2012, then hosted at www.robitrage.com Real Data, Website-Live, Actual Implementation of Real-Time Odds of Apple Closing Positive Changing on April 12 2012, then hosted at www.robitrage.com Real Data, Website-Live, Actual Implementation of Real-Time Odds of Apple Closing Positive Changing on April 12 2012, then hosted at www.robitrage.com Seasonal Odds beta | Search a Ticket | Apple Inc. | About

Real-Time Odds

Right Now

17 in 1000

Odds of closing positive today

Price (Quote)
Apple Inc. (AAPL)
429.49
-4.94 (-1.11%)
As of 11:58 AM

Welcome to April

Today is April 12. Since 1984, AAPL has been positive 52% of the time in April, returning an average of 3.51%.

Seasonality Score this Month
(Proprietary risk-adjusted odds)

Historical Odds This Month

51/100 Positive (52%)

Back-tested historical odds of closing positive this month.

Average Monthly % Change Since 1984

| Month | Average Return | % Positive |
|---|---|---|
| January | 4.52 | 51.72 |
| February | -0.30 | 48.28 |
| March | 3.81 | 55.17 |
| April | 3.51 | 51.72 |
| May | 1.73 | 46.43 |
| June | -5.82 | 42.86 |

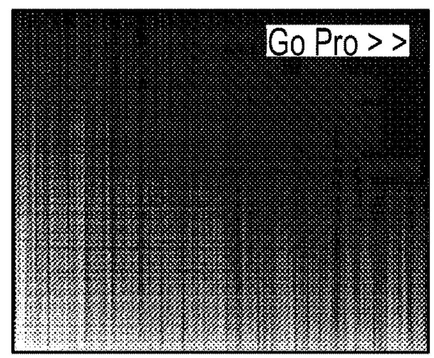

Join the Conversation...

FIG. 11D

Real Data, Website-Live, Actual Implementation of Real-Time Odds of Apple Closing Positive Changing on April 12 2012, then hosted at www.robitrage.com Real Data, Website-Live, Actual Implementation of Real-Time Odds of Apple Closing Positive Changing on April 12 2012, then hosted at www.robitrage.com Seasonal Odds beta | Search a Ticket | Apple Inc. | About

Real-Time Odds

Right Now

59 in 1000

Odds of closing positive today

** *** * * ****  * **** **

****   * * **   * ****
** * *** ** * ** *  * *****
  *  * *** *   * ** 
** * * *  **   * *** 
***  * ***  * * * *** * ****

Price (Quote)

Apple Inc. (AAPL)

430.47

-3.86 (-0.88%)

As of 1:08 PM

Welcome to April

Today is April 12. Since 1984, AAPL has been positive 52% of the time in April, returning an average of 3.51%.

Seasonality Score this Month

(Proprietary risk-adjusted odds)

* |  | * | ** | ***

***** * ** * *   * 
* *  **** *  *  ***
*** * ** *  **  *  *
***  ** *****

Historical Odds This Month

51/100 Positive (52%)

Back-tested historical odds of closing positive this month.

Average Monthly % Change Since 1984

| Month | Average Return | % Positive |
|---|---|---|
| January | 4.52 | 51.72 |
| February | -0.30 | 48.28 |
| March | 3.81 | 55.17 |
| April | 3.51 | 51.72 |
| May | 1.73 | 46.43 |
| June | -5.82 | 42.86 |

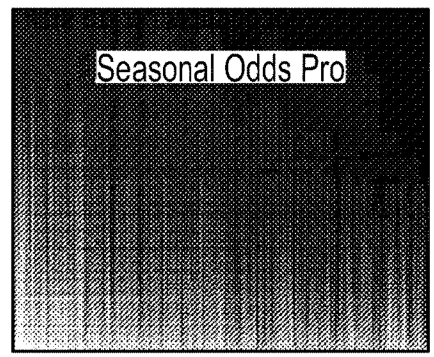

Join the Conversation...

FIG. 11F

Real Data, Website-Live, Actual Implementation of Real-Time Odds of Apple Closing Positive Changing on April 12 2012, then hosted at www.robitrage.com Seasonal Odds beta | Search a Ticket | Apple Inc. | About

Real-Time Odds

Right Now

1 in 40

Odds of closing positive today

** *** * * ****  * **** **

****   * * **   * ****
** * *** ** * ** *  * *****
  *  * *** *   * ** 
** * * *  **   * *** 
***  * ***  * * * *** * ****

Price (Quote)

Apple Inc. (AAPL)

430.47

-3.86 (-0.88%)

As of 1:08 PM

Welcome to April

Today is April 12. Since 1984, AAPL has been positive 52% of the time in April, returning an average of 3.51%.

Seasonality Score this Month

(Proprietary risk-adjusted odds)

| * |  | * | ** | *** |

***** * ** * *   * 
* *  **** *  *  ***
*** * ** *  **  *  *
***  ** *****

Historical Odds This Month

51/100 Positive (52%)

Back-tested historical odds of closing positive this month.

Average Monthly % Change Since 1984

| Month | Average Return | % Positive |
|---|---|---|
| January | 4.52 | 51.72 |
| February | -0.30 | 48.28 |
| March | 3.81 | 55.17 |
| April | 3.51 | 51.72 |
| May | 1.73 | 46.43 |
| June | -5.82 | 42.86 |

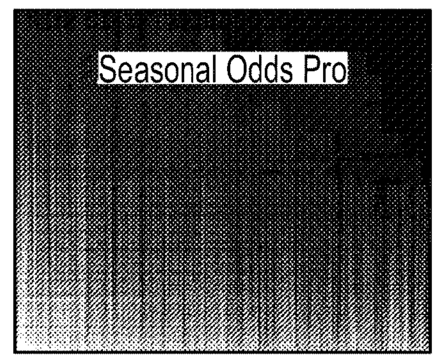

Join the Conversation...

FIG. 11G

Real Data, Website-Live, Actual Implementation of Real-Time Odds of Apple Closing Positive Changing on April 12 2012, then hosted at www.robitrage.com Real Data, Website-Live, Actual Implementation of Real-Time Odds of Apple Closing Positive Changing on April 12 2012, then hosted at www.robitrage.com Seasonal Odds beta | Search a Ticket | Apple Inc. | About

Seasonal Odds Pro
Gets the Weekly Odds
Ahead of Time

Real-Time Odds

Right Now

1 in 500

Odds of closing positive today

** *** * * ****  * **** **

****   * * **   * ****
** * *** ** * ** *  * *****
  *  * *** *   * ** 
** * * *  **   * *** 
***  * ***  * * * *** * ****

Price (Quote)

Apple Inc. (AAPL)

429.534

-4.796 (-1.1%)

As of 3:13 PM

Welcome to April

Today is April 12. Since 1984, AAPL has been positive 52% of the time in April, returning an average of 3.51%.

Seasonality Score this Month

(Proprietary risk-adjusted odds)

| * |  | * | ** | *** |

***** * ** * *   * 
* *  **** *  *  ***
*** * ** *  **  *  *
***  ** *****

Historical Odds This Month

51/100 Positive (52%)

Back-tested historical odds of closing positive this month.

Average Monthly % Change Since 1984

| **Month** | **Average Return** | **% Positive** |
|---|---|---|
| January | 4.52 | 51.72 |
| February | -0.30 | 48.28 |
| March | 3.81 | 55.17 |
| April | 3.51 | 51.72 |
| May | 1.73 | 46.43 |
| June | -5.82 | 42.86 |

Join the Conversation...

FIG. 11I

Real Data, Website-Live, Actual Implementation of Real-Time Odds of Apple Closing Positive Changing on April 12 2012, then hosted at www.robitrage.com Ability to select or deselect one or more financial instruments by name or by types/categories/classes/attributes of the financial instruments to layer onto or off the visualization : Financial Instrument Data Points Populate/De-Populate in response to selection.

Ability to select or deselect one or more financial instruments by name or by types/categories/classes/attributes of the financial instruments to layer onto or off the visualization : Financial Instrument Data Points Populate/De-Populate in response to selection.

Selecting or deselecting one or more financial instruments by types/categories/classes/attributes of the financial instruments to layer onto or off the visualization results in distribution of instruments with those attributes along Return/Alpha versus Risk/Beta space, with the use of coloration to distinguish classes. Financial Instruments Data Points Populate/De-Populate in response to selection. Hovering over plot identifies it.

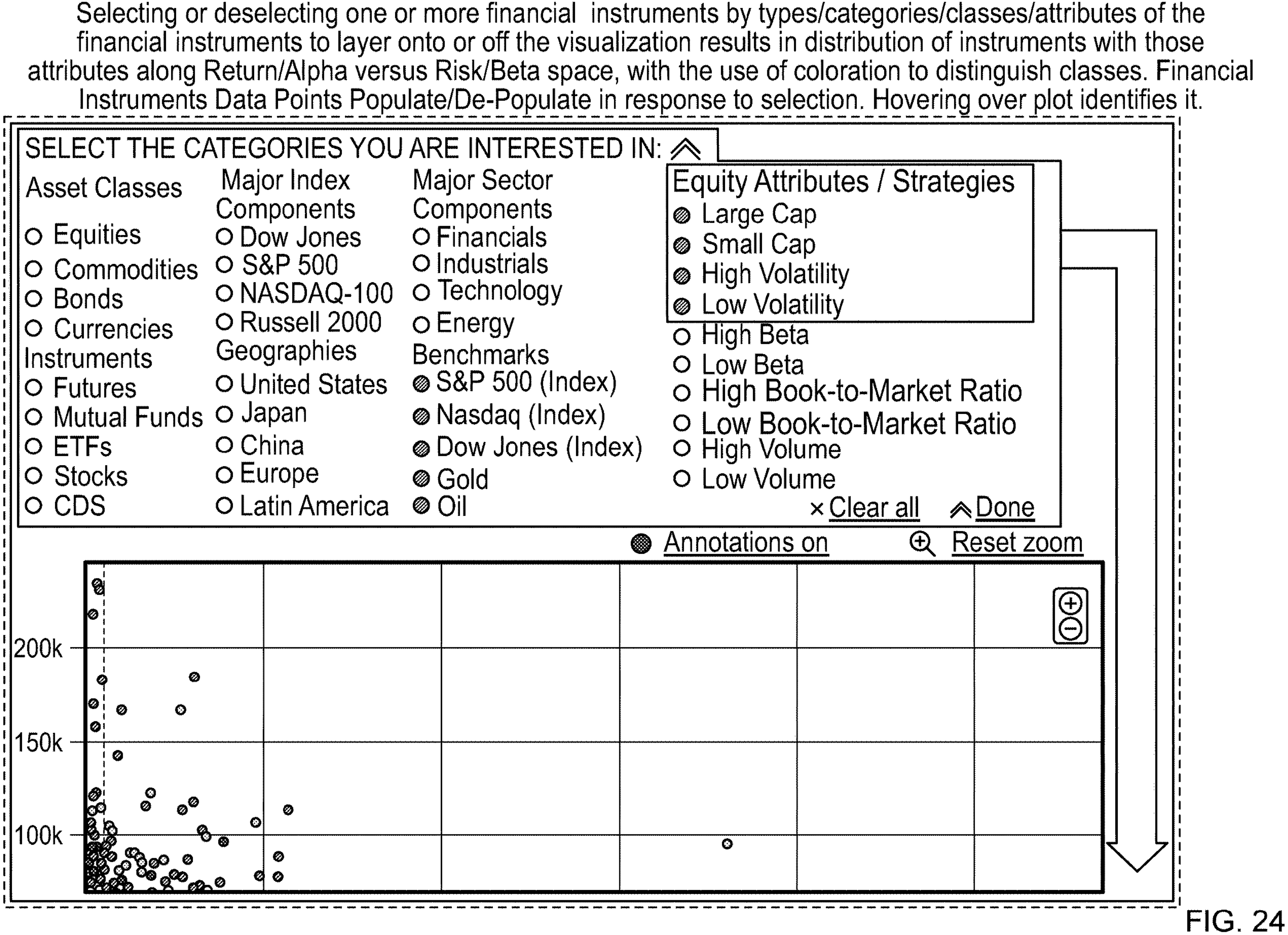

FIG. 24

Exhibit 8: Prior Misses > 1.0%

Most recent GDP (Real, Q/Q) Misses > 1.0% prior to this study

| | |
|---|---|
| **Jan 30 2013** | GDP (Real, Q/Q) misses by 1.1% |
| **Apr 29 2009** | GDP (Real, Q/Q) misses by 1.1% |
| **Jan 27 2006** | GDP (Real, Q/Q) misses by 1.7% |
| **Jan 30 2004** | GDP (Real, Q/Q) misses by 1.0% |
| **Jul 31 2002** | GDP (Real, Q/Q) misses by 1.0% |

FIG. 44

Exhibit 4: Statistical Outliers

Significant persistent pricing anomalies across the S&P 1500 on days of GDP (Real, Q/Q) Misses > 1.0% (Jan 2006 - Jan 2013)

| | % of Trades Positive | Average Return | Avg. Excess Return |
|---|---|---|---|
| Hsn (HSNI) | 50.00 % | +1.99 % | +1.14 % |
| Fortune Brands Home & Security (FBHS) | 0.00 % | -1.13 % | -1.98 % |
| Medidata Solutions (MDSO) | 100.00 % | +1.81 % | +0.96 % |
| Teradata Corp. (TDC) | 100.00 % | +3.12 % | +2.27 % |
| Stanley Black & Decker Inc (SWK) | 100.00 % | +2.09 % | +1.24 % |
| Domino's Pizza Inc (DPZ) | 66.67 % | +2.38 % | +1.53 % |
| United Therapeutics Corp. (UTHR) | 100.00 % | +2.51 % | +1.66 % |
| S&P 500 (^GSPC) | 66.67 % | +0.85 % | 0.00 % |

FIG. 48

SEARCHING PRE-GENERATED DATA STRUCTURES FOR EVENT IMPACT DISCOVERY

CROSS-REFERENCE TO RELATED APPLICATIONS

This patent application is a continuation (and claims the benefit of priority under 35 USC 120) of U.S. patent application Ser. No. 15/814,672, filed Nov. 16, 2017, which is a continuation (and claims the benefit of priority under 35 USC 120) of U.S. patent application Ser. No. 14/279,310, filed May 15, 2014, which claims the benefit under 35 U.S.C. 119 of U.S. Provisional Patent Application No. 61/899,649, filed Nov. 4, 2013, and U.S. Provisional Patent Application No. 61/823,793, filed May 15, 2013, which are hereby incorporated by reference in its entirety.

TECHNICAL FIELD

This specification is directed towards subject matter that relates to the detection of real-time events and their impact. The techniques described herein can more quickly (e.g., in a decreased amount of time) determine the impact of a detected real-time event using a database of pre-computed precedents, relative to an amount of time in determining an impact of a detected real-time event independent of pre-computation of the precedents.

BACKGROUND

The ability to monitor, track and predict financial instrument characteristics, including returns, is useful to make informed decisions about such financial instruments, especially in the service of managing risk, constructing diversified and balanced portfolios, and identifying excess returns. Identifying, analyzing, and conveying financial information in a meaningful and timely manner is a challenge due to the volume of the data to be analyzed and comprehended. Comparing financial data with non-financial statistics (e.g., events such as for example, weather) is a significant data management problem and challenging computational problem.

SUMMARY OF THE DISCLOSURE

Techniques for financial instrument visualization and modeling are disclosed. Modeling financial data to understand a distribution of financial instrument performance has traditionally presented a challenge (e.g., understanding returns, a probability of returns, and pricing anomalies which arise for a plurality of reasons but are frequently undiscovered statistically). Due to human and interface limitations displaying a significant amount of financial data in a timely and meaningful manner has not been performed. Additionally, discovering, in a large volume of data, meaningful statistical anomalies which may impact returns and presents them in a comprehensible and timely manner is a significant challenge. Technical considerations are also significant and include overcoming challenges in processing large volumes of data in a short period of time to handle standardization, scrubbing, error correction, processing, analysis, and modeling. In an exemplary embodiment of the present disclosure, presenting a large amount of financial data in a timely manner allowing visualization of a distribution of instrument performance is provided. Event data may be received from one or more feeds and may be processed and analyzed to provide projected outcomes based on historical data. In some embodiments, event data may be constructed (e.g., automatically by a system, by veteran quants, etc.). Constructed event data may include event ranking data (e.g., a prioritization of historical event data due to a similarity of historical event data to a current event, a prioritization of historical event data due to an impact on returns or pricing caused by the historical event, a prioritization of a historical event due to a similarity in market conditions at a time of the historical event and a time of the current event, and other factors). Constructed event data may also include building associations between historical event data based on correlations. Constructed event data may also include building associations between events and one or more of: asset prices, asset performance, asset returns, and pricing anomalies associated with assets.

Large volumes of historical market data may be analyzed (e.g., time series data) to correlate with event data (e.g., in real time or in near real time). As actual event data is received or constructed (e.g., for modeling), to correlate the event data with historical event data, a set of historical event data may be defined. The set of historical events may be derived by a level of correlation of such historical events with the actual event. Based on a defined set of historical events, associated asset price returns and anomalies may be identified. These asset price returns and/or anomalies may be used to predict an asset price return or pricing anomaly associated with the actual event. Notifications may be pushed or provided to present studies or likely impacts of monitored events (e.g., financial asset performance). Events may include for example, economic data surprises, weather anomalies, central bank statements and actions, product releases, earnings surprises, mergers and acquisitions and IPOs, corporate governance changes, regulatory approvals and denials, and seasonality. Probabilistic impacts may be provided as notifications (e.g., alerts, emails, a ticker or other dynamic user interface display, and a blog post). A user may drill down on notifications to receive further detail and access to detailed statistics (e.g., studies or trade analysis on assets affected by an event in a notification). Techniques may also include an interactive user interface presenting a chart, graph, or other visualization of a large volume of financial data ordered to illustrate a distribution indicative of financial instrument performance. Such an interactive user interface may provide an ability to zoom or focus on an area of a distribution performance (e.g., via a touchpad, mouse wheel, arrow key, function key, etc.). A user of an interactive interface may be able to view information associated with a particular instrument (e.g., a stock) by hovering over, mousing over, clicking on, or otherwise indicating a portion of the user interface at a point in the distribution where the instrument is plotted. As a user zooms in on a segment of a distribution plotted in an interactive interface, data for individual distribution components may become visible (e.g., labels, equity symbols, return rates, or other information may be plotted on a bar representing a particular financial instrument).

In accordance with further aspects of this exemplary embodiment, a user may also click on an indicator for a particular financial instrument (e.g., a bar in a bar chart) and may be presented with options and/or additional data associated with that financial instrument. For example, a user may be presented with options to trade the financial instrument, add the financial instrument to a portfolio, and remove the financial instrument from a portfolio. Additional data regarding a financial instrument and its performance may also be displayed.

In accordance with further aspects of this exemplary embodiment, an interactive user interface displaying a range of distributions for financial instrument performance may also display one or more benchmarks relative to the distribution (e.g., S&P 500). A benchmark may be plotted in a distribution and may contain a distinctive indicator (e.g., a color, a shading, a pattern, a symbol, etc.) so that it may be easily observed in a distribution of a large number of financial instruments. Clicking on a benchmark may provide further information and/or may allow a user to drill down into a benchmark. For example, clicking on a benchmark may allow a user to view sectors and/or individual components or financial instruments of a benchmark.

In accordance with further aspects of this exemplary embodiment, a distribution may use color indicators, shading, patterns, symbols, or other indicators to indicate relative performance in a distribution (e.g., positive returns may be green, negative returns may be red, returns outperforming a benchmark may be a first pattern, returns underperforming a benchmark may be a second pattern, etc.).

Other types of visualizations may be utilized. In accordance with another exemplary embodiment a line graph may be utilized to visualize a distribution of results. The line graph may include vertical or angled lines (either up or down) which may indicate that a given asset is being held during this time period, because a condition in a study defined by a user was active during that time period. Perfectly horizontal lines may indicate that the given asset is not being held by the simulated study or strategy during this time period, because the necessary conditions defined by the user in the study were not all active during that time period. Therefore in the horizontal sections of the line, price changes during that period are not contributing to the total cumulative return or loss of the strategy, and are not counted. An individual component or line of a graph may be highlighted and corresponding metadata for that component may be displayed.

A line graph visualization may provide an ability for a user to zoom in or otherwise navigate view individual component or sector performance. Line graphs may also contain one or more benchmarks (e.g., S&P 500) that may be provided in a different color, a different line pattern, or with another distinctive indicator.

In accordance with other aspects of the disclosure, techniques for producing a study of financial instruments are disclosed. Techniques may include the provision of templates facilitating the querying of large amounts of financial data to produce a visualization of a distribution of financial instrument performance. According to some embodiments, a plurality of templates may be provided accepting user parameters to create studies and visualizations of financial data in near real time and/or real time.

Techniques for financial instrument return analysis may include analyzing one or more events (e.g., geopolitical events, earnings events, weather or natural world events, news events, product events, including surprises relative to expectations for one or more types of events) to correlate one or more events with a large volume of historical market data (e.g., time series financial data) to identify a potential impact on at least one of: a financial instrument, a predicted return of a financial instrument, and performance of a financial instrument.

In accordance with further aspects of this embodiment, the potential impact may be provided as a notification to a user (e.g., an alert, an email, a text message, a blog post, a web based ticker, a web based animated banner, a transmitted recorded audio message, or other electronic notification).

In accordance with further aspects of this embodiment, a user-friendly interactive analysis environment may be provided. An analysis environment may include a natural language based query interface for generating studies.

In accordance with further aspects of this embodiment, an analysis environment may allow the generation of queries using associations between near real time event data and historical impacts on financial data. Queries may be back tested against decades of multi-asset market data.

In accordance with further aspects of this embodiment, an analysis environment may contain one or more templates for generating studies or reports. Templates may use analysis performed by veteran quants.

In accordance with further aspects of this embodiment, identification of impacts may allow a user to create and test optimal investment strategies without depending on software engineers or quants.

Techniques for financial instrument attribute prediction and financial instrument visualization are disclosed. In one exemplary embodiment, the techniques may be realized as a method for financial instrument attribute prediction including determining a baseline probability for at least one financial instrument attribute of a financial instrument, inputting current market data associated with the financial instrument, matching, using at least one computer processor one or more portions of the current market data with historical market data, averaging outcomes of matched historical market data, and providing a probabilistic outcome for the at least one financial instrument attribute based on the matched historical market data and the current market data.

In accordance with further aspects of this exemplary embodiment, the financial instrument attribute may be price.

In accordance with further aspects of this exemplary embodiment, the price may be expressed as an overall market percentage change for the financial instrument since the opening of the trading day.

In accordance with further aspects of this exemplary embodiment, the current market data may include an amount of time left in a current trading day.

In accordance with further aspects of this exemplary embodiment, the current market data may include at least one of: an indication of market volume since the opening of the market for the financial instrument and an indication of volatility of the financial instrument.

In accordance with further aspects of this exemplary embodiment, the volatility may be a standard deviation of recent daily returns for the financial instrument.

In accordance with further aspects of this exemplary embodiment, the historical market data may include at least one of: an average historical performance for a current month of a year, an average historical performance for a current calendar day, an average historical performance for a numerical trading day of a week, a number of positive closes for the financial instrument during previous trading days, and a number of positive closes of a financial market associated with the financial instrument during previous trading days. In some embodiments, historical performance may include an arbitrary time during the history of a financial instrument's trading.

In accordance with further aspects of this exemplary embodiment, the techniques may include increasing an amount of historical market data by identifying additional historical market data based on a correlation of the additional historical market data.

In accordance with further aspects of this exemplary embodiment, the financial instrument may include a first financial instrument and the additional historical market data may comprise historical market data of a second financial instrument and correlation is based upon price behavior.

In accordance with further aspects of this exemplary embodiment, the techniques may further include setting a minimum level of correlation required for identification of additional historical market data.

In accordance with further aspects of this exemplary embodiment, the minimum level of correlation required may be based, at least in part, on an amount of available historical market data for the financial instrument.

In accordance with further aspects of this exemplary embodiment, the minimum level of correlation required may be set statically.

In accordance with further aspects of this exemplary embodiment, the historical market data of the second financial instrument may be weighted based on a level of correlation to the first financial instrument.

In accordance with further aspects of this exemplary embodiment, matching, using at least one computer processor one or more portions of the current market data with historical market data may include matching on one or more market data portions including at least one of price, minutes left in a trading day (or another period of time left or elapsed in a trading session such as, for example, hours or seconds remaining in a trading day or elapsed since an opening of a trading session), volume, and volatility.

In accordance with further aspects of this exemplary embodiment, a strength of a match may be weighted based on a number of market data portions matched.

In accordance with further aspects of this exemplary embodiment, the market data portions may be weighted individually and a strength of a match may be based on which market data portions match.

In accordance with further aspects of this exemplary embodiment, the techniques may comprise as an article of manufacture for financial instrument attribute prediction, the article of manufacture including at least one non-transitory processor readable storage medium and instructions stored on the at least one medium. The instructions may be configured to be readable from the at least one medium by at least one processor and thereby cause the at least one processor to operate so as to determine a baseline probability for at least one financial instrument attribute of a financial instrument, input current market data associated with the financial instrument, match one or more portions of the current market data with historical market data, average outcomes of matched historical market data, and provide a probabilistic outcome for the at least one financial instrument attribute based on the matched historical market data and the current market data.

In accordance with further aspects of this exemplary embodiment, the techniques may comprise as a system for financial instrument attribute prediction comprising one or more processors communicatively coupled to a network. The one or more processors may be configured to determine a baseline probability for at least one financial instrument attribute of a financial instrument, input current market data associated with the financial instrument, match one or more portions of the current market data with historical market data, average outcomes of matched historical market data, and provide a probabilistic outcome for the at least one financial instrument attribute based on the matched historical market data and the current market data.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 10 depicts a method for identifying relevant financial marketplace data, in accordance with an embodiment of the present disclosure.

FIGS. 11A-11J depict a user interface for viewing predicted financial instrument attributes, in accordance with an embodiment of the present disclosure.

FIG. 24 depicts a user interface for evaluating the performance of a financial instrument, in accordance with an embodiment of the present disclosure.

FIG. 44 depicts a notification modeling a market impact of a potential event, in accordance with an embodiment.

FIG. 48 depicts a notification modeling a market impact of a potential event, in accordance with an embodiment.

DETAILED DESCRIPTION OF EXEMPLARY EMBODIMENTS

The present disclosure relates to systems for and methods of financial instrument attribute prediction and financial instrument visualization. According to some embodiments, a real-time performance evaluation and monitoring system may include providing a probability of a financial instruments price change based at least in part on historical and current market data. In one or more embodiments, financial instrument visualization may provide charts and analysis depicting variance in financial instrument returns versus an annualized return. Accurate estimations of the near-future performance of a financial instrument may help the owner or a financial instrument trader evaluate the risks and benefits of holding the financial instrument. The near-future performance of a financial instrument may be determined by way of mathematical models and a high-speed computational process, system, and method that may utilize extremely large historical market data-sets in real-time.

Figure 1:
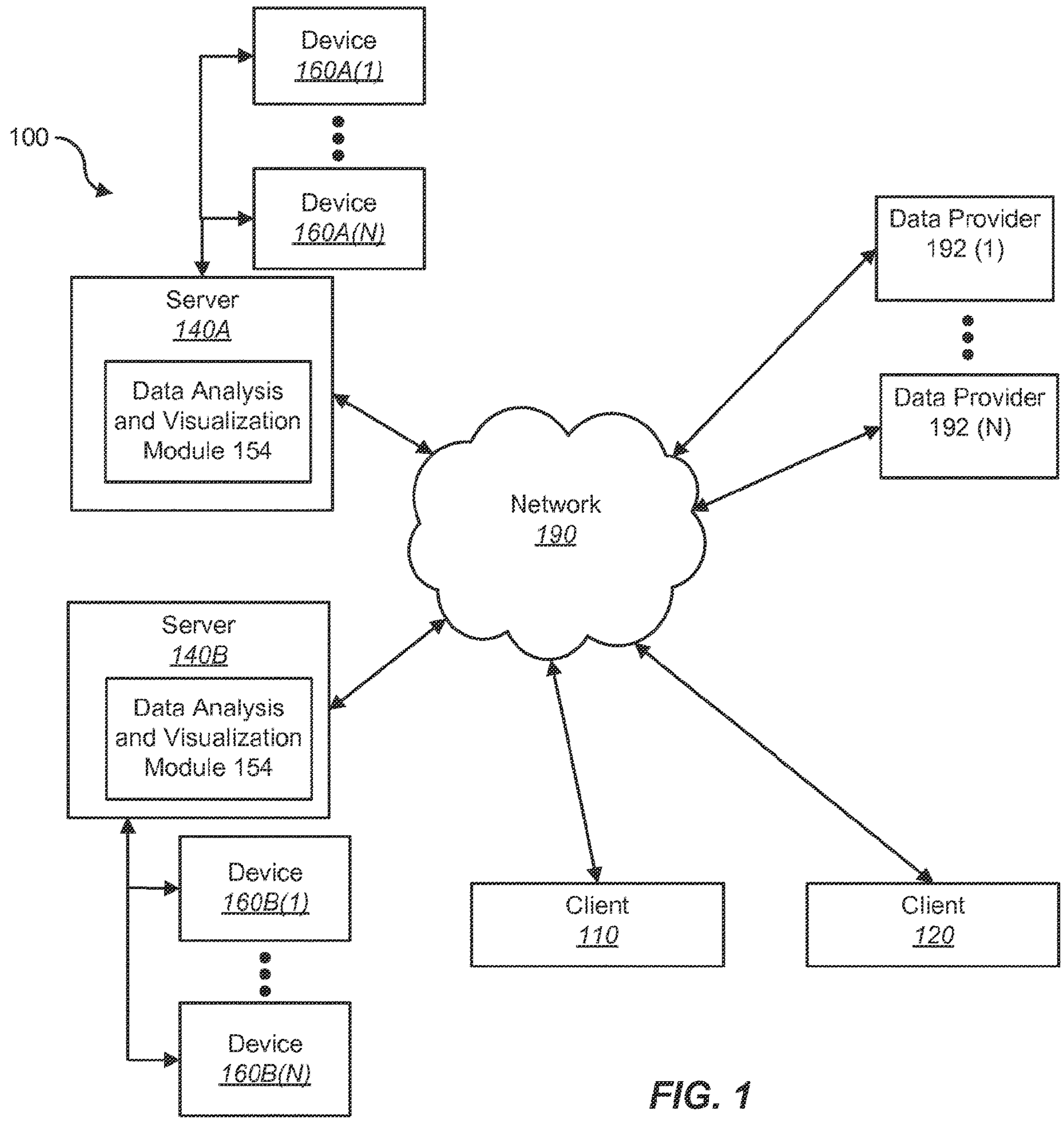
FIG. 1 shows a block diagram depicting a network architecture 100 for financial instrument attribute prediction and attribute visualization, in accordance with an embodiment of the present disclosure.

Turning now to the drawings, FIG. 1 shows a block diagram depicting a network architecture 100 for financial instrument attribute prediction and attribute visualization, in accordance with an embodiment of the present disclosure. FIG. 1 is a simplified view of network architecture 100, which may include additional elements that are not depicted. Network architecture 100 may contain client systems 110 and 120, as well as servers 140A and 140B (one or more of which may be implemented using computer system 200 shown in FIG. 2). Client systems 110 and 120 may be communicatively coupled to a network 190. Server 140A may be communicatively coupled to storage devices 160A (1)-(N), and server 140B may be communicatively coupled to storage devices 160B(1)-(N). Servers 140A and 140B may contain a management module (e.g., Data Analysis and Visualization Module 154). Data providers 192(1)-(N) may be communicatively coupled to network 190.

Figure 2:
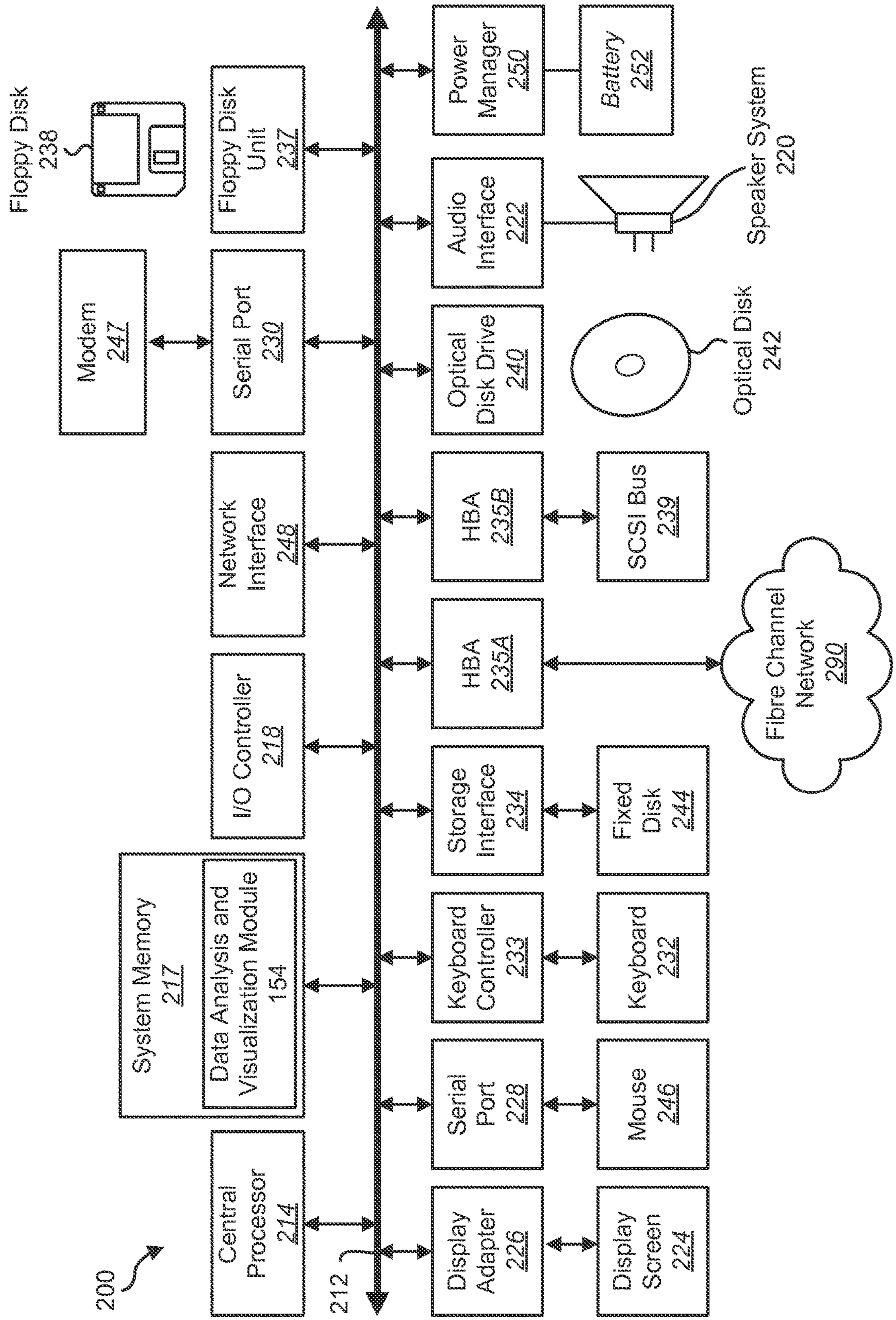
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110 and 120 to network 190. Client systems 110 and 120 may be able to access information on server 140A or 140B using, for example, a web browser or other client software (not shown) as a platform. Such a platform may allow client systems 110 and 120 to access data hosted by server 140A or 140B or one of storage devices 160A(1)-(N) and/or 160B(1)-(N).

Network 190 may be a local area network (LAN), a wide area network (WAN), the Internet, a cellular network, a satellite network, or other networks that permit communication between clients 110, 120, servers 140, and other devices communicatively coupled to network 190. Network 190 may further include one, or any number, of the exemplary types of networks mentioned above operating as a stand-alone network or in cooperation with each other. Network 190 may utilize one or more protocols of one or more clients or servers to which they are communicatively coupled. Network 190 may translate to or from other protocols to one or more protocols of network devices. Although network 190 is depicted as one network, it should be appreciated that according to one or more embodiments, network 190 may comprise a plurality of interconnected networks.

Storage devices 160A(1)-(N) and/or 160B(1)-(N) may be network accessible storage and may be local, remote, or a combination thereof to server 140A or 140B. Storage devices 160A(1)-(N) and/or 160B(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N) and/or 160B(1)-(N) may be used for backup or archival purposes.

According to some embodiments, clients 110 and 120 may be smartphones, PDAs, desktop computers, a laptop computers, servers, other computers, or other devices coupled via a wireless or wired connection to network 190. Clients 110 and 120 may receive data from user input, a database, a file, a web service, and/or an application programming interface.

Servers 140A and 140B may be application servers, archival platforms, backup servers, network storage devices, media servers, email servers, document management platforms, enterprise search servers, databases or other devices communicatively coupled to network 190. Servers 140A and 140B may utilize one of storage devices 160A(1)-(N) and/or 160B(1)-(N) for the storage of application data, backup data, or other data. Servers 140A and 140B may be hosts, such as an application server, which may process data traveling between clients 110 and 120 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

Data providers 192(1)-(N) may provide financial instrument data from one or more sources. According to some embodiments, data providers 192(1)-(N) may be external financial instrument market data providers (e.g., Interactive Data Corporation, Image Master, or another financial market data provider). Data providers 192(1)-(N) may provide one or more interfaces, filters, converters, formatting modules, or other data processing components to prepare data for Server 140 and/or Server 140B. Data may be provided periodically (e.g., daily, hourly, real time, or other increments), in batch or bulk, in response to a query or request (e.g., initiated by Server 140A), or event driven (e.g., in response to market opening).

According to some embodiments, clients 120 and 130 may be mobile devices and Data Analysis and Visualization Module 154 may be implemented on one or more mobile platforms including, but not limited to Android, iOS, WebOS, Windows Mobile, Blackberry OS, and Symbian. Data Analysis and Visualization Module 154 may be implemented on top of one or more platforms such as, for example, Internet Explorer, FireFox, Chrome, and Safari. In some embodiments, Data Analysis and Visualization Module 154 may implemented on a desktop client.

In some embodiments, Data Analysis and Visualization Module 154 may provide real-time probabilistic predictions of financial instrument price changes. For example, data analysis and visualization module 154 may calculate real-time changing odds (over the course of a trading session or a different time period) that a given financial instrument will close positive by the end of its trading session or another time period. Data Analysis and Visualization Module 154 may incorporate 1) real-time price and live back-testing of the probability of a price reversal for a particular financial instrument under similar historical conditions, including, for example, A) an amount of time left in the trading day, and B) how much a ticker for the financial instrument has already gained or lost over the day; 2) the historical odds of closing positive on this particular calendar date, and 3) the back-tested historical odds of a positive day today as a function of the performance of the previous trading days.

In some embodiments, data analysis and visualization module 154 may provide a user interface to model one or more economic scenarios. For example, a user may select one or more values for a macroeconomic environment to query how asset prices historically performed under a similar set of conditions. Financial analysts, investors, economists, researchers and other market participants may want to understand how macroeconomic variables have affected asset prices in the past, in order, for example, to inform views about possible future trends. Current research tools do not permit rapid discovery of prevailing historic economic conditions. Current research tools do not allow interactive backtesting to calculate the performance of a large (e.g., n>1000) basket of assets during periods in which those conditions obtained.

In some embodiments, a user interface provided by data analysis and visualization module 154 may allow a user to select one or more combinations of past economic variables for a query by use of simple onscreen sliders. A query may obtain confirmation (e.g., provided in near real time) of how many days existed during which the selected combinations of past economic variables exhibited the selected values, and then generate a backtesting model on one or more baskets of assets that calculates the assets' performance during those days. The baskets can contain an arbitrary number of assets.

In addition to probabilistic predictions, according to some embodiments, data analysis and visualization module 154 may provide a real-time performance evaluation and monitoring system for financial instruments. A financial instrument's probability of a given price change may be calculated using one or more of a plurality of inputs. Each input may correspond to one of a plurality of present or historical data points. Data analysis and visualization module 154 may provide a real-time monitoring and visualization system for financial instrument performance. Data analysis and visualization module 154 may include, for example, one or more of monitoring, recording, and comparing to historical data at least one of price metrics, volatility metrics, volume metrics, time left in trading day metrics, overall market metrics, and cross-instrument correlation metrics for a financial instrument. Data for metrics being monitored by data analysis and visualization module 154 may be stored in a database or other electronic storage, and a visualization of the metrics may be displayed or otherwise output.

In one or more embodiments, multiple dimensions of probability data associated with a future performance of a financial instrument may be presented to a user in a concise manner by data analysis and visualization module 154. Numerical odds ratios may be used to display probability data associated with the future performance of a financial instrument so that a user can identify and understand hidden patterns and information in the financial data associated with the financial instrument. Data analysis and visualization module 154 may model systems using multi-factor and multi-dimensional probabilistic models and more particularly to the display of probabilities associated with multi-factor and multi-dimensional probabilistic models.

Data analysis and visualization module 154 may determine the conditional probabilities associated with the near-future performance of a financial instrument. The interplay of multiple present and historical dimensions of data, such as price metrics, volatility metrics, volume metrics, time left in trading day metrics, overall market metrics, and cross-instrument correlation metrics may be factored to yield a more accurate forecast of the near-future performance of a financial instrument.

Data analysis and visualization module 154 may provide information visualization by graphically representing data according to a method or scheme. A graphical representation of data resulting from an information visualization technique may be called a visualization. Exemplary visualizations may include scatterplots, pie charts, treemaps, bar charts, graphs, histograms, and so on.

Data analysis and visualization module 154 may facilitate visualizing complex financial data sets, where visually striking and useful displays may improve business operations, economic forecasting, and so on. For example, financial data may be any information pertaining to a business operation or financial transaction(s). Financial data may include, for example, financial instrument prices, measures of financial instrument volatility, such as the standard deviation of returns over some period, measures of return of a financial instrument, such as annualized return, market data, and so on.

Data analysis and visualization module 154 may provide visualization and interaction with financial data using scatterplot visualizations. For example, data may be grouped according to two or more specified dimensions and determining one or more hierarchical, relational, spatial, relative, or temporal, relationships between the two or more user-specified dimensions. A position of a financial instrument intersecting an X and a Y axis may be depicted in a first order based on the one or more metrics measuring the relationships between return and risk associated with the financial instrument. In an illustrative embodiment, the data includes financial data. Data analysis and visualization module 154 may automatically visually highlight a featured financial instrument's placement along the spatial relation between risk and return. A first user option may enable a user to selectively visually query the identity of the financial instrument in the scatterplot space, as well as the data associated with its placement along the spatial relation between risk and return. A second user option may enable a user to selectively visually query the identity of comparative financial instruments in the scatterplot space, as well as the data associated with their placement along the spatial relation between risk and return. Additional user options may enable a user to select or input the time horizon and/or calculation method on the basis of which return is measured. Further user options may enable a user to select or input the time horizon and/or calculation method on the basis of which risk is measured. Further user options may enable a user to click, tap, or drag and select a region of the risk-return scatterplot and have the scatterplot dynamically 'zoom' to that region and automatically re-size such that that region becomes the entirety, or a different proportion, of the display of the scatterplot and such that the scatterplot dynamically populates additional financial instruments at the higher level of resolution. Further user options may enable the reverse process (e.g., a user may remove a focus or zoom out to see a greater number of financial instruments). A permutation of this embodiment involves the interaction being a touch screen motion, including but not limited to the touch screen motion being some sort of pinch open and pinch close. A permutation of this embodiment involves the interaction being a hand gesture via a device that translates the hand-gesture into the exploration of a spatial representation of the relation between risk and return on the scatterplot.

One or more of the above interface embodiments may utilize hand gestures that translate into controls for exploration of a spatial representation of a relation between risk and return on a scatterplot.

Figure 29:
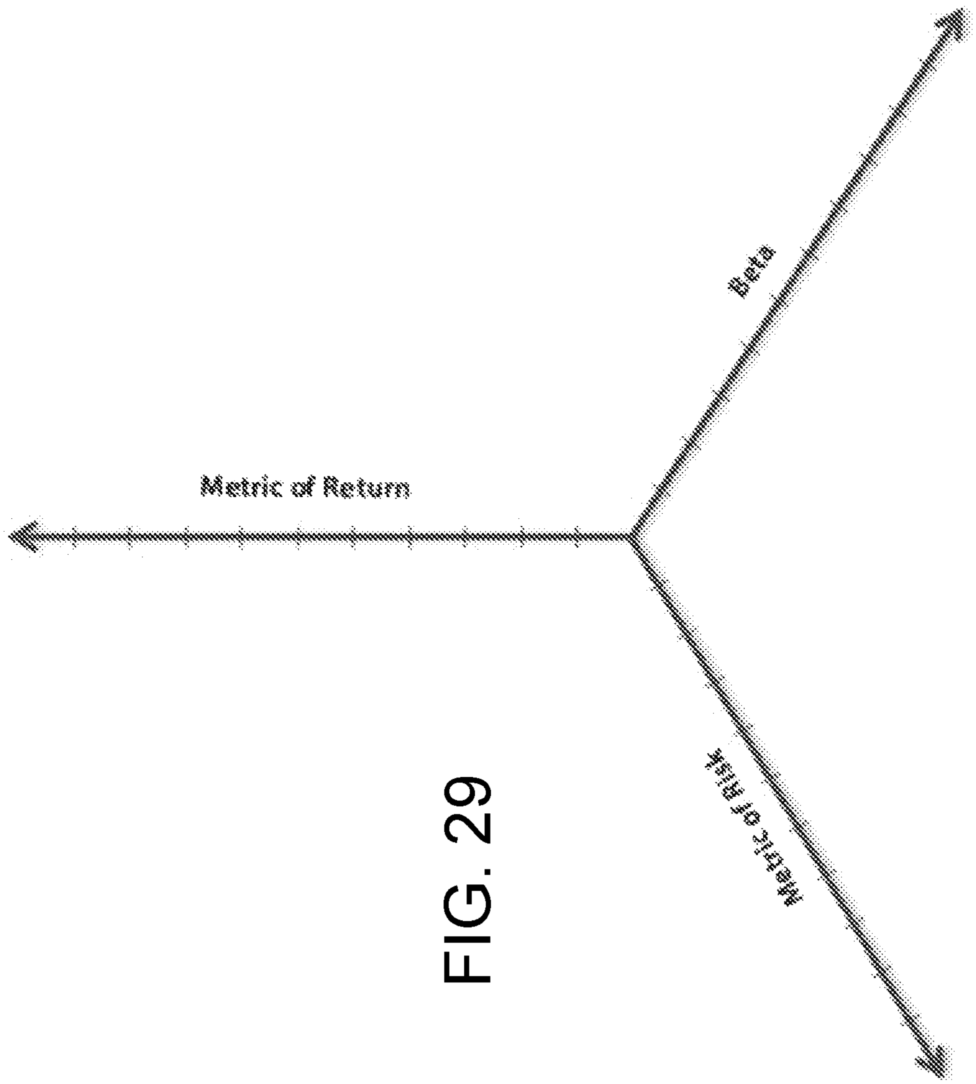
FIG. 29 depicts an embodiment of a user interface utilizing a Z axis to depict a metric of market Beta in relation to risk and return, in accordance with an embodiment of the present disclosure.

A permutation of some embodiments involves the possibility/option of adding a Z axis to one or more of the above described processes and/or options to create a three dimensions spatial representation of the relation between risk and return in a financial instrument, where the Z axis=some additional and/or different metric of risk; some additional and/or different metric of return, and/or some additional or different metric, including, but not limited to: a metric of time, a metric of market Alpha, a metric of market Beta, some other metric of correlation (including a dynamic correlation) to one or more financial instruments; a metric of volatility, a metric of volume, a metric of market capitalization. An embodiment of a user interface utilizing a Z axis to depict a metric of market Beta in relation to risk and return is illustrated in FIG. 29.

Returning to FIG. 1, in one or more embodiments, the data includes financial data. Data analysis and visualization module 154 may automatically visually highlight a placement of a featured financial instruments, a placement of a portfolio, which the user might import and/or construct via selection, or a placement of a financial strategy along the spatial relation between Alpha and Beta.

Beta may be exposure to the global market portfolio. And, any expected return from exposure to a risk uncorrelated with this portfolio may be Alpha. Returns may exist along a continuum—from Beta, to exotic Beta and ultimately, to Alpha. By optimizing this spectrum of return sources, investors can achieve a more efficient portfolio. Portfolios may contain a complete spectrum of return sources.

Additional user options may enable a user to select or input the time horizon and/or calculation method on the basis of which Alpha is measured. Further user options may enable a user to select or input the time horizon and/or calculation method on the basis of which Beta is measured.

One or more embodiments may provide financial instrument visualization technology including a fully-featured risk management, risk analysis, and statistical arbitrage system. Functionality may include portfolio analysis (including portfolio importing functionality) which may aide diversification in portfolio construction, management, and maintenance of portfolios. Visualization technology may incorporate, extend, and visualize risk analysis principles. Visualization may be more important across large data sets, which are traditionally more difficult to analyze and comprehend. Visualization technology may also provide analysis and user interfaces to comprehend real time data. Some embodiments may provide dynamic interaction with models in real time and may incorporate multivariate interactivity. A user may be able to change multiple inputs to query and to model effects on a portfolio in real time.

Figure 14:
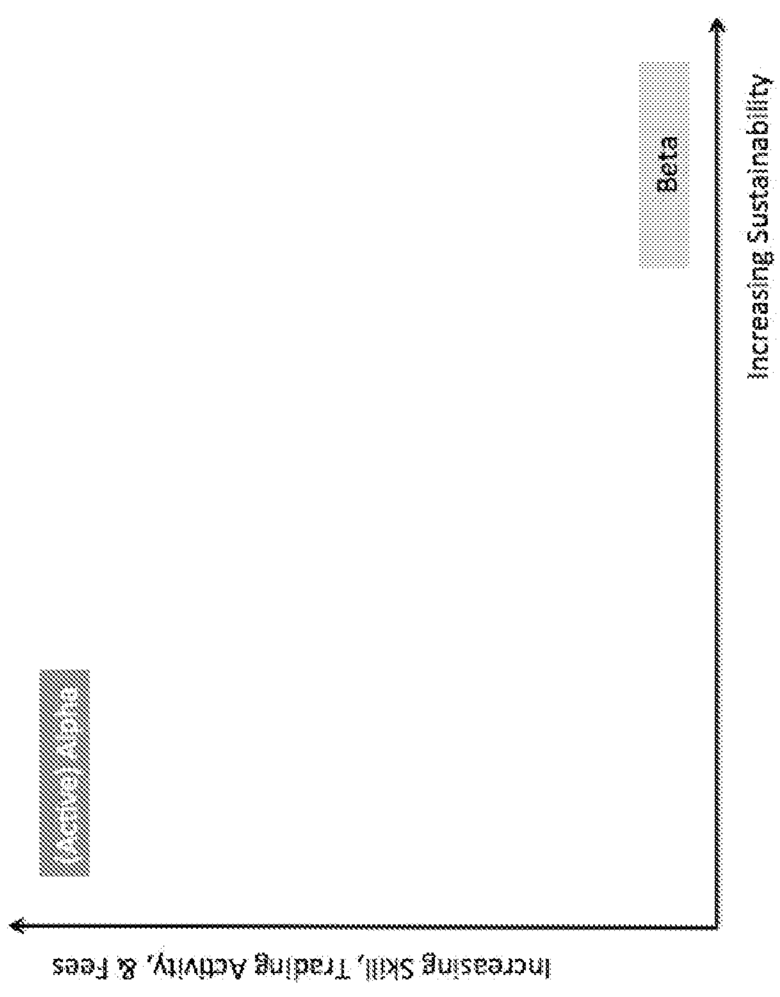
FIG. 14 depicts a user interface illustrating a tradeoff between risk correlated to a market and returns in excess of the market, in accordance with an embodiment of the present disclosure.
Figure 15:
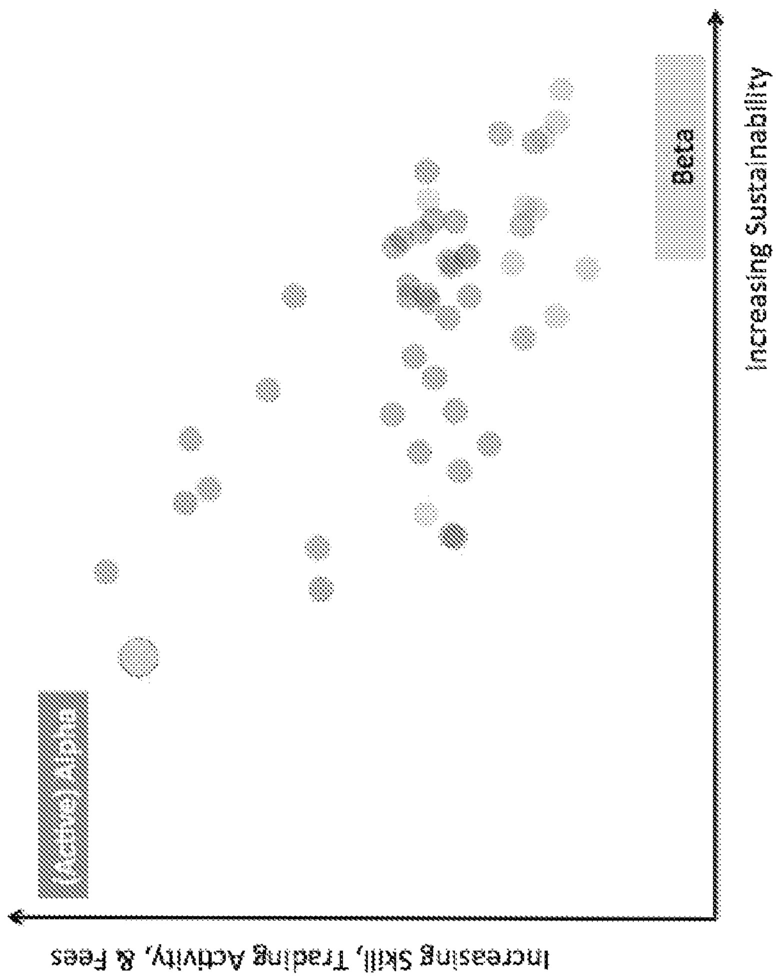
FIG. 15 depicts a user interface illustrating a scatterplot of financial instruments charted along a tradeoff between risk correlated to a market and returns in excess of the market, in accordance with an embodiment of the present disclosure.
Figure 16:
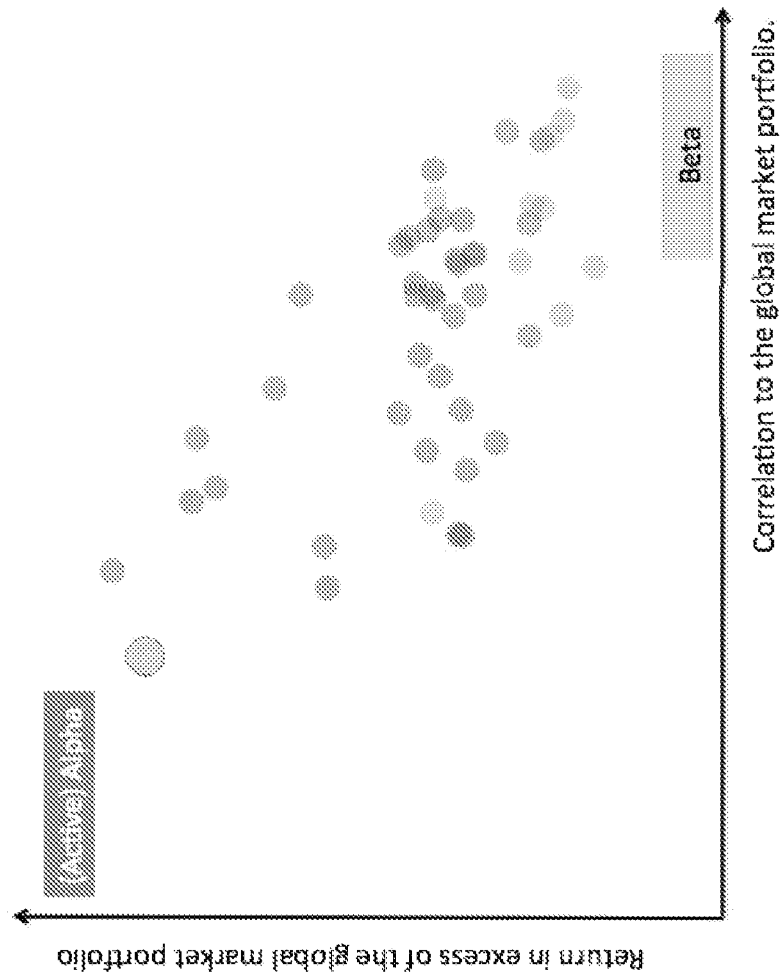
FIG. 16 depicts a user interface illustrating a scatterplot of financial instruments charted along a tradeoff between risk correlated to a market and returns in excess of the market, in accordance with an embodiment of the present disclosure.

An exemplary user interface produced by Data analysis and visualization module 154 may include FIG. 14. FIG. 14 depicts a user interface illustrating a tradeoff between risk correlated to a market and returns in excess of the market. Another exemplary user interface produced by Data analysis and visualization module 154 may include FIG. 15. FIG. 15 depicts a user interface illustrating a scatterplot of financial instruments charted along a tradeoff between risk correlated to a market and returns in excess of the market. Yet another exemplary user interface produced by Data analysis and visualization module 154 may include FIG. 16. FIG. 16 depicts a user interface illustrating a scatterplot of financial instruments charted along a tradeoff between risk correlated to a market and returns in excess of the market.

Further user options may enable a user to drag and select a region of the Alpha-Beta scatterplot and have the scatterplot dynamically 'zoom' to that region and automatically re-size such that that region becomes the entirety, or a different proportion, of the scatterplot and such that the scatterplot dynamically populates additional financial instruments at the higher level of resolution. Further user options may enable the reverse process (e.g., a user may remove a focus or zoom out to see a greater number of financial instruments). A permutation of this embodiment involves the interaction being a touch screen motion, including but not limited to the touch screen motion being some sort of pinch open and pinch close. A permutation of this embodiment involves the interaction being a hand gesture via a device that translates the hand-gesture into the exploration of a spatial representation of the relation between Alpha and Beta on the scatterplot.

One or more of the above interface embodiments may utilize hand gestures that translate into controls for exploration of a spatial representation of a relation between risk and return on a scatterplot.

A permutation of this embodiment may involve the possibility/option of adding a Z axis to one or more of the above described processes and/or options to create a three dimensions spatial representation of the relation between Alpha and Beta in a financial instrument, where the Z axis=some additional and/or different metric of Alpha; some additional and/or different metric of Beta, and/or some additional or different metric, including, but not limited to: a metric of time, another metric of market risk, another metric of market return, some other metric of correlation (including a dynamic correlation) to one or more financial instruments; a metric of volatility, a metric of volume, a metric of market capitalization. An embodiment of a user interface utilizing a Z axis to depict a metric of market Beta in relation to risk and return is illustrated in FIG. 29.

Returning to FIG. 1, Data analysis and visualization module 154 may provide user options allowing a user to adjust a scale of risk and return axis, and some embodiments may dynamically populate a scatter plot with additional financial instruments as the scale of risk and return changes. Additional user options may enable a user to trigger tabular view of underlying data or provide other visualization options. In a specific embodiment, a scatterplot of Data analysis and visualization module 154 may depict metrics for the risk and return of financial instruments as X and Y axis.

According to some embodiments, a user interface may be a scatterplot depicting a user specified portfolio. For example, a user portfolio may be imported and plotted along axis similar to those depicted in exemplary FIGS. 14-16. A user portfolio may be selected by a user from one or more menus or user controls (e.g., drop downs, picklists, search interfaces, etc.). A user portfolio may also be imported (e.g., via a secure and/or authenticated interface to a bank or other financial institution, via a data file, or via another specified format). A user portfolio may be compared against benchmarks, baselines, and/or comparative plots (e.g., indices, commodities, sectors, and index components). Changes over time may be illustrated on a user interface (e.g., change of a user portfolio over time versus one or more of indices, commodities, sectors, and index components).

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, Data Analysis and Visualization Module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, another known operating system, a custom operating system, or a proprietary operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
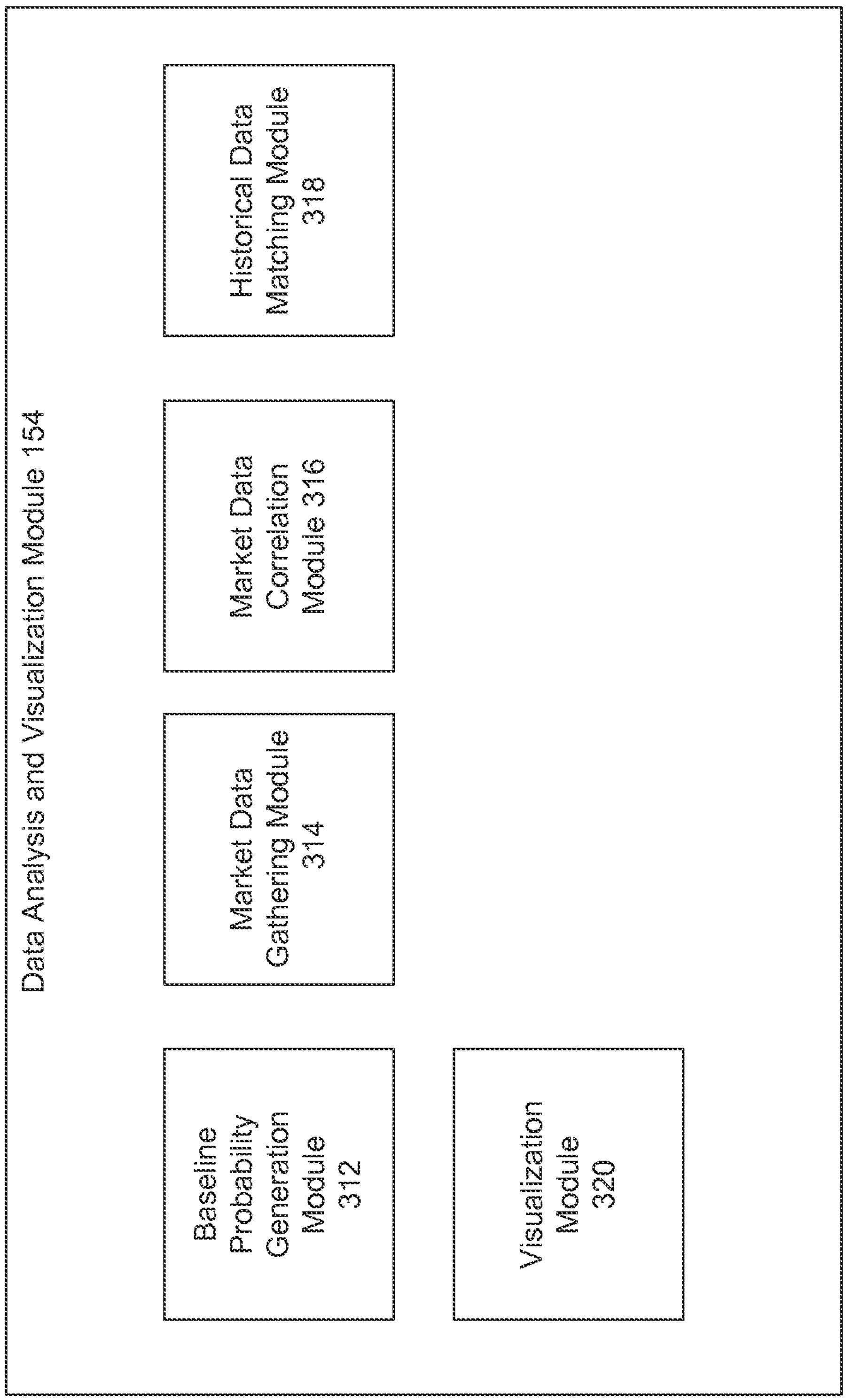
FIG. 3 shows a module for financial instrument attribute prediction and attribute visualization, in accordance with an embodiment of the present disclosure.

Referring to FIG. 3, there is shown a Data analysis and visualization module 154 in accordance with an embodiment of the present disclosure. As illustrated, the financial instrument attribute prediction and attribute visualization module 154 may contain one or more components including baseline probability generation module 312, market data gathering module 314, market data correlation module 316, historical data matching module 318, and visualization module 320.

The description below describes network elements, computers, and/or components of a system and method for improving financial instrument attribute prediction and attribute visualization that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Baseline probability generation module 312 may generate baseline probabilities. For example, baseline probabilities may be generated prior to the opening of a trading day for one or more financial instruments. A baseline probability may be generated from one or more factors including, for example, an average historical performance for a current month of a year, an average historical performance for a current calendar day, an average historical performance for a numerical trading day of a week, a number of positive closes for the financial instrument during previous trading days, a number of positive closes of a financial market associated with the financial instrument during previous trading days, and an indication of volatility of a financial instrument (e.g., a standard deviation of recent daily returns for the financial instrument).

Market data gathering module 314 may receive market data from one or more sources. According to some embodiments, market data may be provided by external financial instrument market data providers (e.g., Interactive Data Corporation, Image Master, or another financial market data provider). Market data gathering module 314 may provide one or more interfaces, filters, converters, formatting modules, or other data processing components to format, process, and/or analyze data. Data may be provided periodically (e.g., daily, hourly, real time, or other increments), in batch or bulk, in response to a query or request (e.g., initiated by a server), or event driven (e.g., in response to market opening).

Market data correlation module 316 may increase an amount of historical market data available to analyze a financial instrument by identifying additional historical market data based on a correlation of the additional historical market data to the financial instrument. According to some embodiments the correlation may be based upon price behavior. According to some embodiments, market data correlation module 316 may set a minimum level of correlation required for identification of additional historical market data. Market data correlation module 316 may set a minimum level of correlation required statically. In one or more embodiments, the minimum level of correlation required by market data correlation module 316 may be dynamically set based at least in part on an amount available historical data for the financial instrument. For example, if a financial instrument has been in a market for thirty years, it may have a large amount of historical data available. For such a financial instrument additional historical data from correlated financial instruments is less important so a level of correlation required may be high (e.g., a 95% correlation). Market data correlation module 316 may weight historical data based on a level of correlation. For example, historical data of a second financial instrument with a 95% correlation to an instrument being analyzed may be given more weight than a second financial instrument with only an 85% correlation.

Historical data matching module 318 may match one or more current financial instrument attributes and one or more financial instrument attributes of historical financial instrument data. According to some embodiments, matching current market data to historical market data may be performed using one or more portions of market data including at least one of price, minutes left in a trading day, volume, and volatility. Price may be represented in different forms such as, for example, an overall market percentage change for a financial instrument since the opening of the trading day. In one or more embodiments, a strength of a match may be weighted by Historical data matching module 318 based on a number of market data portions matched. In some embodiments, market data portions may be weighted individually and a strength of a match may be based on which market data portions match.

Visualization module 320 may provide visualization and interaction with financial data using scatterplot visualizations. For example, data may be grouped according to two or more specified dimensions and determining one or more hierarchical, relational, spatial, relative, or temporal, relationships between the two or more user-specified dimensions. A position of a financial instrument intersecting an X and a Y axis may be depicted in a first order based on the one or more metrics measuring the relationships between return and risk associated with the financial instrument. In an illustrative embodiment, the data includes financial data. Visualization module 320 may automatically visually highlight a featured financial instrument's placement along the spatial relation between risk and return. A first user option may enable a user to selectively visually query the identity of the financial instrument in the scatterplot space, as well as the data associated with its placement along the spatial relation between risk and return. A second user option may enable a user to selectively visually query the identity of comparative financial instruments in the scatterplot space, as well as the data associated with their placement along the spatial relation between risk and return. Additional user options may enable a user to select or input the time horizon and/or calculation method on the basis of which return is measured. Further user options may enable a user to select or input the time horizon and/or calculation method on the basis of which risk is measured.

Visualization module 320 may provide user options allowing a user to adjust a scale of risk and return axis, and some embodiments may dynamically populate a scatter plot with additional financial instruments as the scale of risk and return changes. Additional user options may enable a user to trigger tabular view of underlying data or provide other visualization options. In a specific embodiment, a scatterplot of Visualization module 320 may depict metrics for the risk and return of financial instruments as X and Y axis.

Figure 4A:
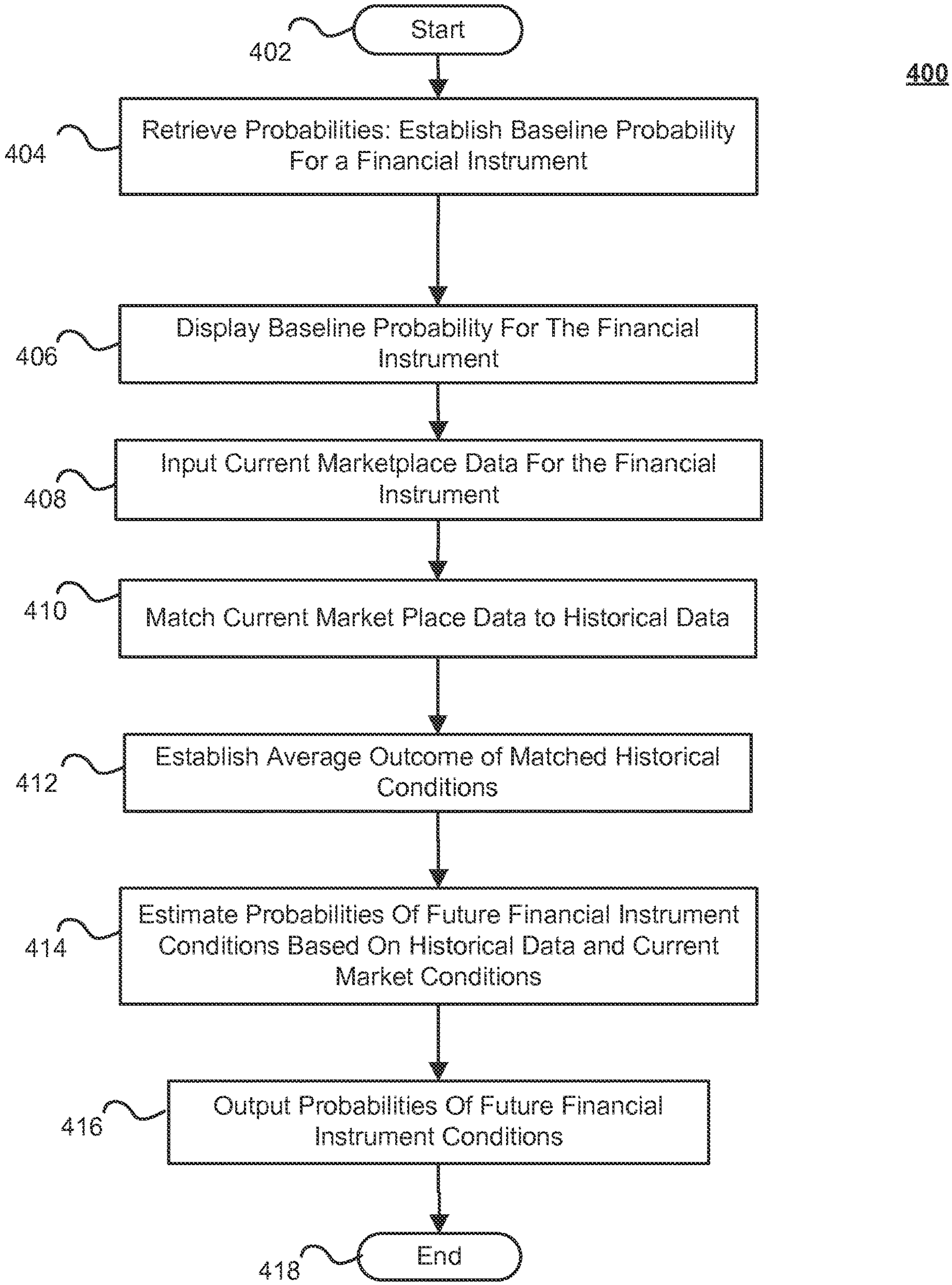
FIG. 4A depicts a method for financial instrument attribute prediction and attribute visualization, in accordance with an embodiment of the present disclosure.

Referring to FIG. 4A, there is shown a method for financial instrument attribute prediction and attribute visualization, in accordance with an embodiment of the present disclosure. At block 402, the method 400 may begin.

At block 404 a baseline probability for a financial instrument may be established. For example, baseline probabilities may be generated prior to the opening of a trading day for one or more financial instruments. A baseline probability may be generated from one or more factors including, for example, an average historical performance for a current month of a year, an average historical performance for a current calendar day, an average historical performance for a numerical trading day of a week, a number of positive closes for the financial instrument during previous trading days, a number of positive closes of a financial market associated with the financial instrument during previous trading days, and an indication of volatility of a financial instrument (e.g., a standard deviation of recent daily returns for the financial instrument). At block 406, the baseline probability may be displayed.

At block 408, the current marketplace data for the financial instrument may be input. Current marketplace data may include, for example, price, minutes left in a trading day, volume, and volatility.

At block 410 current market place data may be matched to historical data. One or more current financial instrument attributes and one or more financial instrument attributes of historical financial instrument data may be matched. According to some embodiments, matching current market data to historical market data may be performed using one or more portions of market data including at least one of price, minutes left in a trading day, volume, and volatility. Price may be represented in different forms such as, for example, an overall market percentage change for a financial instrument since the opening of the trading day. In one or more embodiments, a strength of a match may be weighted based on a number of market data portions matched. In some embodiments, market data portions may be weighted individually and a strength of a match may be based on which market data portions match.

At block 412 an average outcome of matched historical conditions may be generated. At block 414 probabilities of future financial instrument conditions may be generated based on the averaged outcome of matched historical conditions. At block 416, one or more generated probabilities for the financial instrument may be output. At block 418, the method 400 may end.

Figure 4B:
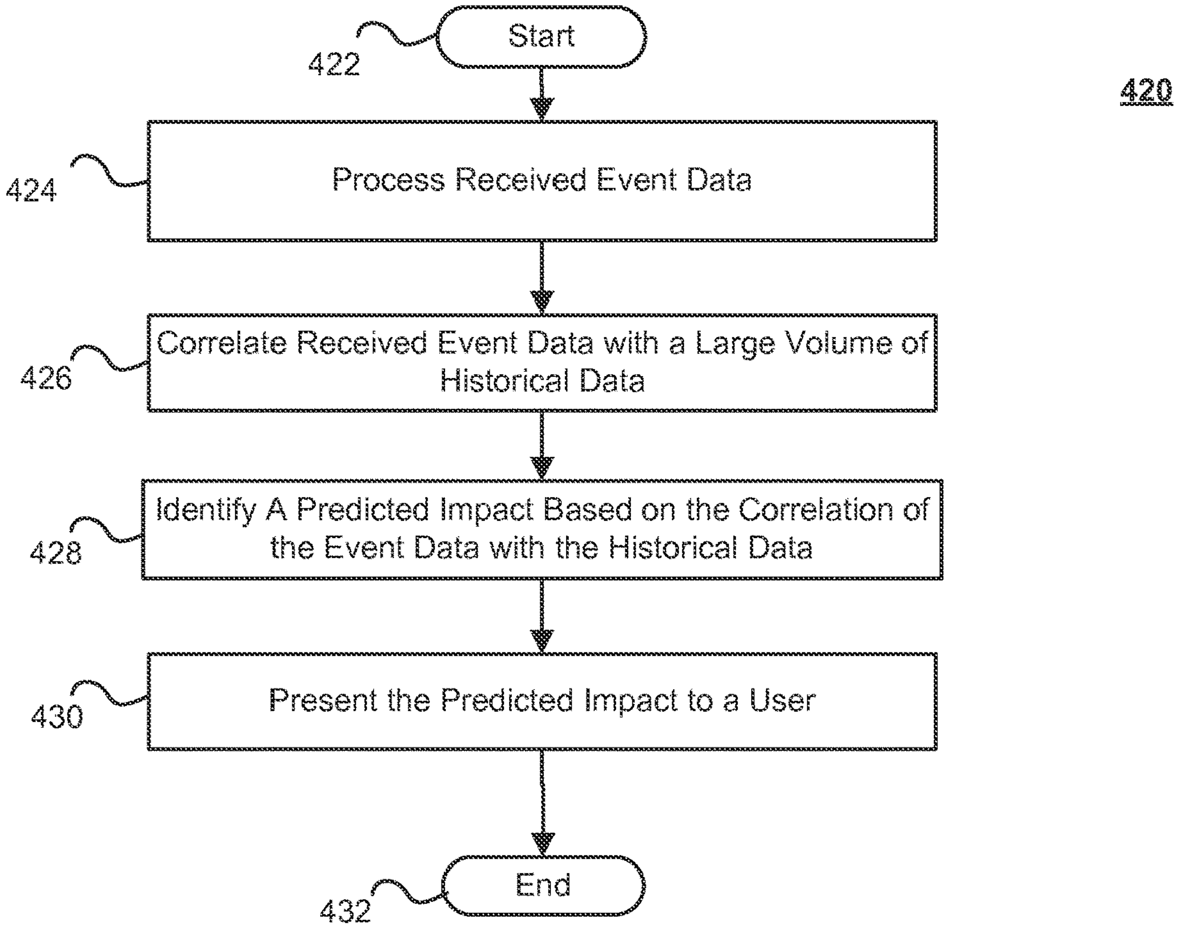
FIG. 4B depicts a method for analyzing event data to predict an impact on the performance of an asset, in accordance with an embodiment of the disclosure.

FIG. 4B depicts a method for analyzing event data to predict an impact on the performance of an asset, in accordance with an embodiment of the disclosure. At block 422 the method 420 may begin.

At block 424, received event data may be processed. Event data may be from one or more sources. For example, event data may be user entered event data to model an impact of a potential event on a financial instrument, an actual event received from a data feed, and an event generated by a system to model an impact of upcoming potential events. Event data may include, for example, geopolitical events, earnings events, weather events, product events, and surprises relative to expectations for one or more events.

At block 426, received event data may be correlated with a large volume of historical data (e.g., decades of time series financial data).

At block 426, a predicted impact may be identified based on correlation of the event data with the historical data. The predicted impact may be an impact on a financial instrument performance.

At block 430 the predicted impact may be presented to a user (e.g., via one or more of an alert, an email, a text message, a blog post, a web based ticker, a web based animated banner, a transmitted recorded audio message, and an electronic notification). At block 432, the method 420 may end.

In some embodiments, one or more automated processes may mine historical data to produce statistical content to automatically present to one or more users (e.g., financial data to traders). Raw data (e.g., asset prices) may be derived, abstracted and otherwise statistically analyzed to produce statistical data (i.e., mined data). Data may be mined and presented as a real time or near real time feed to users. Mined data may monitor events based on one or more data feeds (e.g., economic data surprises, weather anomalies, central bank statements and actions, product releases, earnings surprises, mergers and acquisitions and IPOs, corporate governance changes, regulatory approvals and denials, and seasonality, etc.) and analyze data by mapping associations between similar historical data and correlated results (e.g., historically an event of type X impacted financial instrument Y by increasing the relative performance of Y by 1.50% by the end of the trading day with respect to a benchmark). Mined data may identify significant impacts in relative and/or absolute performance of a financial instrument. Large collections of historical data may be mined in real time or near real time.

The predicted performance of various sectors and industries may be ranked based on their performance in similar historical events and/or market conditions. For example, if released jobless numbers are a surprise (e.g., they deviate significantly from a consensus figure on expected jobless numbers), the system may then mine historical data and surface (identify) prior examples of similar surprises of a similar magnitude to the one that just happened. The system may define what the magnitude of the surprise that just happened was by discovering the standard deviation of the surprise (from the consensus) in the history of identified surprises for that data point (e.g., jobless numbers). The system may categorize the magnitude of the surprise that was just announced, and then in so doing, may be able to find and match other similar historical cases. Based on the matching, the system may categorize and group the surprise of that day with other historical surprises that the system has just established to be similar (i.e., matching surprises on the independent variable side may facilitate discovering a correct set of precedents to model out the asset returns on the dependent variable side). The system may then test the market impact of those previous surprises in the set it just defined to be analogous to what just happened in the market. Based on this the system may provide a probabilistic market impact of what just happened (e.g., an event seconds ago such as for example, an event determined by the system after receipt of the event data to be a '1 standard deviation earnings surprise' relative to all historical earnings results for that company, or an event determined by the system after receipt of the event data to be a 2 standard deviation jobs surprise relative to all historical jobs surprises). Thus the system may be both able to characterize a statistical frequency of occurrence of the independent variable (e.g. earnings numbers or economic data surprises) by defining dynamically the relevant set of historical precedents for modeling, and also able to model asset price returns and asset pricing anomalies in relation to that specific set of historical precedents it just isolated and defined.

Notifications of real-time events may be presented with summary information of an impact of such events and a confidence level. The impact of such events may be projected across different areas (e.g., different market sectors, different benchmarks, different financial instruments, etc.). Events may be categorized into one or more categories (e.g., economic data surprises, weather anomalies, central bank statements and actions, product releases, earnings surprises, mergers and acquisitions and IPOs, corporate governance changes, regulatory approvals and denials, seasonality, all events, and custom focused feeds of events). Events may also be ranked, sorted, or filtered. In some embodiments, a user may filter events by market sector, portfolio holdings or other parameters in order to filter events to those which affect or interest the user. As depicted an exemplary economic data surprise may be a released report indicating that non-farm payrolls rose more than expected. A notification for the event may indicate a market impact of the surprise, which may be calculated by statistically averaging the returns of various financial instruments. An impact of a surprise may be calculated quickly by using previously identified precedents of the surprise. For example, a system may calculate one or more sets of precedents for different types of events (e.g., jobs surprises, non-farm payroll surprises, etc.) which may be associated by one or more of a similarity based on orders of magnitude of a surprise (e.g., a 1% standard deviation, a 2% standard deviation, etc.), a similarity of market conditions, or other factors. Using pre-calculated precedents of events, an impact of an actual event on returns associated with an instrument may be predicted using returns associated with the identified precedents.

Within several minutes of the surprise being released, the system automatically may send an alert with the statistics on the market impact already calculated, tested, and charted. This may be done programmatically, and automatically, in seconds-not requiring human labor. Alternatively alerts may be created by human input and displayed or otherwise communicated via the interface. The impact of an unexpected decrease in jobless claims from 339,000 to 319,000 may suggest based on historical data that the industrial sector may rise by 60% by the end of the day. Other indicators may also be displayed such as, for example, the impact on a benchmark (e.g., S&P 500 to rise by 61%), the rate of return for one or more sectors, the worst performing sector historically and the projected impact, a percentage of positive trades for one or more sectors. The alert may be an alert, a text message, an email, a banner or ticker, a blog post, an audio alert, a generated phone message, or another electronic communication. The language used in the alert may be machine-generated, using algorithms taking as their input one or more of the return of the assets being modeled, the frequency of positive returns, the rank order of returns (best to worst), the number of prior observations, and other inputs. The alert may carry a confidence indicator (by means, for example of a 'star rating' display or other means), whose value is derived from inputs that may include one or more of: the number of observations in the alert, the probability that the returns of assets on the days in the model are statistically anomalous compared to all other days during the same period of time, the frequency distribution of returns, or other relevant factors.

Clicking on an alert, focusing on an alert, selecting an alert or otherwise responding to an alert may provide further level of detail. Selecting an alert may provide further summary text (e.g., "Jobless Claims Misses>8,529 (−0.5 SD Miss") and may provide one or more details on the impact on particular sectors. For example, a correlation of a trade in a sector with a benchmark may be shown (e.g., the S&P 500). A number of observations and a standard deviation from an average trading day may also be presented for a sector. Other data may be presented for one or more sectors including, for example, an average excess return, a cumulative return, and a Sharpe ratio.

A user interface for pushing statistical market content to a user, in accordance with an embodiment of the disclosure may represent an additional detail display presented in response to further drilling down or selecting an alert. This may be, for example, a full, in-depth statistical report-of the type that would take a human research team days of work to generate-all created programmatically within a short period of time of the market event (e.g., seconds). One or more graphs may be presented depicting an impact of an event such as, for example, an impact of the event across sectors (e.g., industries, financials, energy, materials, healthcare, utilities, IT, etc.) Other graphs may include an impact across industries, an impact on benchmarks, etc. Graphs may include benchmarks and an ability to drill down on one or more elements of a graph (e.g., a sector, an industry, a benchmark, a ticker, etc.) A graph may indicate one or more specific market elements (e.g., particular financial instruments, companies, tickers, etc.) significantly impacted by an event. Impact may be measured by a projected and/or a relative rank order of return compared to other industries, sectors, or financial instruments based on historical data, a percentage of positive trades based on a correlation to historical data, an average excess return (e.g., compared to a benchmark), or by other measure of performance.

One or more graphs may present trading strategies based on analysis from correlation of the event to historical data (e.g., back tested trades). Strategies may include suggested holding periods and other data. Detailed report data may also include a distribution of benchmark returns, a distribution of returns for a sector, or other comparative financial data. A list of historical events correlated to a current event being analyzed may be presented. A listing of correlated historical events may be provided chronologically, by order of correlation, by order of impact to the market, or based on other sort parameters. A user may be able to drill down and view details of historical events. In some embodiments, a user may be able to exclude one or more events and recalculate financial impact of a current event based on historical data other than the excluded events.

In response to an event such as the Crimean Referendum and Declaration of Independence, a detailed report on one or more financial assets (e.g., the Ruble) may be produced. According to some embodiments, the dynamically generated report may be produced in near real time in response to the event being received (e.g., from a news feed, scraping a website or blog, etc.). A detailed bar chart may be provided showing performance of assets analyzed in the report. The bar chart may provide one or more benchmarks, an ability to drill down into a particular asset represented by a bar of the chart, an ability to filter or add assets, and other user interface controls.

A detailed report chart provided via a notification, in accordance with an embodiment of the disclosure may display historical performance of one or more assets analyzed in the report.

One or more study summaries associated with an event may be displayed. A study summary may provide further detail on an asset associated with an analyzed event (e.g., Crimean Referendum and Declaration of Independence).

A trade history of one or more assets associated with an event may be displayed in comparison with a benchmark trade for a similar period.

Assets may include, for example, sectors, individual financial instruments, and benchmarks. A trading range for one or more assets including a color coded indicator, may be provided.

Figure 5:
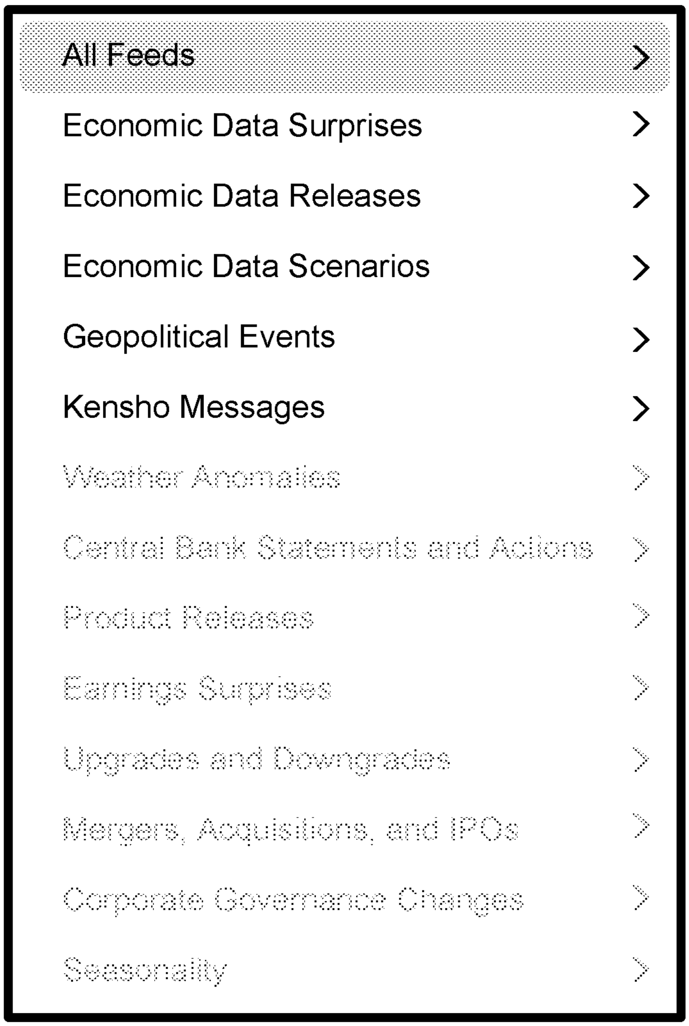
FIG. 5 depicts a menu for selecting events for analysis, in accordance with an embodiment of the disclosure.

FIG. 5 depicts a menu for selecting events for analysis, in accordance with an embodiment of the disclosure. User interface controls may allow a user to select, add, delete, filter, sort, and/or prioritize event types. Other conditions and parameters may be specified (e.g., a specifying listing of tickers to monitor whereby an event may be displayed based on potential or actual impact to the listing of financial instruments represented by the tickers). Thresholds may be set to filter or rank events (e.g., display events which have greater than a specified percentage impact projected for a user's portfolio or specified instruments or sectors).

An event user interface may provide a large listing of events available for study generation. Events may be categorized, sorted, and filtered.

Figure 6:
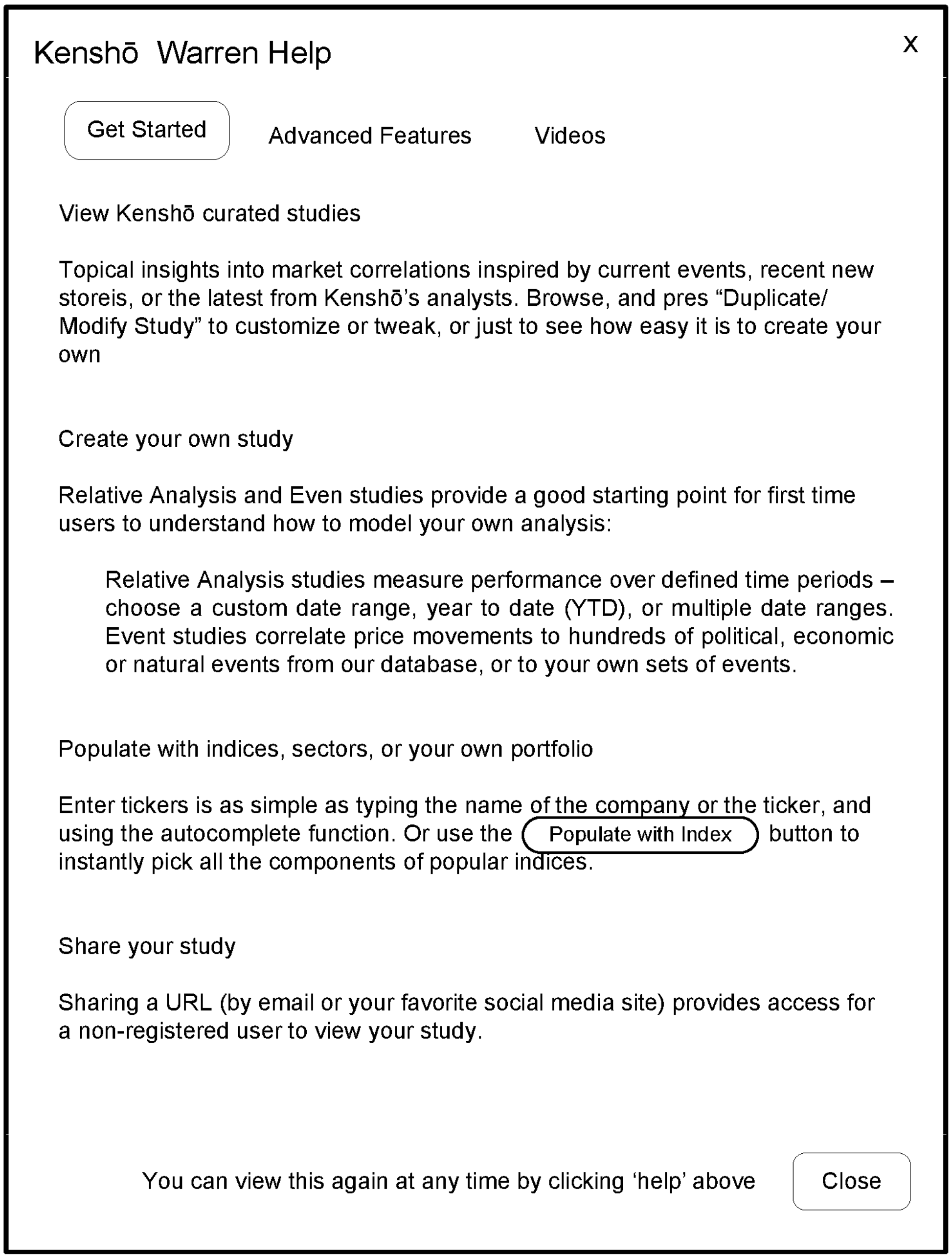
FIG. 6 depicts a help menu on an event analysis user interface, in accordance with an embodiment of the disclosure.

FIG. 6 depicts a help menu on an event analysis user interface, in accordance with an embodiment of the disclosure. As depicted in FIG. 6 help may be provided to allow a user to create a study based on one or more events or based on user provided events. Help may also be provided for other study functionality such as, for example, sharing studies, populating studies with a ticker or portfolio, viewing and duplicating studies, and other analytical functionality.

Figure 7:
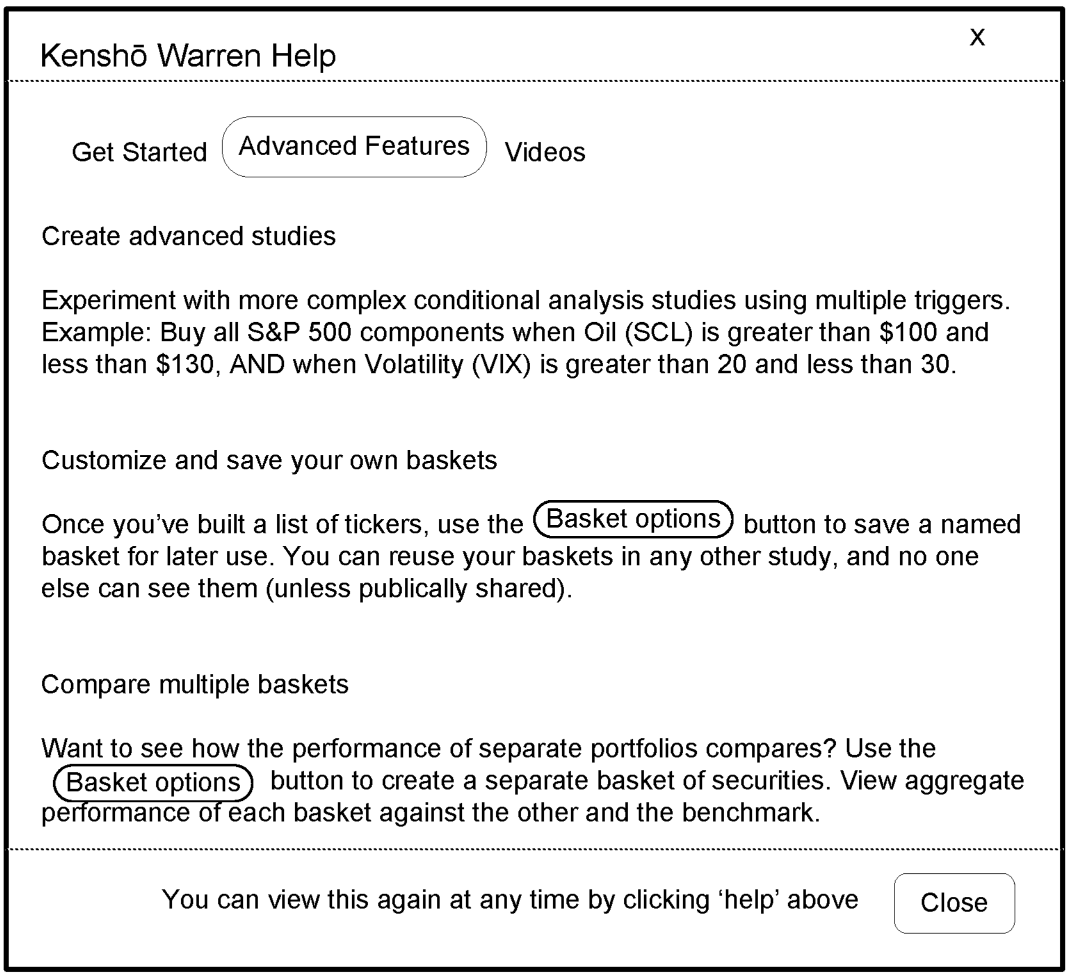
FIG. 7 depicts a help menu on an event analysis user interface, in accordance with an embodiment of the disclosure.

FIG. 7 depicts a help menu on an event analysis user interface, in accordance with an embodiment of the disclosure. Help may be provided for advanced functionality such as, for example, advanced studies using multiple conditions or parameters, creating baskets of assets, comparing baskets of assets, and other grouping and comparison functionality.

User interface controls for pushing statistical market content to a user, in accordance with an embodiment of the disclosure may include a dashboard for navigation among multiple interfaces or components of a system. For example, icons, buttons, or other user interface controls may allow navigation to user interface screens for featured studies, all studies, study creation, a user dashboard, an event listing, an alert or notification listing, settings, and help. Such user interface controls may provide navigation among classifications or groupings of events. Events may be grouped by a user specified or administrator specified taxonomy.

An event user interface may provide a large listing of events available for study generation. Events may be categorized, sorted, and filtered.

Figure 8:
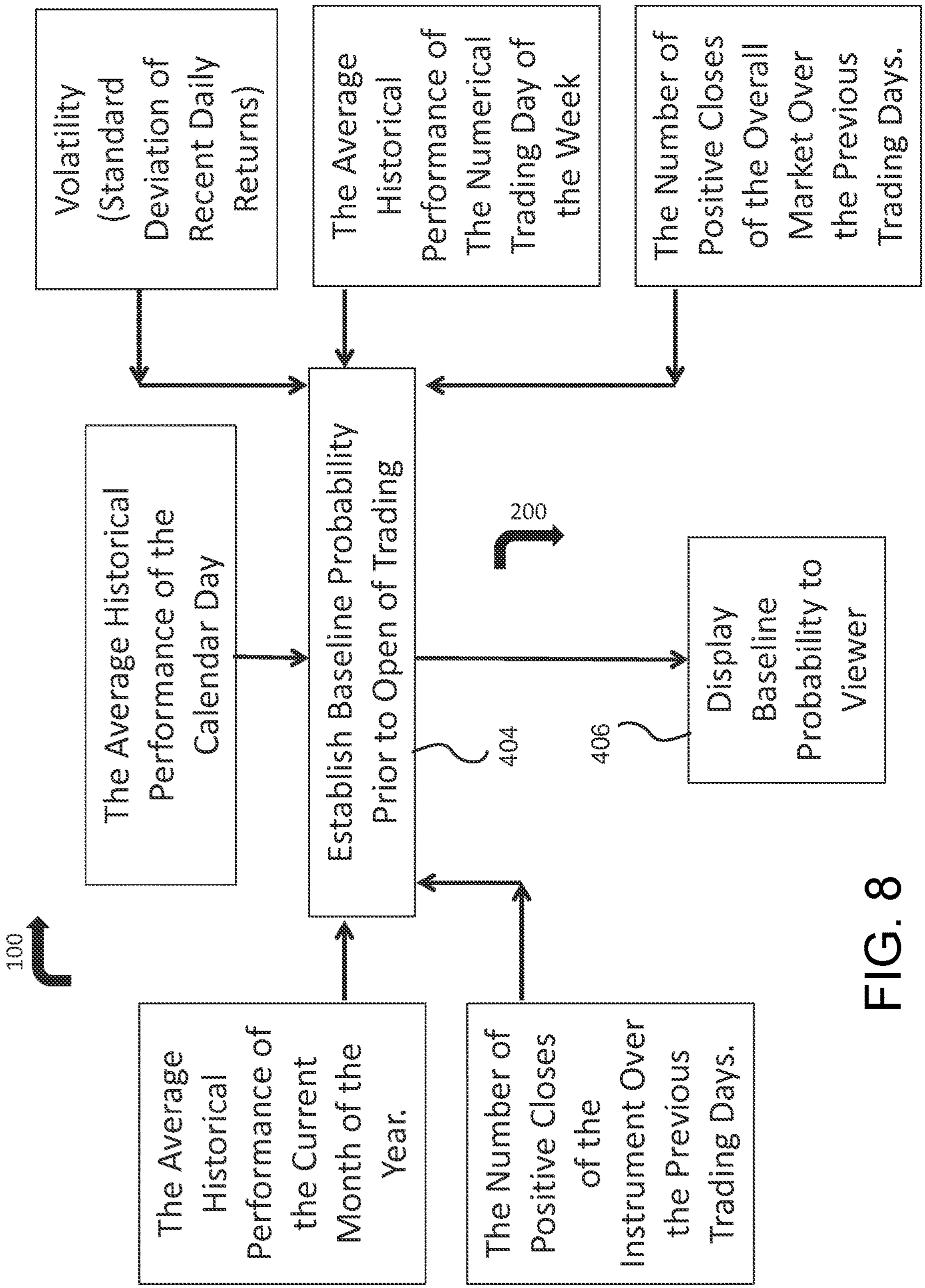
FIG. 8 depicts a method for establishing baseline probabilities for financial instrument attributes, in accordance with an embodiment of the present disclosure.

FIG. 8 depicts a method for establishing baseline probabilities for financial instrument attributes, in accordance with an embodiment of the present disclosure. As discussed above with reference to block 404 of FIG. 4A, a baseline probability may be generated from one or more factors including, for example, an average historical performance for a current month of a year, an average historical performance for a current calendar day, an average historical performance for a numerical trading day of a week, a number of positive closes for the financial instrument during previous trading days, a number of positive closes of a financial market associated with the financial instrument during previous trading days, and an indication of volatility of a financial instrument (e.g., a standard deviation of recent daily returns for the financial instrument).

Figure 9:
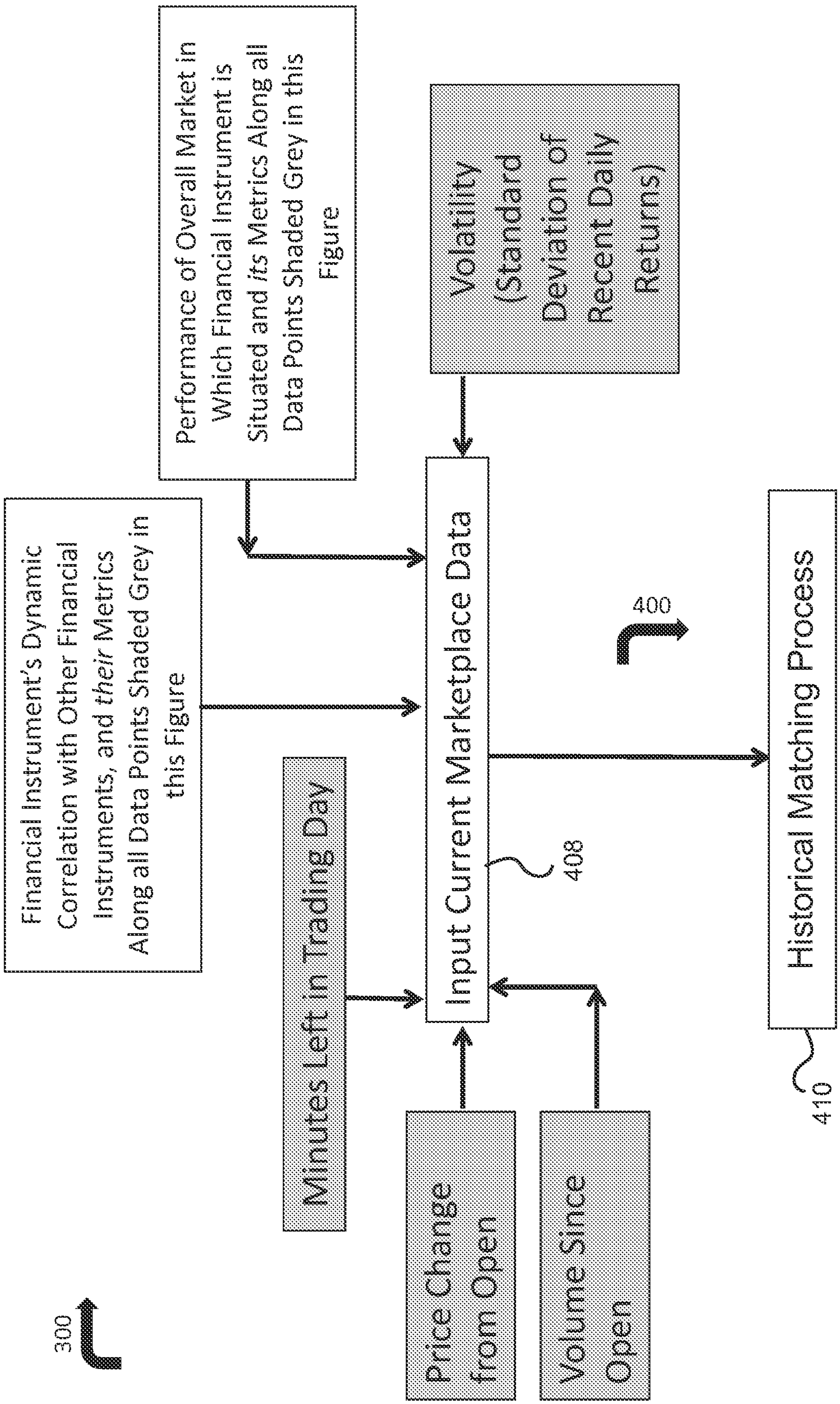
FIG. 9 shows a method for gathering financial marketplace data, in accordance with an embodiment of the present disclosure.

FIG. 9 shows a method for gathering financial marketplace data, in accordance with an embodiment of the present disclosure. The current marketplace data for the financial instrument may be input. Current marketplace data may include, for example, price, minutes left in a trading day, volume, and volatility.

FIG. 10 depicts a method for identifying relevant financial marketplace data, in accordance with an embodiment of the present disclosure. Real time current market conditions for a financial instrument may be matched against historical financial data. Current marketplace data may include a ticker symbol, minutes left in trading day, % change since open, volume since open, volatility, overall market % change since open. Weighting of matched historical data may depend on one or more factors. A perfect match along one dimension=higher weight to end of day outcome of historical data record. A proximity match along one dimension=some weight to end of day outcome of historical data record. No match along one dimension=no weight to end of day outcome of historical data record. The > the #of Perfect of Proximity Matches Along Multiple Dimension of a Historical Data Record the > the Weight Applied to End of Day Outcome of Historical Data Record.

FIGS. 11A-11J depict a user interface for viewing predicted financial instrument attributes, in accordance with an embodiment of the present disclosure A user interface may depict real time odds of a price change of a financial instrument, historical odds, average monthly percentage change of a financial instrument, a financial instrument price quote and other financial instrument analysis and data. User interfaces may provide an ability to search on one or more financial instrument attributes (e.g., a ticker symbol, a price range, a risk range, etc.).

Figure 11A:
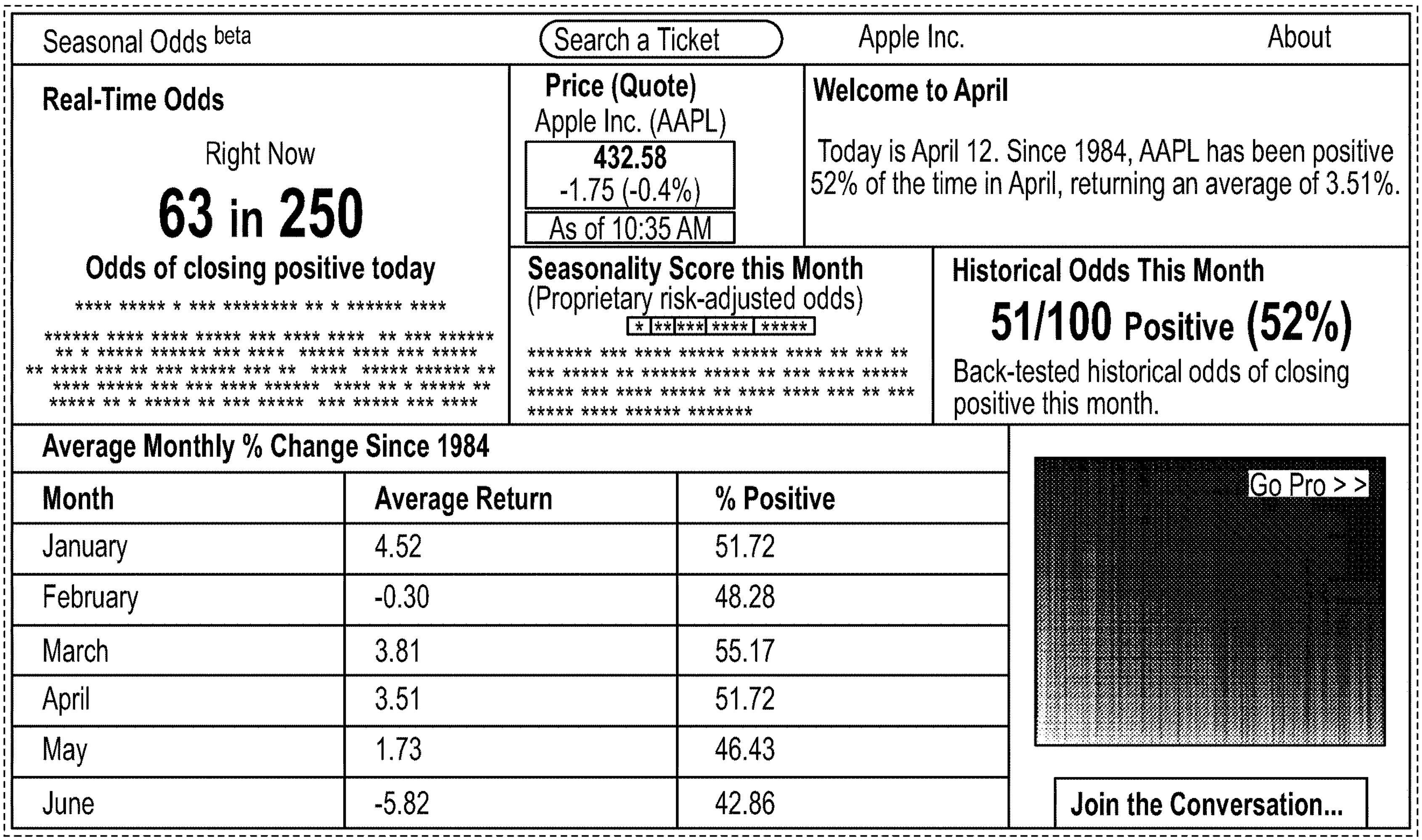
Figure 11B:
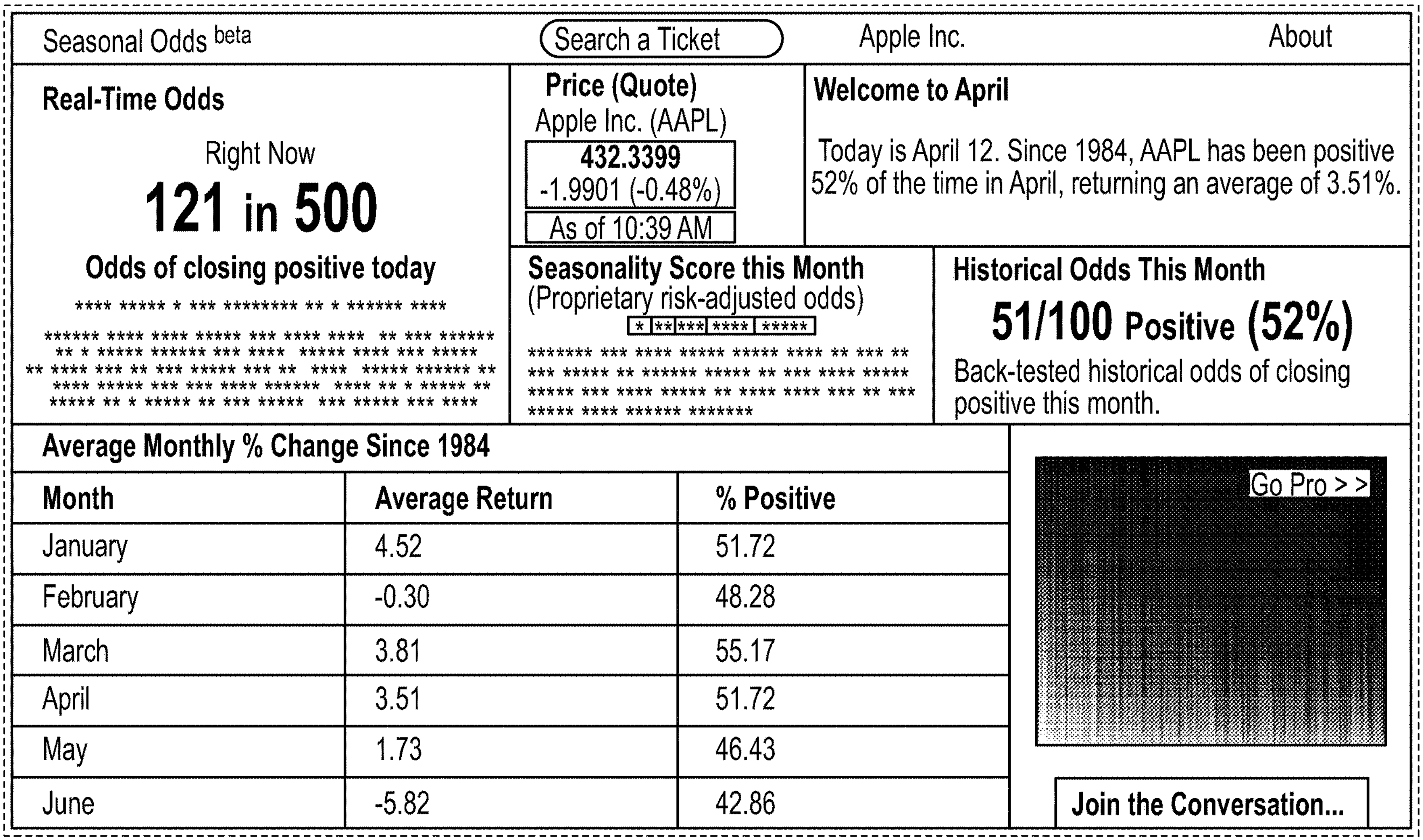
Figure 11C:
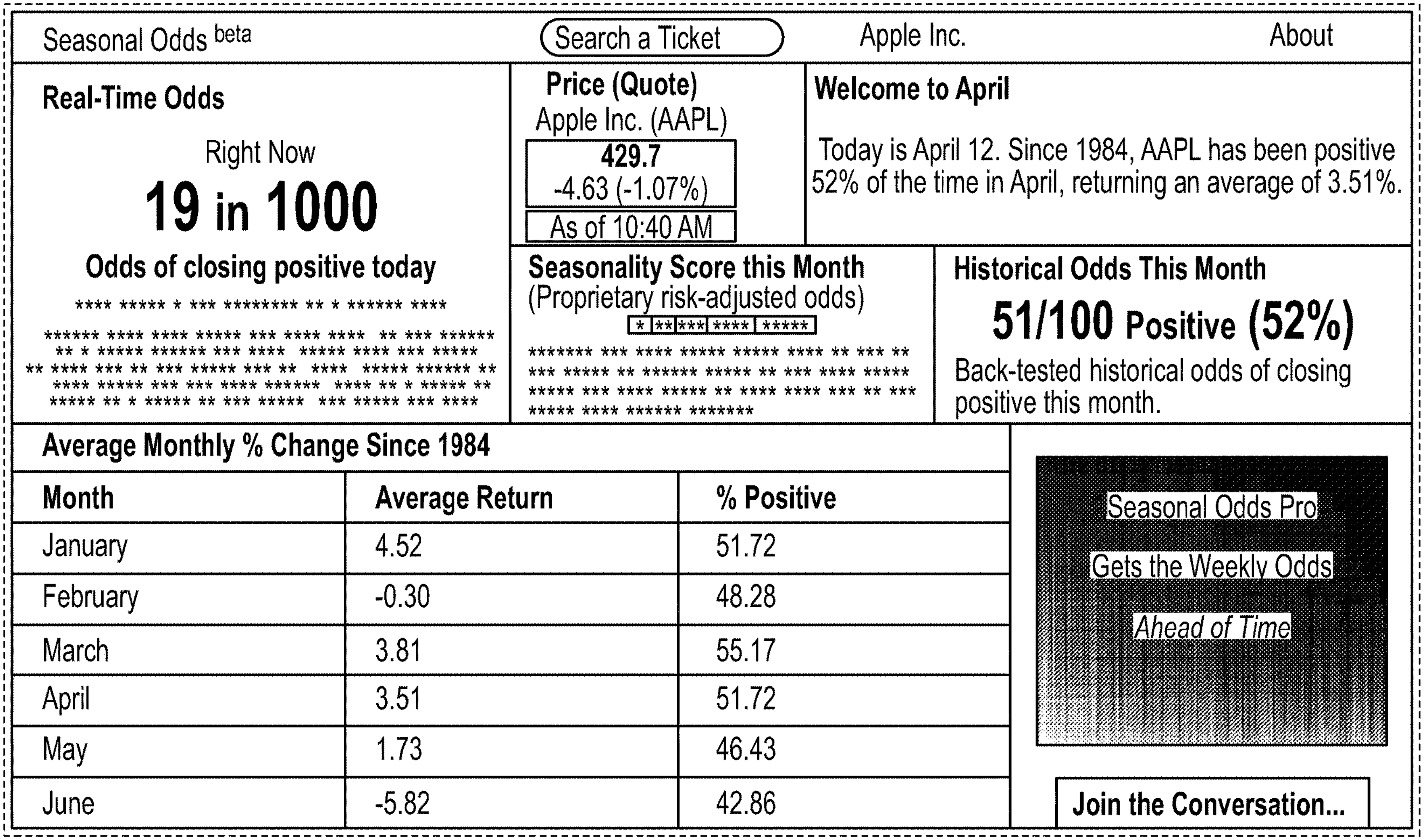
Figure 11E:
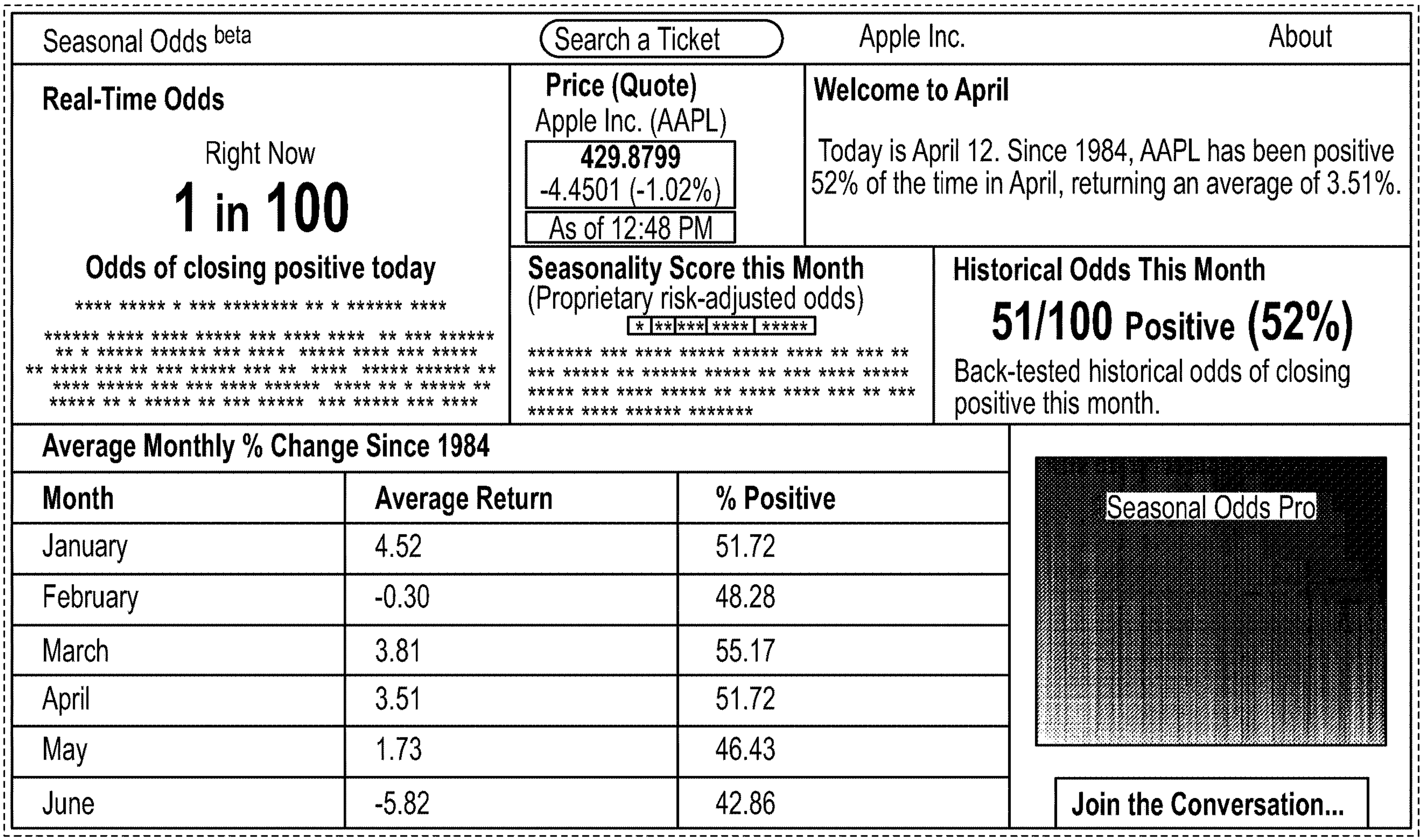
Figure 11H:
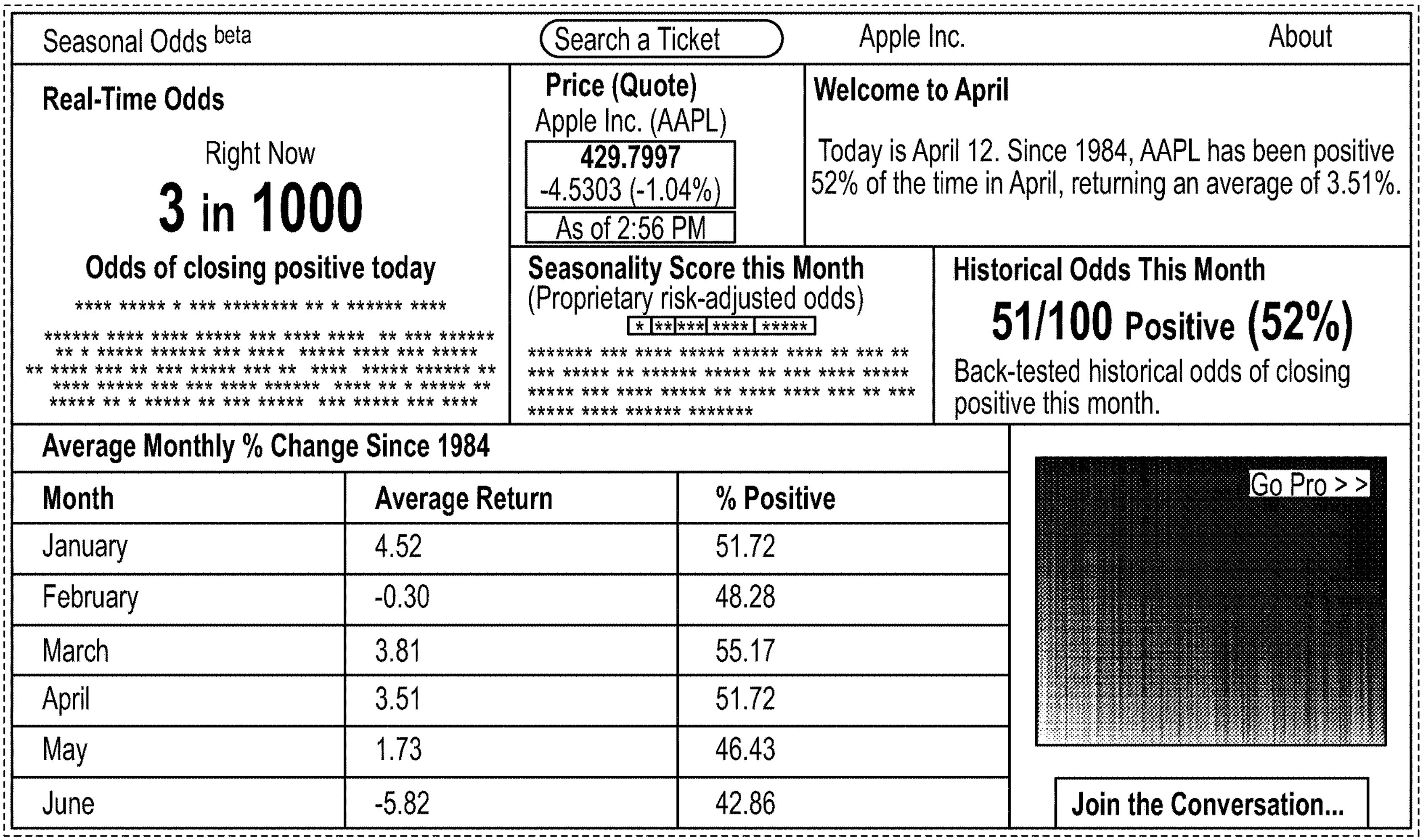
Figure 11J:
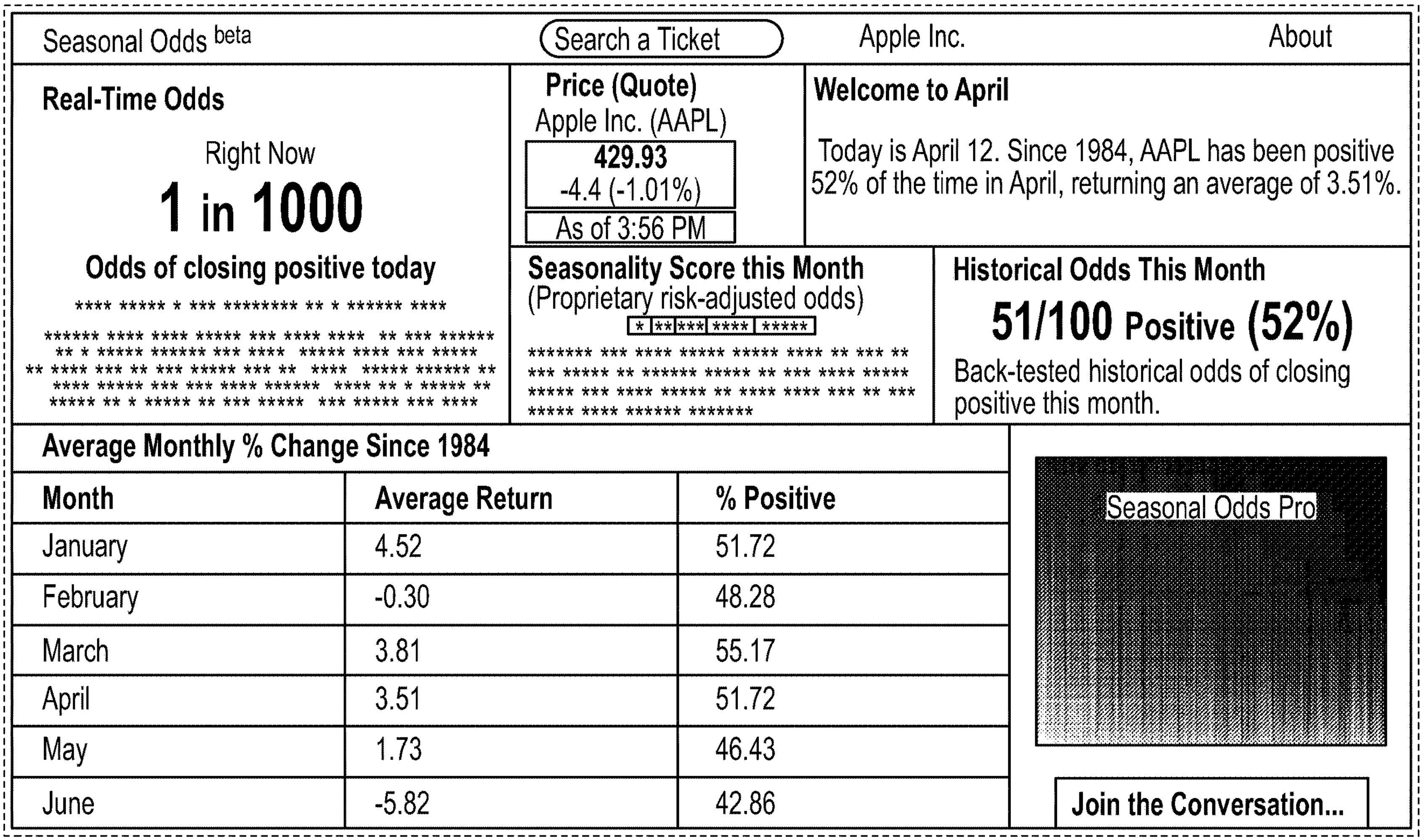

Referring to FIG. 11A, in some embodiments a financial instrument's probability of closing positive over a given trading session or a given time period (such as calendar weeks and/or months) may be provided. For example, a seasonality score may provide a ranking indicating a likelihood of closing positive and/or some metric of a financial instrument's typical gain or loss over a given trading session or a given time period (such as calendar weeks and/or months). This may be represented as a graphical rating or ranking (e.g., a '5 star' rating scale or other graphical indicators).

Figure 12:
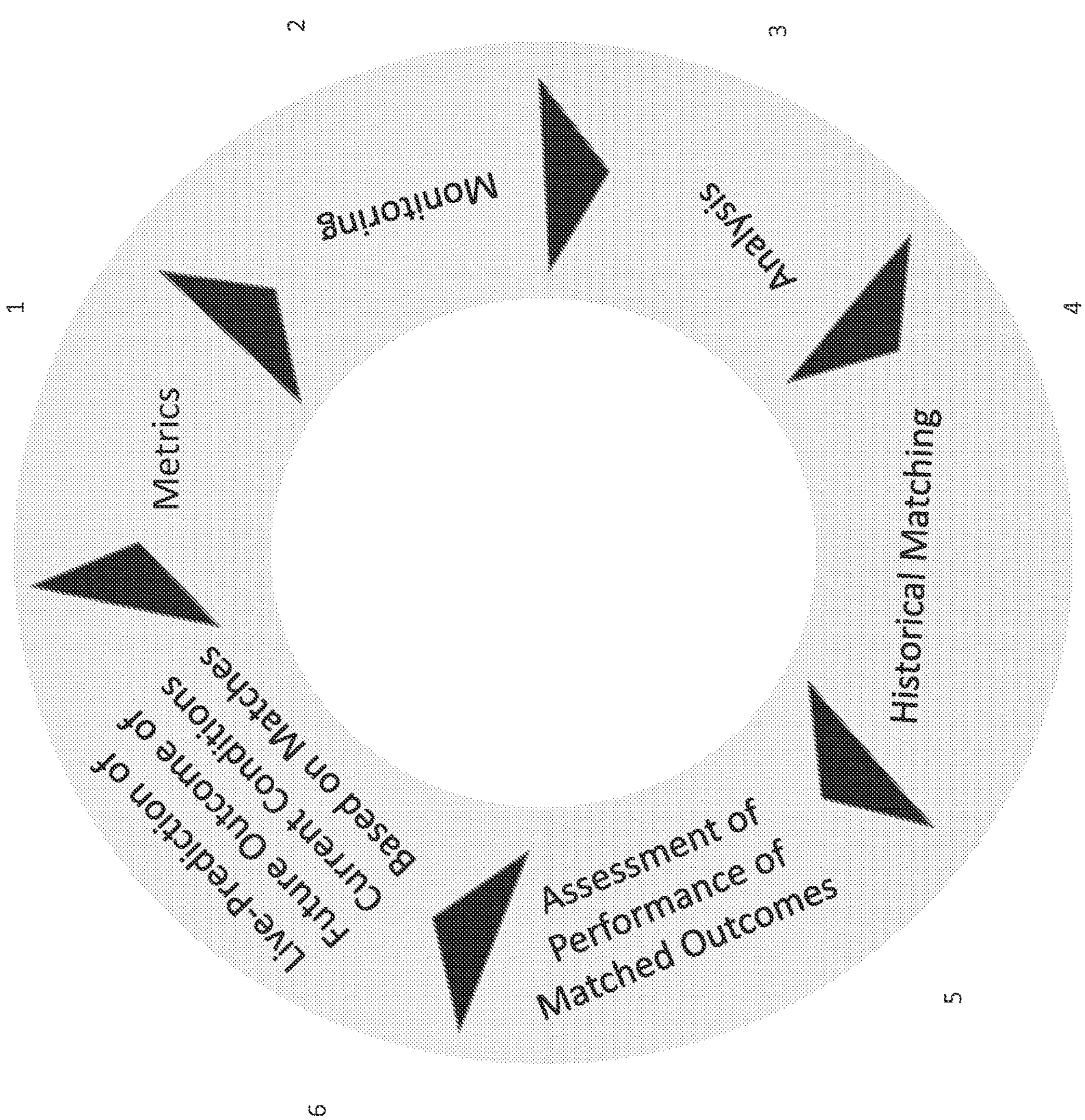
FIG. 12 depicts a process flow for a method of financial instrument attribute prediction, in accordance with an embodiment of the present disclosure.
Figure 13A:
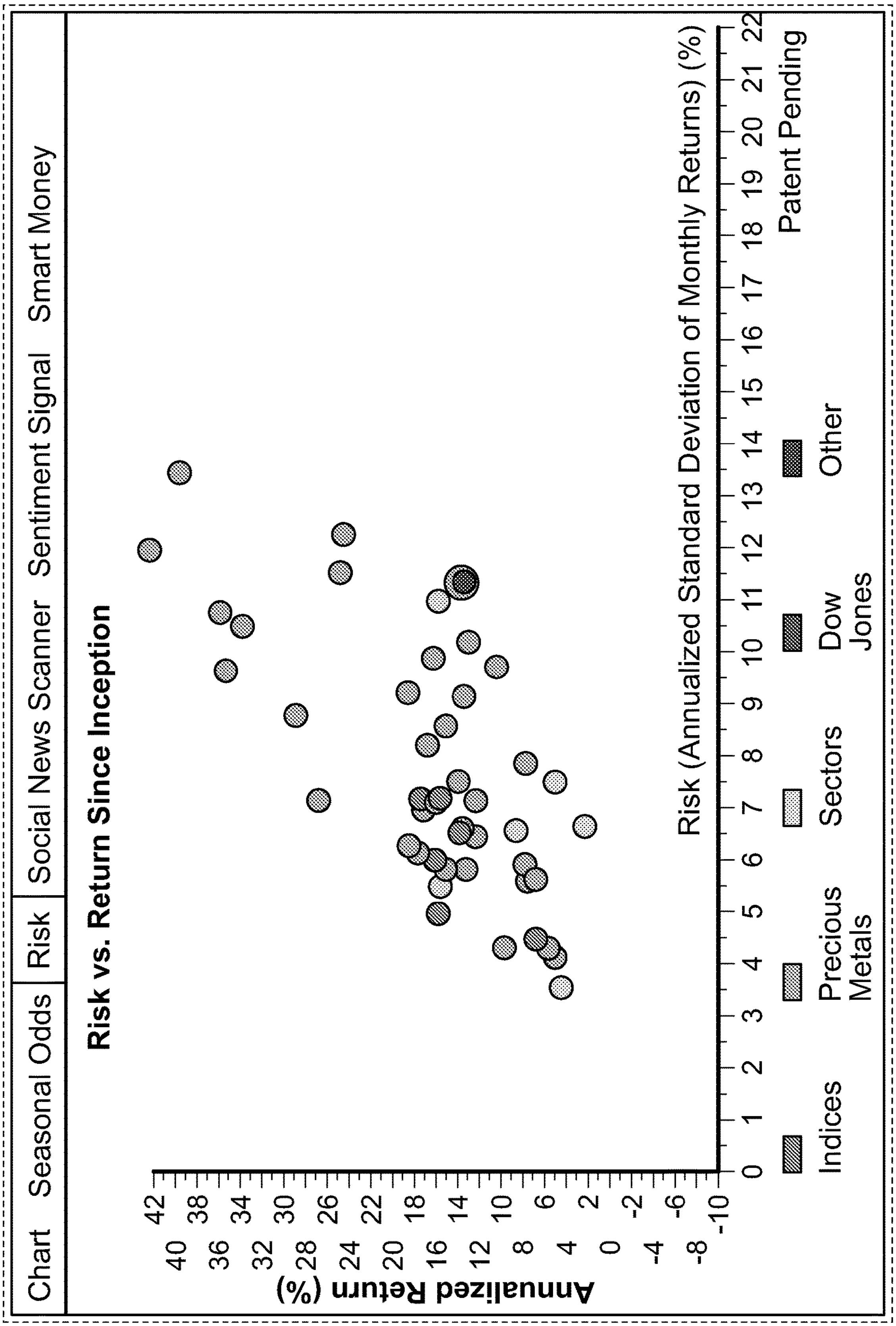
FIGS. 13A-13D depict a user interface for financial instrument visualization, in accordance with an embodiment of the present disclosure.
Figure 13B:
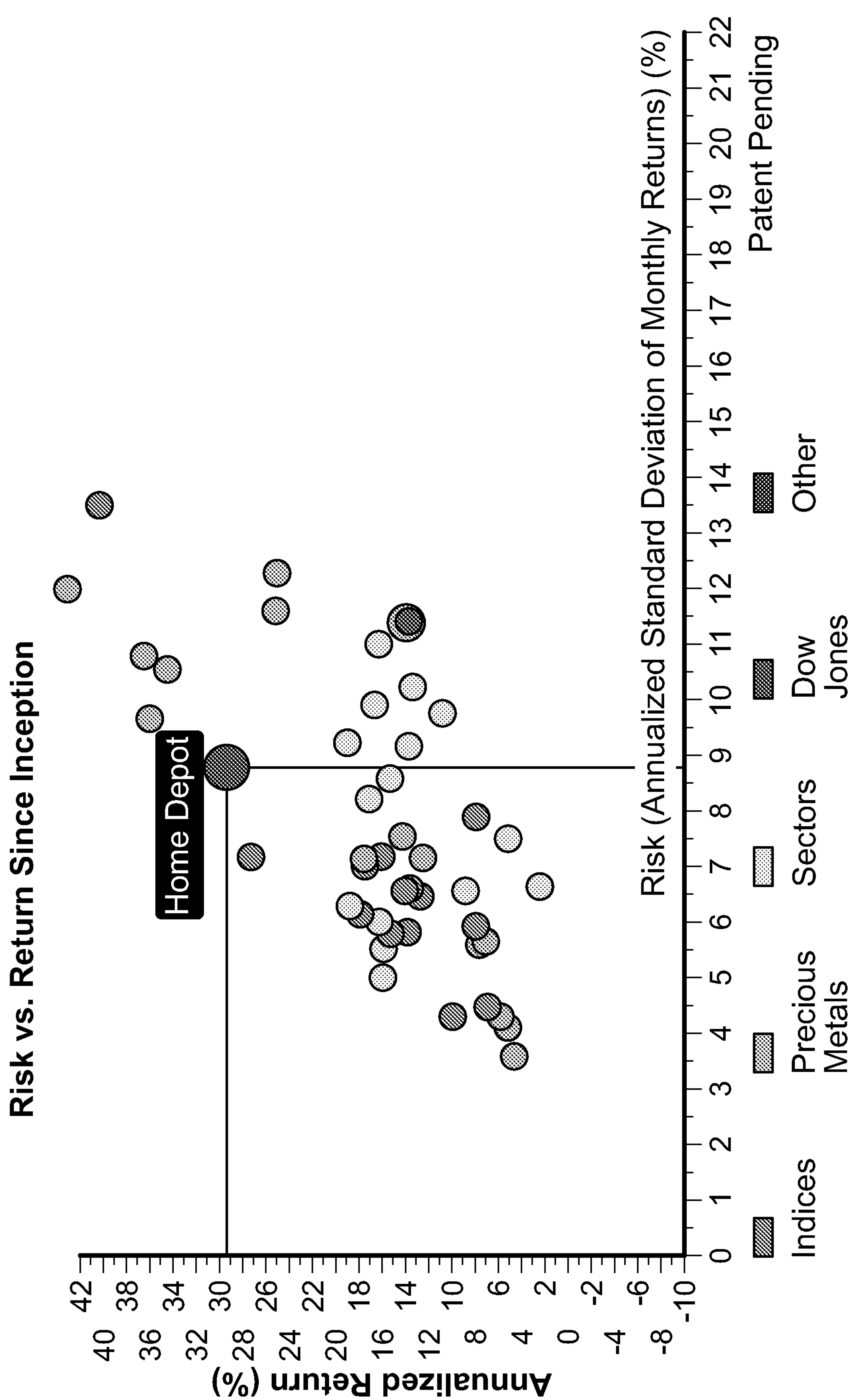
Figure 13C:
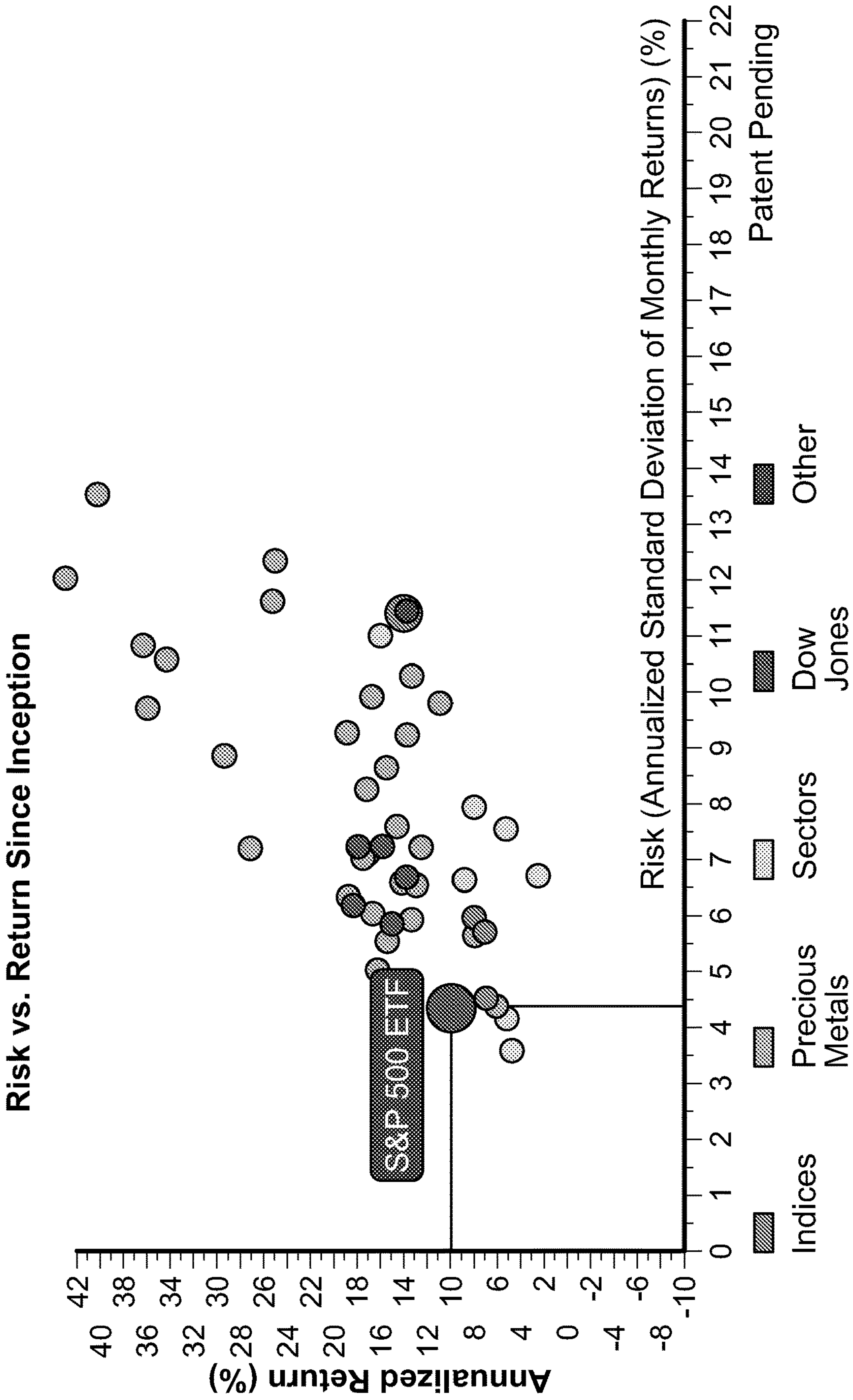
Figure 13D:
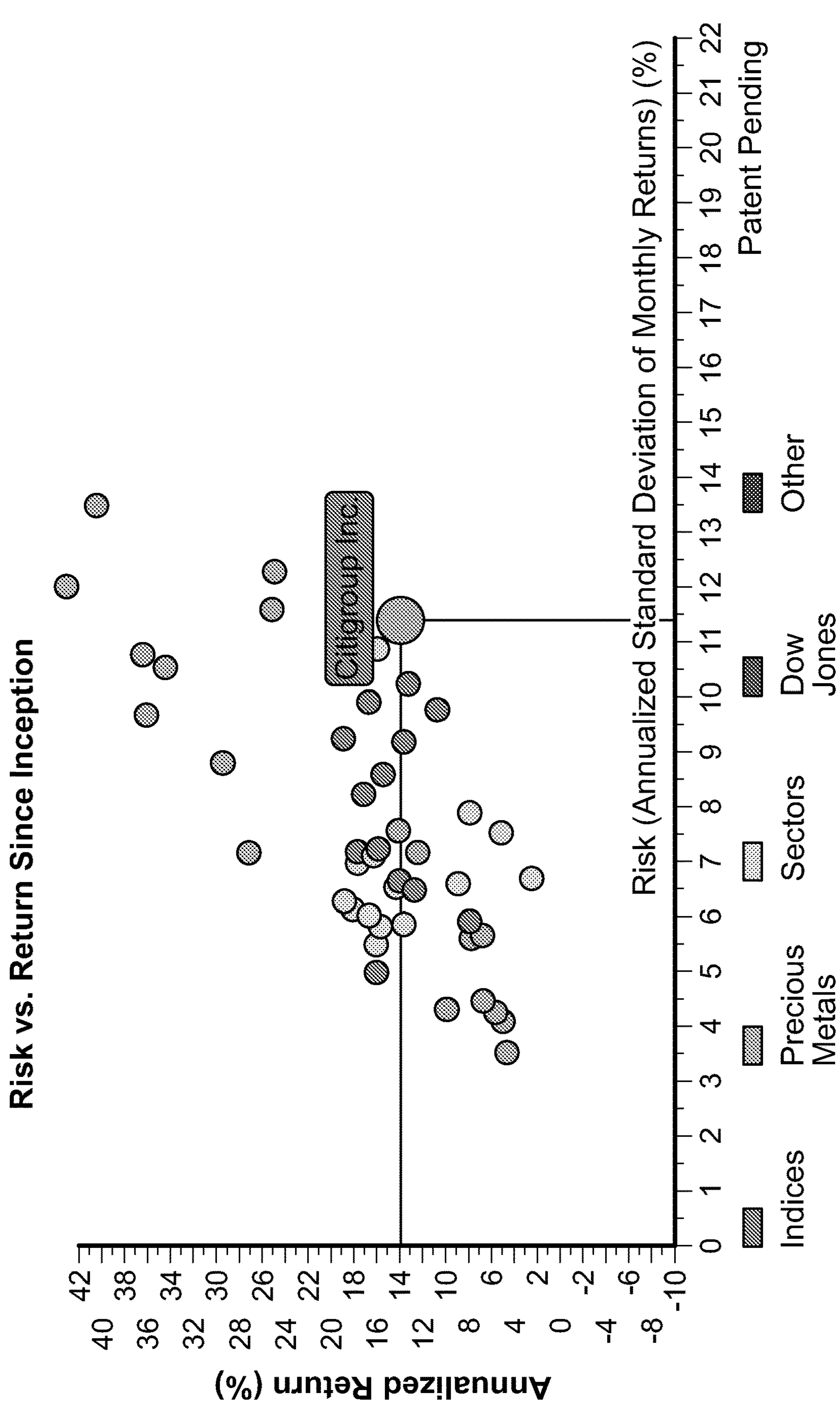

FIG. 12 depicts a process flow for a method of financial instrument attribute prediction, in accordance with an embodiment of the present disclosure. As illustrated, at step one metrics may be gathered (e.g., average historical performances for a market and/or financial instrument). At step two monitoring of one or more financial instruments may be performed. At step three analysis of real time market inputs may be performed. At step four historical matching may be performed. Correlation may be used to expand a sample size beyond a population of financial records for a specific financial instrument to include other financial instruments whose price historically correlates to the specific financial instrument. Historical records may be weighted based on a similarity to current real time market conditions (e.g., price of a financial instrument, minutes left in a trading day, volume, and other factors). Historical records for other financial instruments may also be weighted based on a correlation to a specific financial instrument being analyzed. At step 5 the matched historical records may be assessed to identify the historic outcome of one or more financial instruments. Historic outcomes may be averaged, weighted or otherwise processed. A prediction of the specific financial instrument being analyzed may be generated. The prediction may be made in real time, periodically, in response to a user command or event or at specified times. Such a prediction may be updated in real time based on changing market conditions, news information, or other factors. Predictions may be posted on a user interface (e.g., a web page), sent via an electronic message, or otherwise provided to a user.

Figure 40:
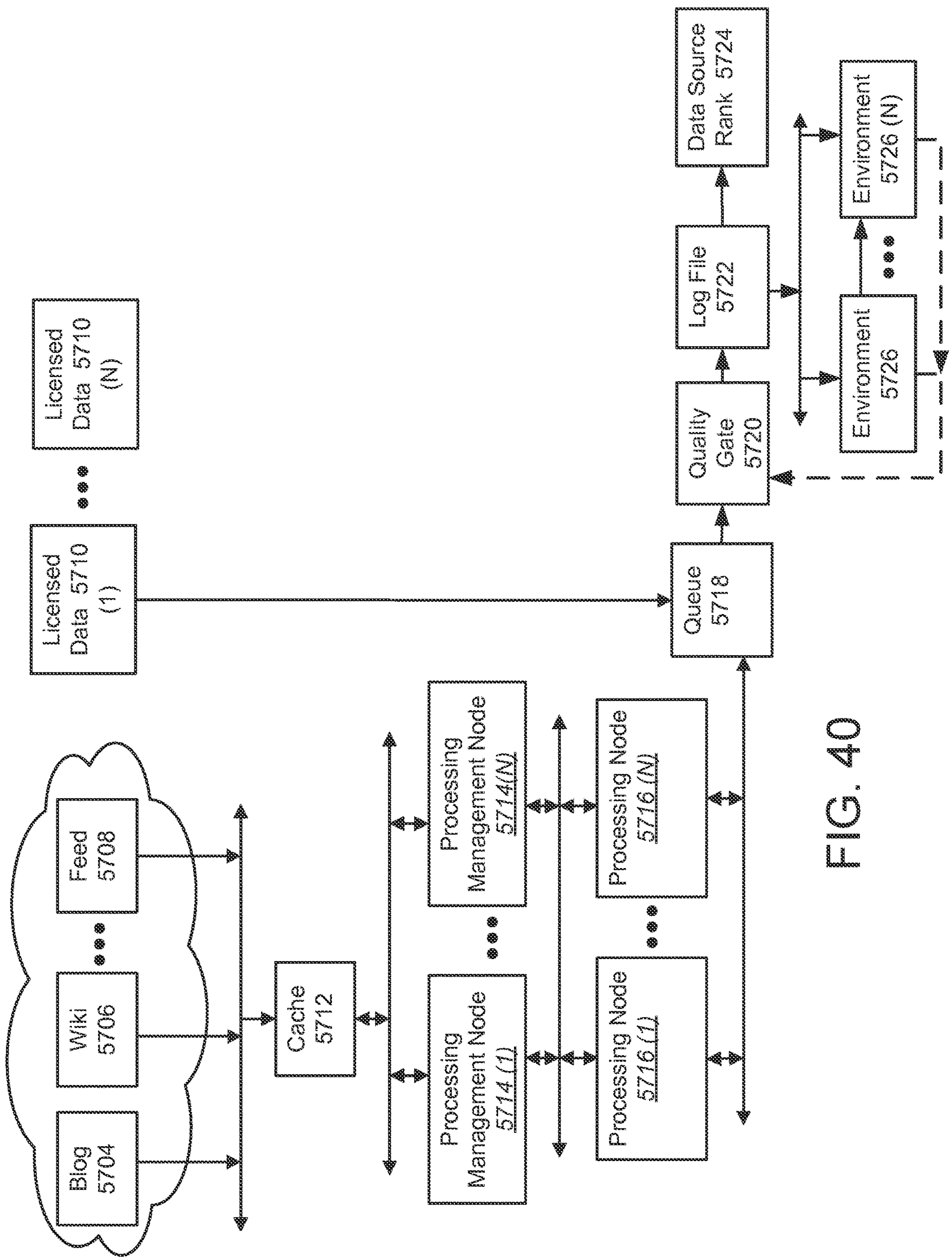
FIG. 40 depicts a platform for correlation of non-asset metrics to asset prices and metrics, in accordance with an embodiment of the disclosure.

FIG. 40 depicts a platform for correlation of non-asset metrics to asset prices and metrics, in accordance with an embodiment of the disclosure. As depicted in FIG. 40, sources of data for asset and/or non-asset information may include one or more public sources of data such as, for example, blog 5704, wiki 5706, and Feed 5708. For example, these sources of data may include non-asset metrics available via the internet (e.g., economic data surprises, weather anomalies, central bank statements and actions, product releases, earnings surprises, mergers and acquisitions and IPOs, corporate governance changes, regulatory approvals and denials, seasonality, etc.) According to some embodiments, data sources may be Internet based sources whose URLs are scraped. Sources of data for asset and/or non-asset information may also include licensed data 5710 (1) . . . (N) which may include, for example, licensed feeds of market asset prices, news feeds, and/or other data. Data from public sources may undergo one or more processing steps. For example, data may be cached at cache 5712. Cached data may be provided to one or more processing management nodes 5714(1) . . . (N). Cache 5712 may maintain a data structure (e.g., a list, a database, etc.) of public data sources to harvest/scrape.

Processing management nodes 5714 may distribute a workload of processing data among one or more processing nodes 5716 (e.g., load balancing processing among one or more processing nodes). Processing nodes 5716 may use one or more methods to harvest, scrape, and/or refine data. For example, processing nodes 5716 may use regular expressions (RegEx), format specific scraping (e.g., wiki specific scraping), summarizers, sentiment analysis, natural language processing, and other methods. Data may be stored as time series data.

Processed data may be fed to one or more queues (e.g., queue 5718). As illustrated, data of a known format and/or quality may be provided directed to a queue (e.g., licensed data 5710). Queued data may go through one or more quality gates 5720. A quality gate 5720 may verify one or more things such as, for example, spell checking, format consistency, existence, and numerical plausibility. In some embodiments, data may cycle through one or more quality gates a plurality of times (e.g., for a redundant quality check).

After being processed at a quality gate, changes in data may be recorded at log file 5722. Logged data may rank a data source (e.g., for quality based on an amount of processing required or errors found). After logging one or more attributes of time series data, it may be transferred to an environment (e.g., a development environment, a test environment, a staging environment, and/or a production environment.) In some embodiments, a data may be transferred to a first environment such as a development environment after one or more iterations through processing and quality gates. After subsequent iterations, data may be advanced to another environment. This may provide an opportunity to further evaluate data prior to advancement to a production environment. In some embodiments, changes to data may be distributed to a plurality of environments in a same iteration or at a same time (e.g., data changes from a highly ranked source).

According to some embodiments, correlation between events may be identified by a correlation between a first event and an asset and a correlation between a second event and an asset. Multiple studies may be linked to create associations between events based on such a correlation. For example, if a first event type (e.g., Middle East events) has a high correlation with an asset (e.g., oil), and a second event type (e.g., U.N. sanctions) has a correlation with the same asset there may be a correlation between the two event types. A first study or analysis may have been performed by a first user which may analyze a correlation between the first event type and the asset. A second study may have been performed by a second user studying a second event type and the same asset. Users may anonymously share data and/or studies with a financial analysis system and/or other users. In some embodiments, studies may be shared anonymously within a group, a company, or an organization. Data based on correlations between studies may be provided to users with whom the studies are shared.

A financial analysis system may analyze shared studies looking for correlations between studies. Such correlations between event types may be used to produce more detailed analysis and/or more accurate analysis of an asset associated with both events.

FIGS. 13A-13D depicts a user interface for financial instrument visualization, in accordance with an embodiment of the present disclosure. The user interfaces of FIGS. 13A-13D depict the risk that a user might buy the financial instrument at the wrong time of year. The X axis shows the degree of variance in the monthly returns of the ticker, where higher variance (tickers on the right half of the figure) means greater chances of buying the ticker in a month that results in a significant loss—even if the ticker is generally positive over long periods of time. The top left region of the figure is optimal: Tickers with high annual returns and low month-to-month variance in returns. The bottom right of the figure may be the worst region: Tickers with very high month-to-month variation in returns and low overall annual returns. The bottom left region and the top right region are areas that are suitable for different investment strategies: If a user can be satisfied with a lower overall return as the price of not having to worry about buying in a bad month of the year and taking a significant short-term loss, then the bottom left region is appropriate for the user. If a user can weather the month-to-month variations and not flinch at shorter term losses because the user is willing to ride the stock to higher overall long term returns, then the top right region is more suitable for the user. User interfaces 13A-13D may provide an ability to search on one or more financial instrument attributes (e.g., a ticker symbol, a price range, a risk range, etc.). User interfaces 13A-13D may provide functionality to generate reports for one or more financial instruments and to set alerting and notification options for one or more financial instruments (e.g., based on a floor parameter, a ceiling parameter, or other metrics). According to some embodiments, a user may specify criteria to monitor and such criteria may change a focus or zoom of a user interface. For example, a floor of a minimum amount of return may be specified and a ceiling of a maximum amount of risk may be specified. A user interface may depict a scatter plot and the scatter plot may depict financial instruments that fall within the specified criteria at the present time in the market. Such a user interface may update in real time, periodically, or in response to a specified event or user command. A dynamically updating interface may reflect financial instruments that move into a range of specified criteria and financial equities that fall outside of the specified criteria may be removed from display. A user may be able to specify specific financial instruments to exclude, specific financial instruments to include, market indices to chart and other market data to track. Financial instruments to include or exclude may also be identified by specifying specific factors (e.g., minimum volume for a financial instrument, maximum volatility for an instrument, a market sector, etc.) A user interface may be capable of displaying trend lines for one or more financial instruments during a market day or over a longer historic period.

According to some embodiments, a plurality of financial instruments may be listed alongside an average rate of return for a month for each of the plurality and a percentage of time each of the plurality closed positive, as well as the number of observations or the length of the observation period (e.g., 29 years), as well as other summary statistics, such as Max/Min values or other liminal values. The timeframe may be a current month, a past month, a current quarter, a past quarter, a current week, a past week, a current or past year, or another specified period. The plurality of financial instruments may be selected (e.g., displayed based on specified search criteria), ordered by rate of return, ordered by percentage of time positive, ordered by the number of observations, and filtered (e.g., to exclude financial instruments below a floor, above a ceiling, or meeting a specified threshold). Other financial instrument ratings may be displayed (e.g., risk, current market price, etc.)

In some embodiments, market news and triggers may be displayed (e.g., political events, earnings events, holidays, elections, industry events, sector events, economic indicator events, etc.). A plurality of financial instruments may be selected (e.g., displayed based on specified search criteria), ordered by rate of return following an event or series of events, ordered by percentage of time positive following an event or series of events, and filtered (e.g., to exclude financial instruments below a floor, above a ceiling, or meeting a specified threshold, or filtered to exclude market news events or other event triggers categorized as below a floor, above a ceiling, or meeting a specified threshold, e.g., 'Employment Reports that were positive surprises,' where a positive surprise is defined as more than 25K jobs above the consensus estimate, or 'Earnings Reports (for a given company) that were positive surprises,' where a positive surprise is defined as more than $0.50 a share above the consensus estimate, or some similar metric used during earnings reports). Furthermore, the timeframe of the universe of event triggers sampled (e.g., Employment Reports or Earnings Reports) may be constrained by the user to only include a current month, a past month, a current quarter, a past quarter, a current week, a past week, a current or past year, or another specified period, and the user may constrain the timeframe of the universe of event triggers sampled via user interfaces such as a slider or a dropdown menu. Furthermore, the timeframe of the rate of return following an event or series of events sampled may be constrained by the user to only include a number of seconds or minutes following the occurrences of the event, only the first trading days on or following the occurrences of the event, only the first two trading days on or following the occurrences of the event, or only some specific number of trading days, weeks, or months, trading days on or following the occurrences of the event, and the user may constrain the timeframe of the rate of return following an event or series of events sampled via user interfaces such as a slider or a dropdown menu.

In some embodiments, a scoring request may be received. A scoring request may be a set of identifiers that map to a set of varying time series, as well as filters through which time series data is passed. These filter functions may process time series data and produce a second time series. For example, a filter function using a financial instrument ticker (e.g., "AAPL") and compare it to a closing price (e.g., "AAPL>500"). This filter function may return a list of dates (time series of events) which correspond to days where AAPL closed above 500. A time series may be associated with multiple filter functions. Each combination of time series data and a filter function may be sent to a compute node based on a routing algorithm. Routing may be handled by a mixer node (e.g., mapping). The new time series data computed from the original time series and the filter function (e.g., the reduced data) may be gathered from each compute node. Multiple sets of generated time series data may be collected and merged on or more nodes to form final result.

Figure 41:
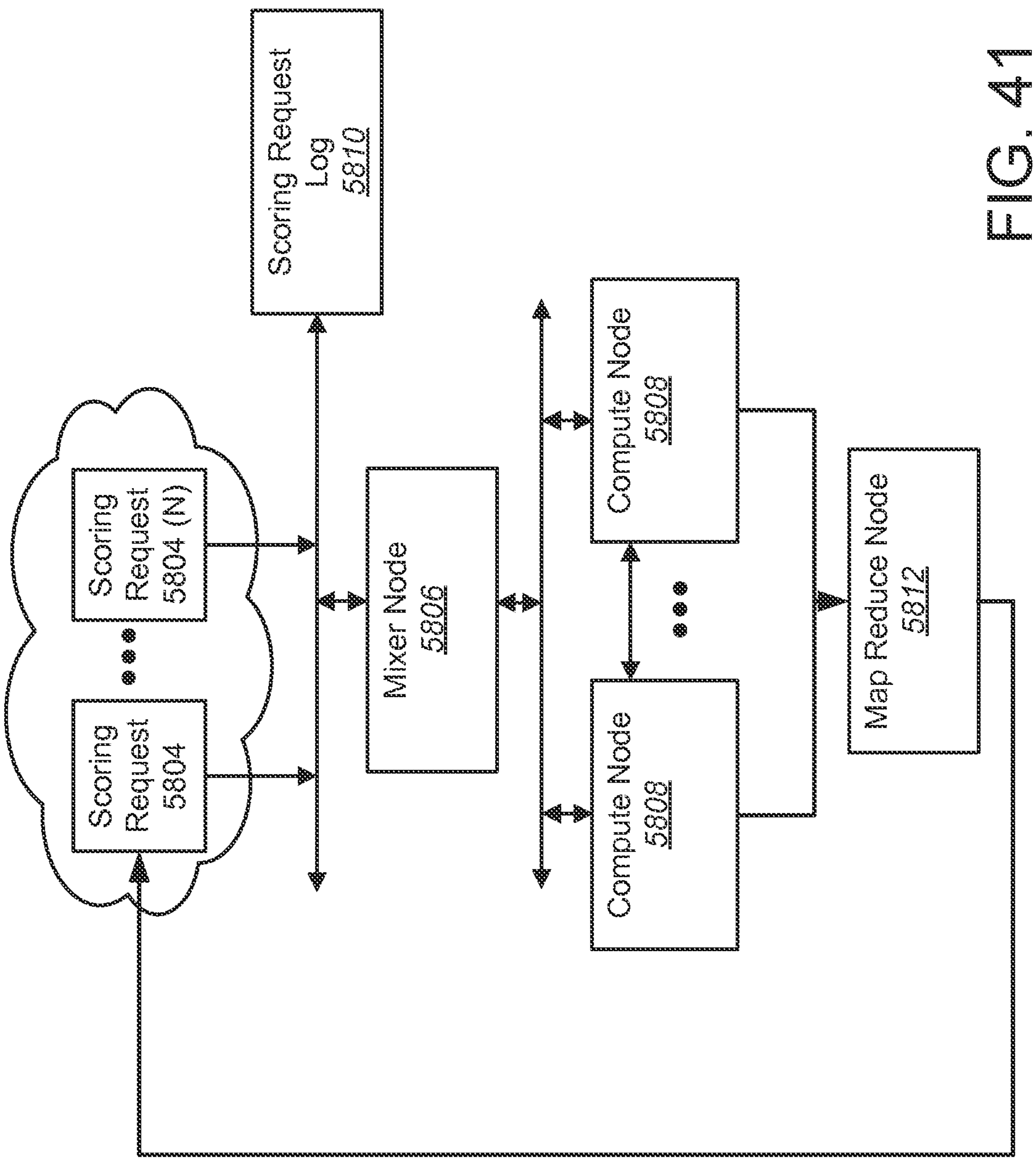
FIG. 41 depicts a platform for dynamic resharding of data based on demand, in accordance with an embodiment of the disclosure.

FIG. 41 depicts a platform for dynamic resharding of data based on demand, in accordance with an embodiment of the disclosure. In some embodiments, based on day-to-day demand for time series data (stocks, metrics, events, etc.), the distribution of such data may be rebalanced across compute nodes (CNs). For example a mixer node 5806 may receive a scoring requests 5804 from users/automatic queries, etc. Scoring requests 5804 may include a set of identifiers that map to a set of varying time series, as well as filters through which time series data is passed. These filter functions take in a time series, and produce a second time series. Scoring requests may be logged (e.g., scoring request log 5810) to gather statistics on the scoring requests.

Mixer node 5806 may create time series function pairs. Compute nodes 5808 may score the results and send the results to a map reduce node 5812. The merged results may be sent from map reduce node 5812 to a requester (e.g., an automated process or a user).

In some embodiments, desired rebalancing can be calculated by taking into account one or more factors. Factors may include, for example:

A. Historical demand (e.g., on average, most people ask for X 40 times as often as the canonical time series);

B. Short term information (e.g., Sudden bursts of demand, e.g. GOOG split causes increased interest in Google's stock data); and C. Anticipated demand (e.g. Google will be splitting tomorrow, so we should plan for increased demand. Fed announcement tomorrow, which typically implies XI and X2 time series having higher demand).

Actual rebalancing may consist of peer to peer sharing of data across compute nodes. For example, a mixer node may a message to one or more compute nodes telling the node the data sets it should add or remove, and each compute node can advertise (e.g., in a peer to peer file sharing protocol), for the datasets it needs. These datasets may be downloaded from multiple sources to ensure fast rebalancing.

Figure 17:
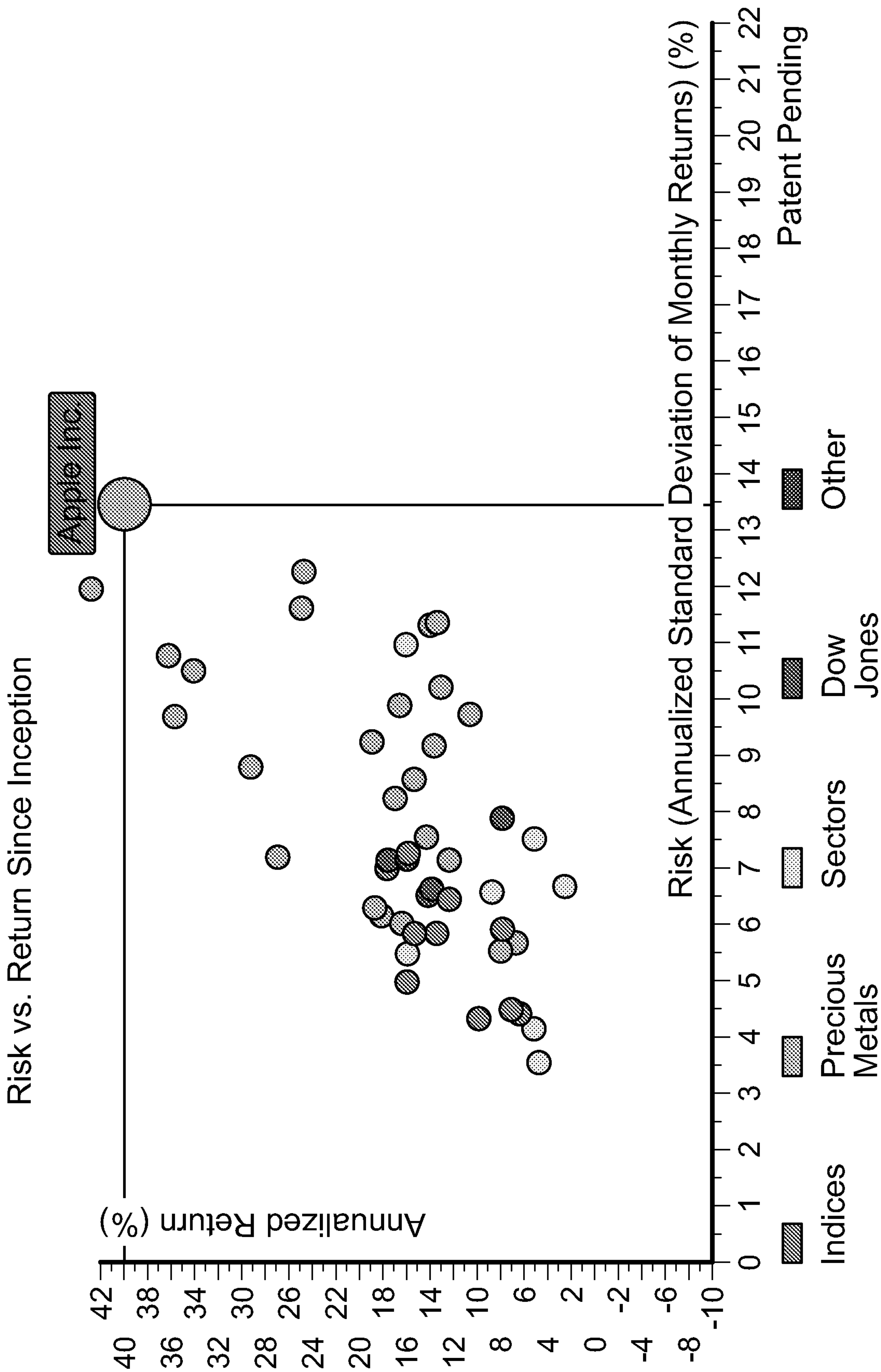
FIG. 17 depicts a user interface for evaluating the performance of a financial instrument, in accordance with an embodiment of the present disclosure.

FIG. 17 depicts a user interface for evaluating the performance of a financial instrument, in accordance with an embodiment of the present disclosure. In some embodiments, a user may have the ability to select a financial instrument data point on a visualization via some user-input interaction, such as a 'hover over,' and the financial instrument data point might animate in some way, such as become larger, in order to more clearly visualize its location and/or relative position on the visualization. Other interactive animations may include extending lines horizontally and vertically from its position on the visualization to the spots on the X and/or Y axis that it intersects (e.g., where the X and Y axis are metrics that instrument risk and return, and/or financial Alpha and Financial Beta, and/or some combination of the above), in order to more clearly visualize a location and/or relative position on the visualization of a financial instrument. In a further embodiment, an interactive animation might also result in the visualization of key data or attributes associated with the financial instrument data point, such as its name, its 'value' along the X axis, its 'value' along the Y axis, (e.g., where the X and Y axis are metrics that instrument risk and return, and/or financial Alpha and Financial Beta, and/or some combination of the above), the sector to which it belongs, its market capitalization, as well as other attributes of the financial instrument.

Figure 18:
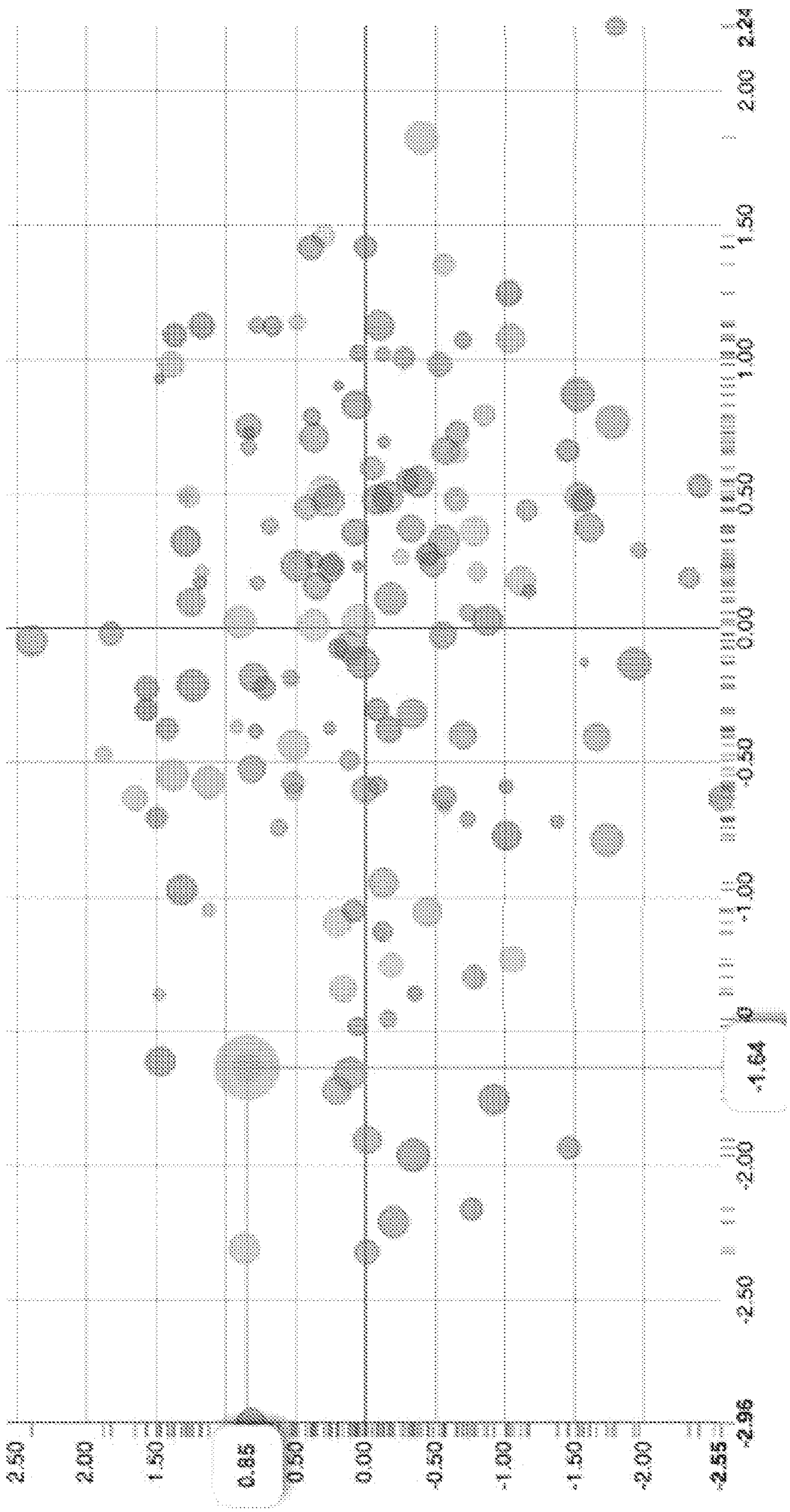
FIG. 18 depicts a user interface for evaluating the performance of a financial instrument, in accordance with an embodiment of the present disclosure.

FIG. 18 depicts a user interface for evaluating the performance of a financial instrument, in accordance with an embodiment of the present disclosure. According to some embodiments, FIG. 18 may represent a zoomed in or focused view of a scatterplot diagram. A user and/or a system may change a scale of X and/or Y axis (a "zoom in/zoom out function"), where the X and Y axis may be metrics that instrument risk and return, and/or financial Alpha and Financial Beta, and/or some combination of the above. In some embodiments, as the user and/or system to changes the scale, (e.g., 'zooms in' or 'zooms out', of the X and/or Y axis) the system may dynamically populate the visualization with more or fewer instruments (e.g. interactive and/or non-interactive data points) at these different levels or 'resolution' or 'zoom'. In another embodiment, a user may have the ability to select (for example through a click, or a click and drag, or a tap, or a pinch motion, or some other hand-gesture, or a speech command) a region to zoom in and out of, with the resulting above-described consequences, functionalities, and features. A visualization interface may be repopulated in response to a user or system command to change focus. A visualization interface may also be repopulated in real time based on changed in market data, news, and other conditions. A user may specify inputs for a visualization interface (e.g., display top 100 data points within a specified risk and return range ordered by trading volume, current market price, or other criteria). Zooming in may cause more data points to meet a threshold (e.g., make a top 100 list) and to become visible.

Figure 19:
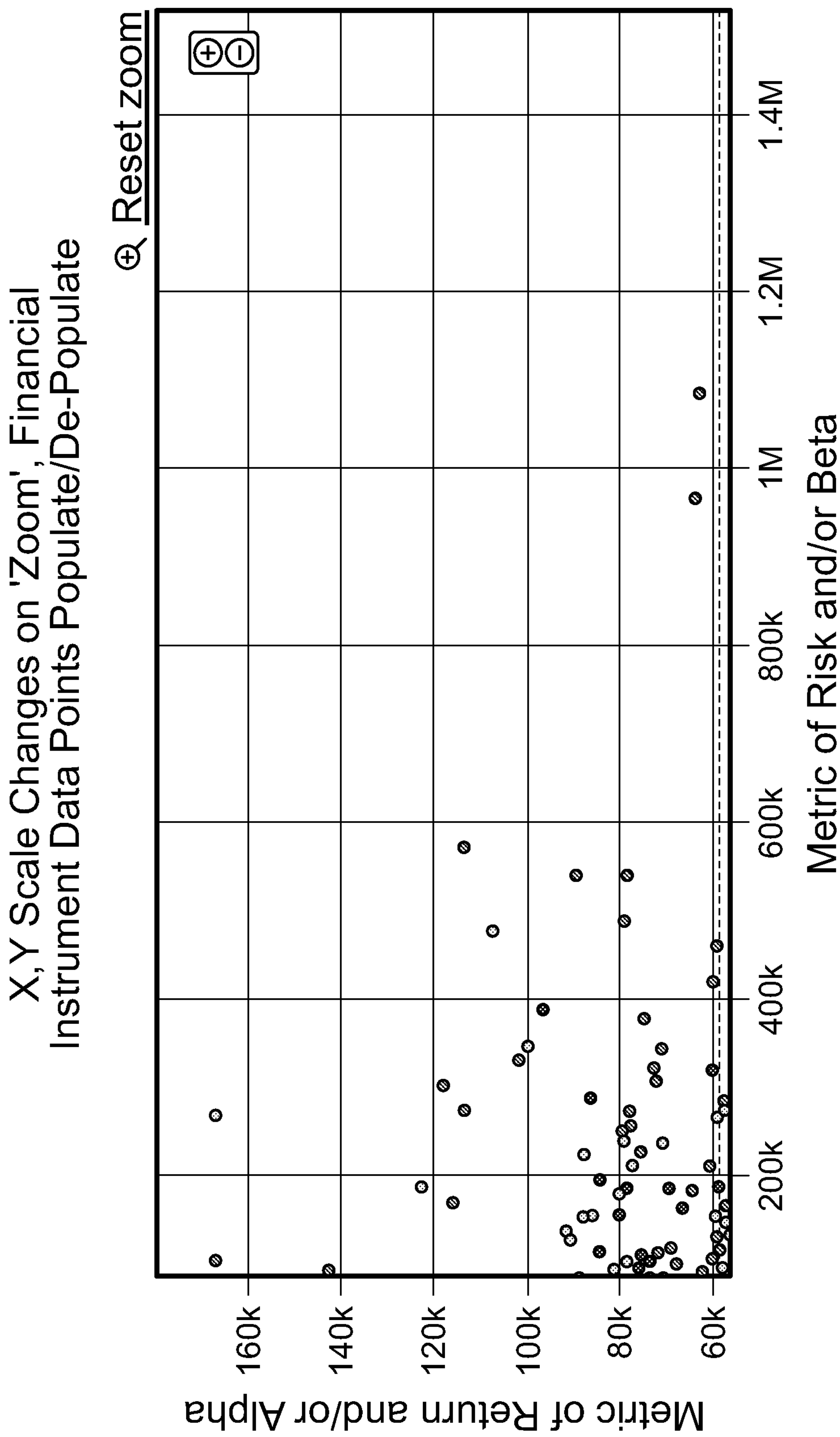
FIG. 19 depicts a user interface for evaluating the performance of a financial instrument, in accordance with an embodiment of the present disclosure.

FIG. 19 depicts a user interface for evaluating the performance of a financial instrument, in accordance with an embodiment of the present disclosure.

Figure 20:
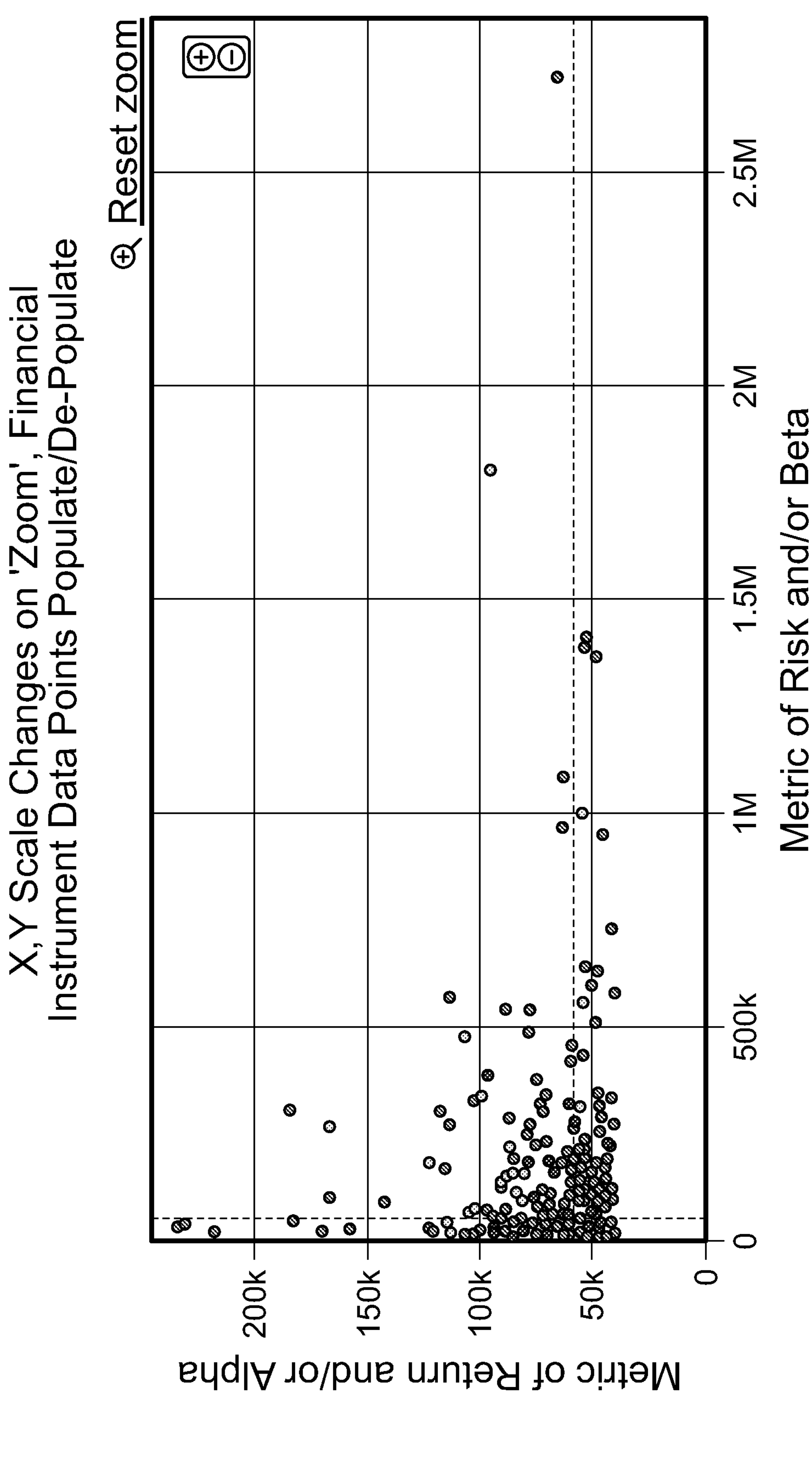
FIG. 20 depicts a user interface for evaluating the performance of a financial instrument, in accordance with an embodiment of the present disclosure.

FIG. 20 depicts a user interface for evaluating the performance of a financial instrument, in accordance with an embodiment of the present disclosure. A user may be able to select or deselect one or more financial instruments by name to layer onto or off the above visualization. A user may also be able to view a visualization and deselect and select financial instruments (e.g., by clicking on a financial instrument and specifying delete or filter to remove it from display). A user may be provided a drop down, a query box, a list or other user interface control to add financial instruments to a display. A user may also be able to view a ranking of financial instruments based on specified criteria and then may be able to customize a ranking so that certain instruments are added to or removed from a visualization.

In some embodiments, a user or system may be able to select or deselect one or more types/categories/classes/attributes of financial instruments to layer onto or off the visualization. For example, types/categories/classes/attributes of financial instruments might include, but are not limited to, sector, market capitalization (such as the distinction between large market capitalization and small market capitalization financial instruments) beta (such as the distinction between high beta and low beta financial instruments); volatility (such as the distinction between high volatility and low volatility financial instruments); volume (such as the distinction between high volume and low volume financial instruments); absolute price (such as the distinction between high absolute price and low absolute price financial instruments); book-to-market ratio (such as the distinction between high book-to-market and low book-to-market financial instruments); 'growth' versus 'value' (such as the distinction between 'growth stocks' and 'value stocks'). In one or more of the above, 'high' and 'low' and 'large' and 'small' can be defined by outside external definition or source and/or distinctions such as quintiles and quartiles relative to the financial instrument's class, dynamically calculated by the system and/or imported from an outside external definition or source; and/or some threshold inputted by the user into the system and/or some other analysis carried out by the system itself.

According to some embodiments, visualizations might use coloring or shading to label/classify/identify financial instrument data points by types/categories/classes/attributes of financial instruments. Types/categories/classes/attributes of financial instruments might include, but are not limited to, asset class, instrument type, geography, market capitalization, beta, volume, volatility, absolute price, and Book-to-Market Ratio. A visualization system might use slices of multiple colors on a financial instrument data point to indicate that the data point belongs to more than one set of types/categories/classes/attributes.

Figure 21:
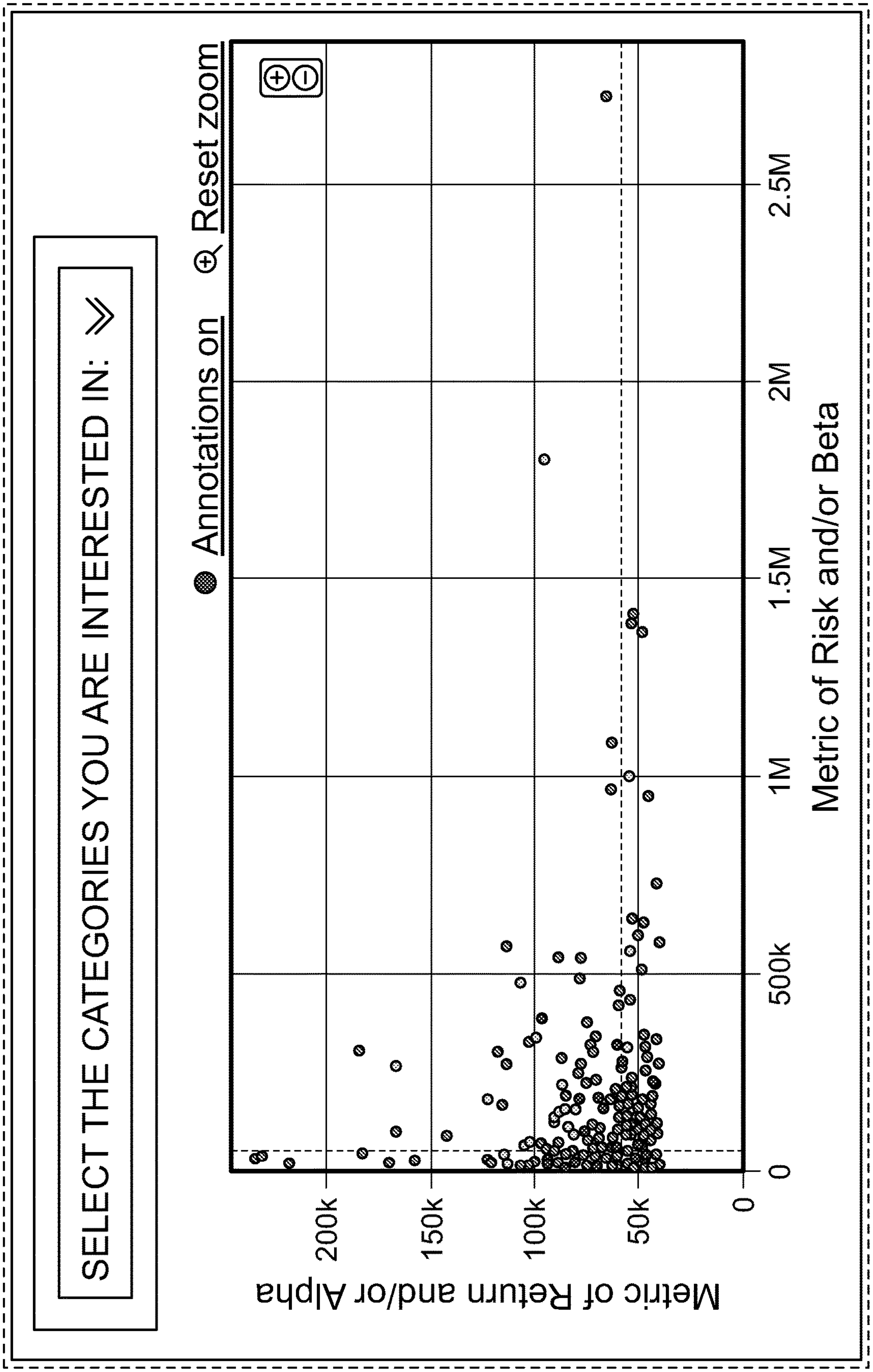
FIG. 21 depicts a user interface for evaluating the performance of a financial instrument, in accordance with an embodiment of the present disclosure.

FIG. 21 depicts a user interface for evaluating the performance of a financial instrument, in accordance with an embodiment of the present disclosure. According to some embodiments a user or a system may be able to select or deselect one or more financial instruments by name or by types/categories/classes/attributes of the financial instruments to layer onto or off the visualization. For example, a user interface control may be provided via a drop down menu, radio buttons, spinners, combination boxes, or other user input controls. Financial instrument data points may populate and/or de-populate in response to a selection.

Figure 22:
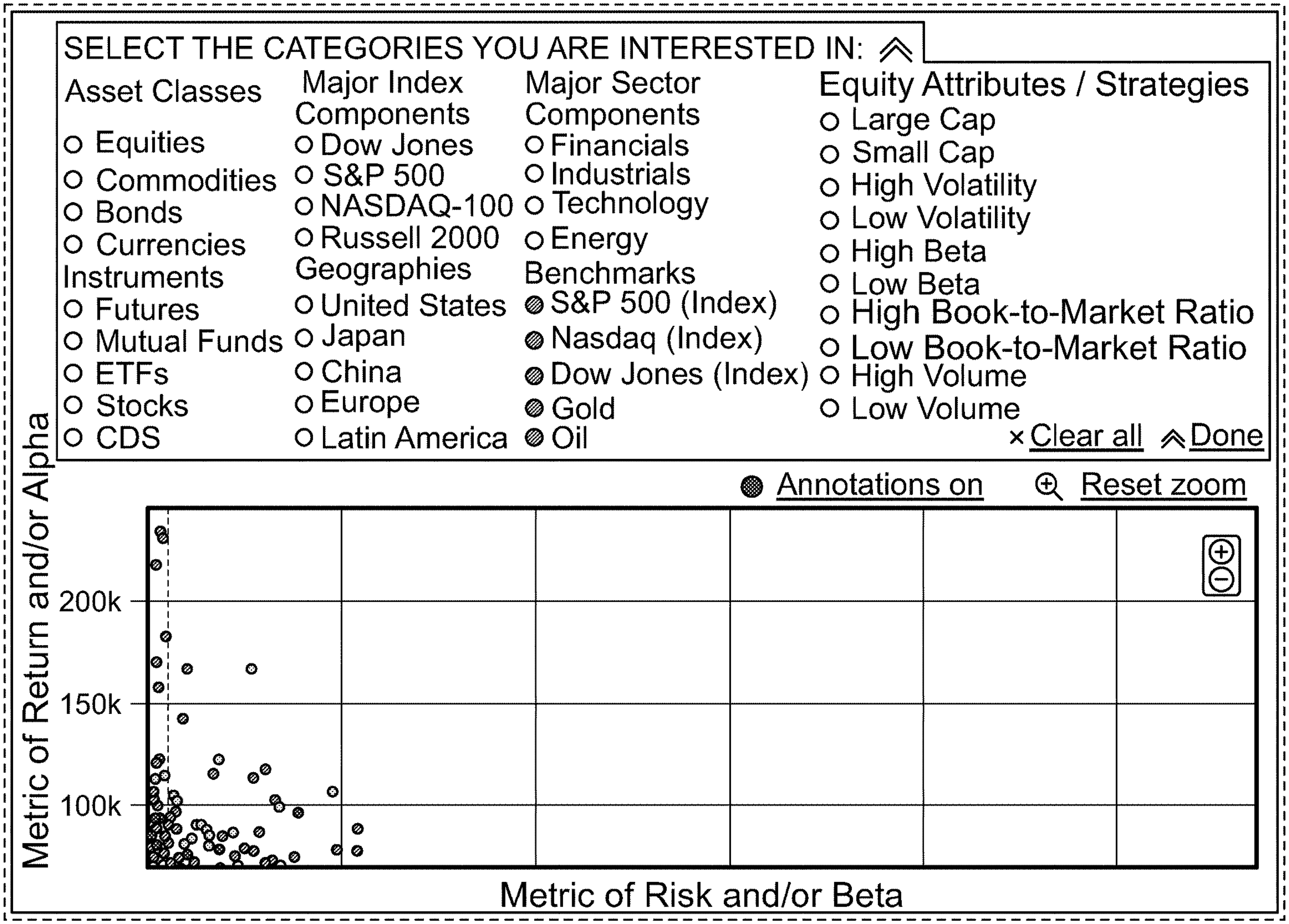
FIG. 22 depicts a user interface for evaluating the performance of a financial instrument, in accordance with an embodiment of the present disclosure.

FIG. 22 depicts a user interface for evaluating the performance of a financial instrument, in accordance with an embodiment of the present disclosure. According to some embodiments a user or a system may be able to select or deselect one or more financial instruments by name or by types/categories/classes/attributes of the financial instruments to layer onto or off the visualization. For example, asset classes may include equities, commodities, bonds, currencies or other classes. A user may select one or more classes to add to a visualization. Instrument types may include futures, mutual funds, ETFs, stocks, and CDs. Index components may also be added to or removed from a visualization (e.g., Dow Jones, S&P 500, Nasdaq-100, Russell 2000, etc.). Other classes or attributes may be used to add or remove data from a visualization. Financial instrument data points may populate and/or de-populate in response to a selection.

Figure 23:
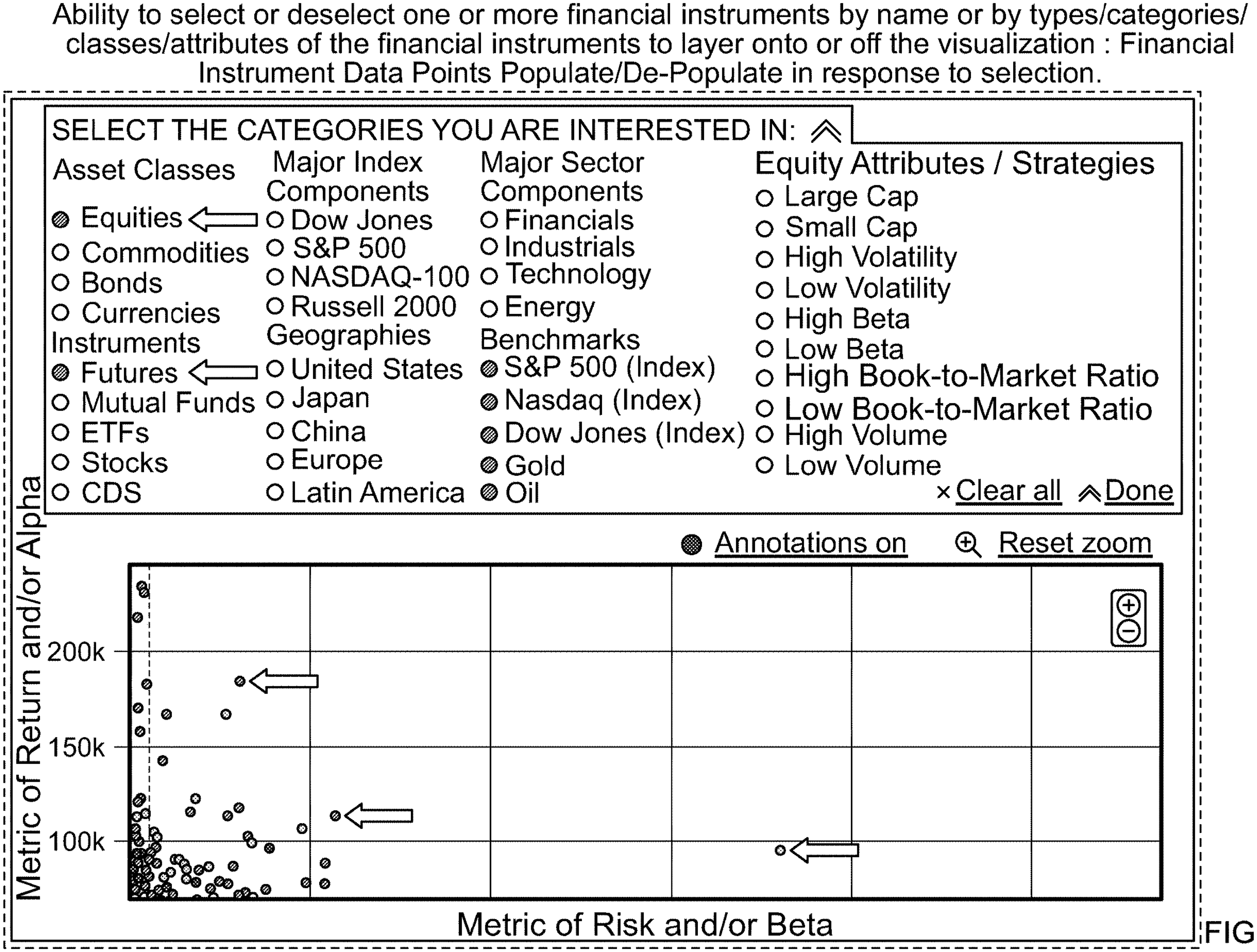
FIG. 23 depicts a user interface for evaluating the performance of a financial instrument, in accordance with an embodiment of the present disclosure.

FIG. 23 depicts a user interface for evaluating the performance of a financial instrument, in accordance with an embodiment of the present disclosure. According to some embodiments a user or a system may be able to select or deselect one or more financial instruments by name or by types/categories/classes/attributes of the financial instruments to layer onto or off the visualization. Types, categories, classes, attributes and other selection criteria may be color coded, shaded, shaped, contain patterns or otherwise provide indicators of a selection criteria. The indicators of a selection criteria may be displayed on a visualization (e.g., financial instruments of a first type may be one color or pattern and financial instruments of a second type may be another color or pattern). Financial instrument data points may populate and/or de-populate in response to a selection.

FIG. 24 depicts a user interface for evaluating the performance of a financial instrument, in accordance with an embodiment of the present disclosure. According to some embodiments a user or a system may be able to select or deselect one or more financial instruments by types/categories/classes/attributes of the financial instruments to layer onto or off the visualization results in distribution of instruments with those attributes along Return/Alpha versus Risk/Beta space, with the use of coloration or other visual indicators to distinguish classes. Financial instrument data points may populate and/or de-populate in response to a selection. Hovering over a plotted data point may identify the financial instrument it represents and one or more attributes of the financial instrument. Clicking on a data point may provide a second functionality (e.g., displaying real time odds of closing positive such as in FIGS. 11A-11I.) Right mouse clicking on a data point may bring up a menu with one or more options (e.g., order, quote, remove from display, add to favorites, track, etc.)

Figure 25:
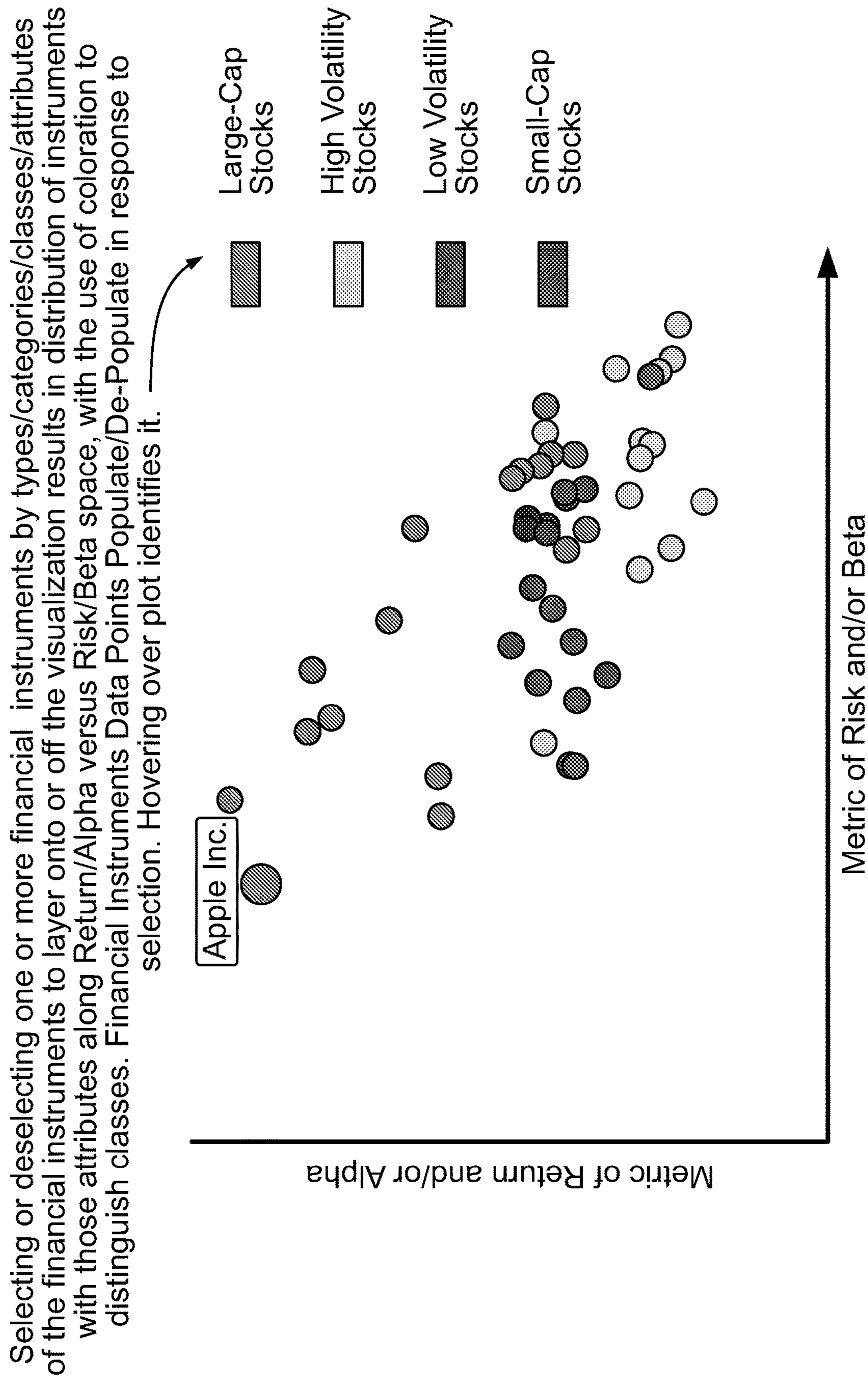
FIG. 25 depicts a user interface for evaluating the performance of a financial instrument, in accordance with an embodiment of the present disclosure.

FIG. 25 depicts a user interface for evaluating the performance of a financial instrument, in accordance with an embodiment of the present disclosure. According to some embodiments a user or a system may be able to select or deselect one or more financial instruments by types/categories/classes/attributes of the financial instruments to layer onto or off the visualization results in distribution of instruments with those attributes along Return/Alpha versus Risk/Beta space, with the use of coloration or other visual indicators to distinguish classes. Financial instrument data points may populate and/or de-populate in response to a selection. Hovering over a plotted data point may identify the financial instrument it represents and one or more attributes of the financial instrument. As depicted in FIG. 25, a financial instrument for Apple, Inc. is selected.

Figure 26:
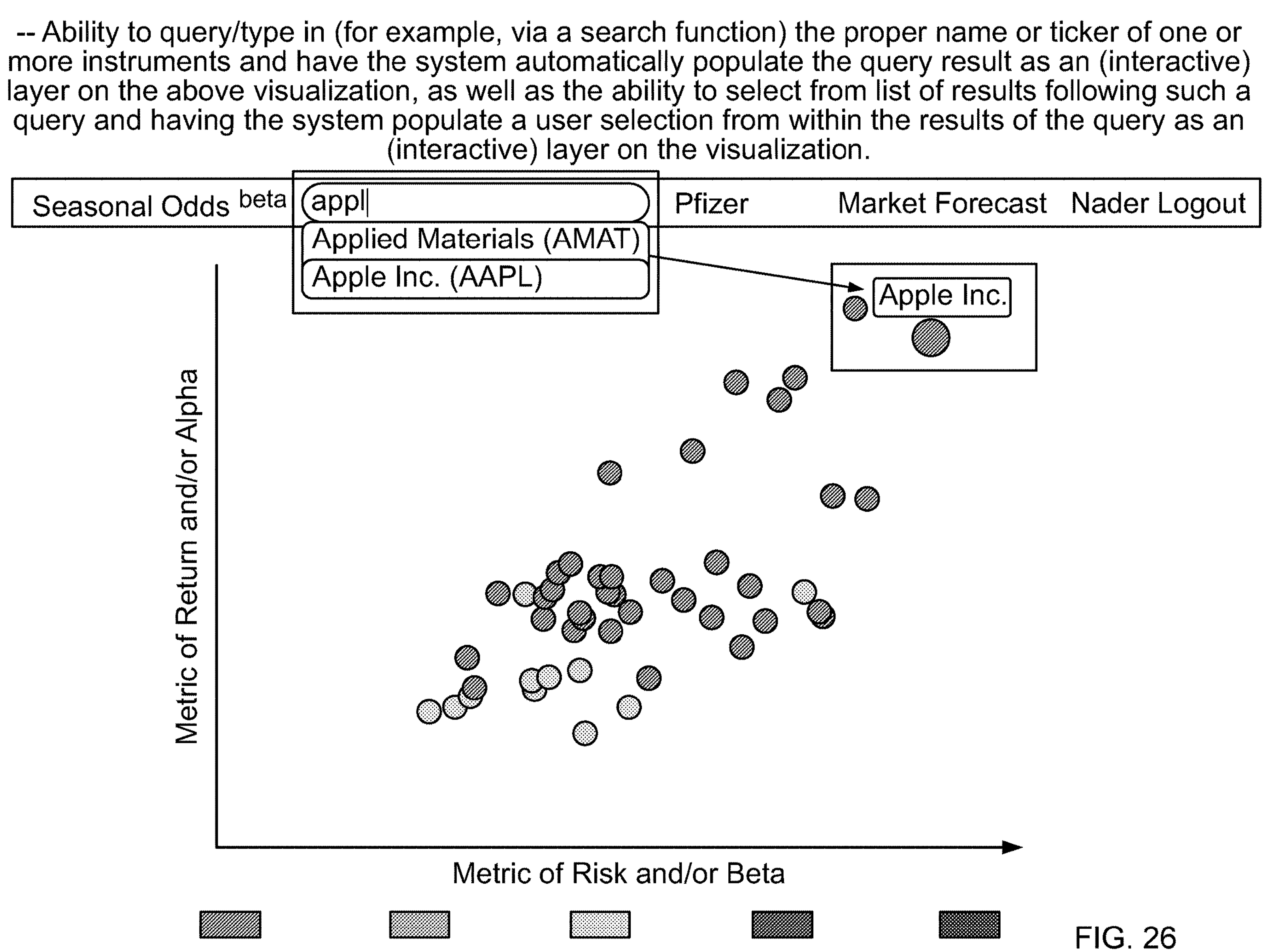
FIG. 26 depicts a user interface for evaluating the performance of a financial instrument, in accordance with an embodiment of the present disclosure.

FIG. 26 depicts a user interface for evaluating the performance of a financial instrument, in accordance with an embodiment of the present disclosure. According to some embodiments a user or a system may be able to query or enter (for example, via a search function) a proper name or ticker of one or more instruments and have the system automatically populate the query result as an (interactive) layer on the above visualization, as well as the ability to select from a list of results following such a query and having the system populate a user selection from within the results of the query as an (interactive) layer on the visualization. A user may be able to specify floors values that a financial instrument must meet to be displayed, ceiling values that a financial instrument must fall beneath to be displayed or other criteria. A user may set a limit on a maximum number of returned results or displayed results or may receive a warning if results exceed a specified value. A user may specify a sort order to select a top or bottom number of instruments to be displayed (e.g., top 100 by trading volume within a specified risk and return ranges).

Figure 27:
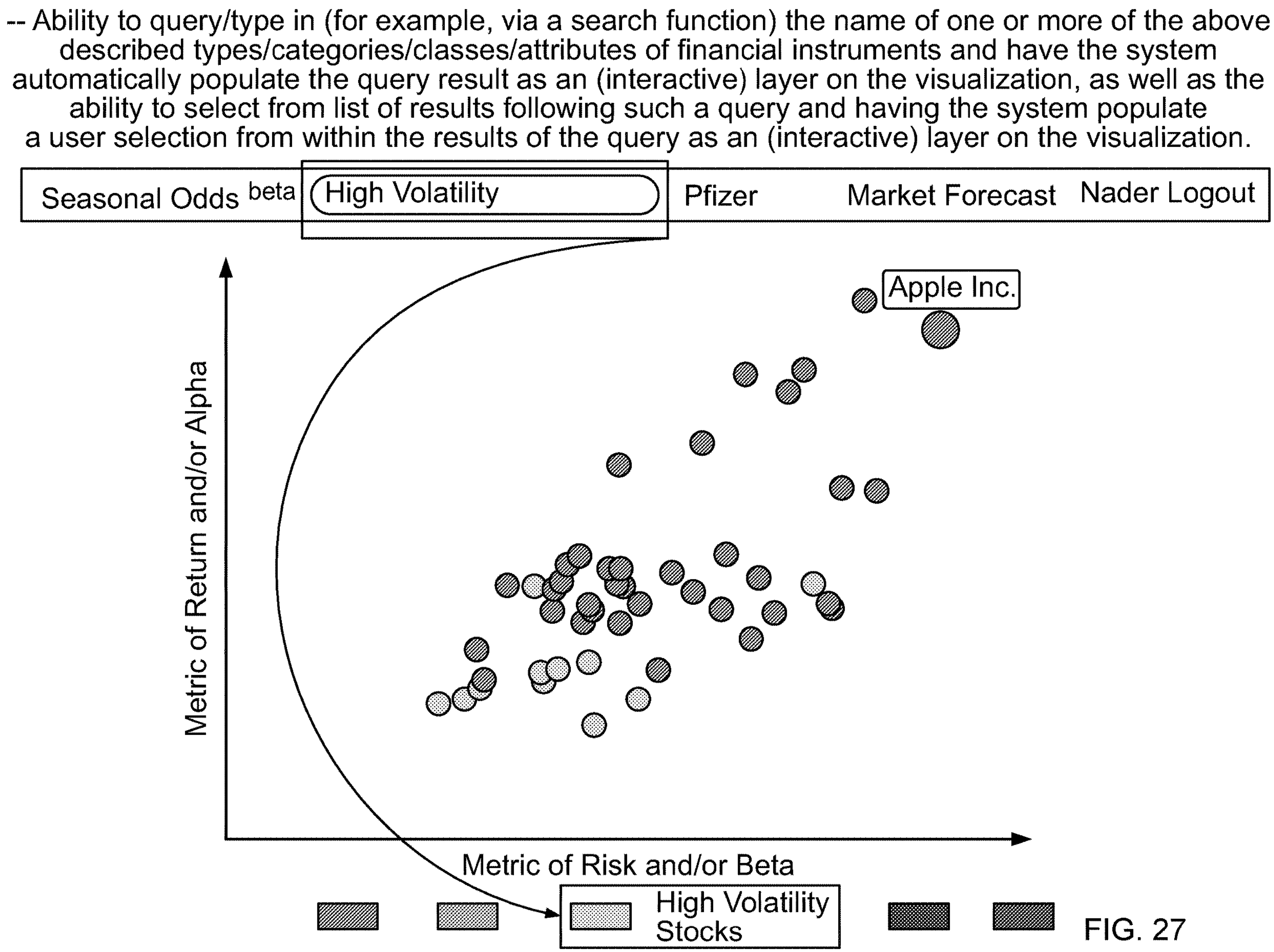
FIG. 27 depicts a user interface for evaluating the performance of a financial instrument, in accordance with an embodiment of the present disclosure.

FIG. 27 depicts a user interface for evaluating the performance of a financial instrument, in accordance with an embodiment of the present disclosure. According to some embodiments a user or a system may be able to query or input (for example, via a search function) the name of one or more of the above described types/categories/classes/attributes of financial instruments and have the system automatically populate the query result as an (interactive) layer on the visualization, as well as the ability to select from a list of results following such a query and having the system populate a user selection from within the results of the query as an (interactive) layer on the visualization.

One or more of the foregoing visualizations may provide a user the opportunity to click financial instrument data point to present a correspond interface (e.g., via a hyperlink). A corresponding interface for a financial instrument data point may be a drill down interface including a 'page' or interface for that financial instrument that may include a vastly expanded set of data about that financial instrument. This may not be included in the Risk/Return visualization and may present further financial instrument data including, but not limited to, price quotes, price charts, volume quotes, volume charts, other forms of charts and graphical representations, "fundamental data" (such as price to earnings ratios), categorization data (such as sector and sub-sector membership, e.g., 'Energy Sector; Oil and Gas); statistical data (such as historical and/or statistical price movement probabilities), news about the financial instrument, including news dynamically scraped from internet and/or non-internet sources; social 'conversations' surrounding the financial instrument, such as those that take place on a social network, graphical or other representations of the identity or institutions and/or parties that hold the financial instrument and/or the proportion of the total outstanding shares or volume of the financial instrument which they hold. Functionality may be provided for a user to buy the financial instrument, sell the financial instrument, track the financial instrument, receive alerts for the financial instrument, and/or receive a call back or other contact from an advisor regarding the financial instrument.

A user interface may be provided to import and or export portfolios. In some embodiments, one or more of the above visualizations may display only financial instruments of a specified portfolio. In some embodiments, a specified portfolio may contain a specific visual indicator (e.g., shading, blinking, color, shape, etc.) and other financial instruments may be displayed along with the portfolio.

Figure 28:
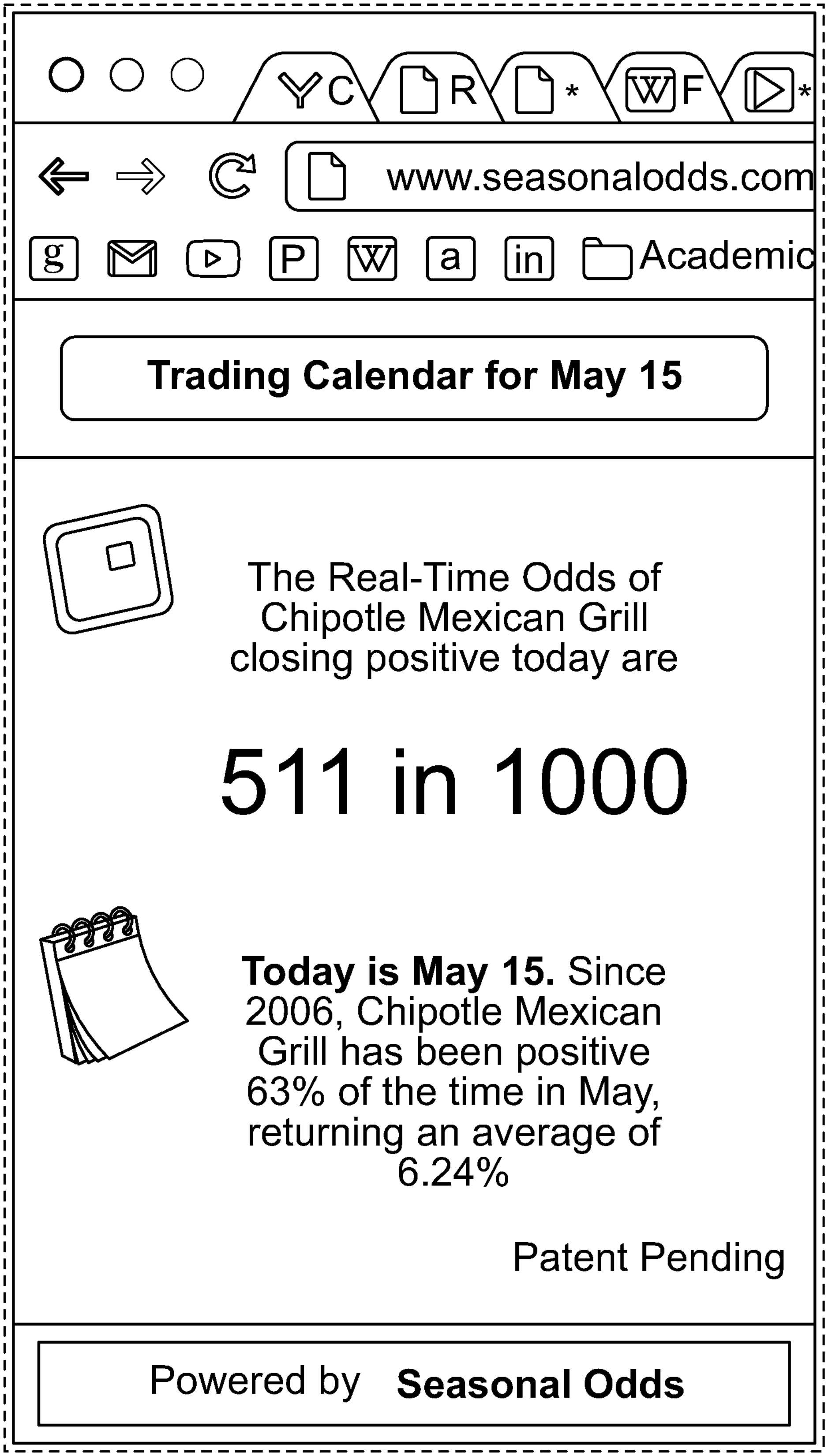
FIG. 28 depicts a user interface for embedding within or associating with another user interface, in accordance with an embodiment of the present disclosure.

FIG. 28 depicts a user interface for embedding within or associating with another user interface, in accordance with an embodiment of the present disclosure. According to some embodiments, FIG. 28 may represent a 'trading calendar' 'widget' than may be displayed on other sites, networks, and platforms, or as a widget within a user's own site. A widget may display a top financial instrument as ranked by one or more factors (e.g., a user preference, a likelihood of closing positive, a rate of return, a risk, a trading volume, and an event affecting the financial instrument). A widget may also update based on one or more factors (e.g., real time data and analysis, a news event, a market event, and a user specified parameter being met). A widget may alternate display between a plurality of financial instruments based on one or more factors (e.g., a user's portfolio, a specified watch list, user preferences, volume, risk, rate of return, market events, news events, real time odds or statistics associated with the financial instrument closing positive, and a recommended financial instrument for a user portfolio based on specified criteria such as risk and return ranges). A widget may be customizable by a user for a certain footprint, layout, positioning on a screen, and content. A widget may contain one or more links to drill down, refer to another site, and/or provide more information about a financial instrument. In some embodiments, a widget may be customized based on a site or page that a widget is incorporated into. In some embodiments, FIG. 28 may represent a banner ad. In one or more embodiments, a banner ad may contain information about a financial instrument (e.g., real time odds or statistics associated with the financial instrument closing positive). A banner ad may expand or contract based on hovering, clicking, or other user interactions. A banner ad may contain one or more links to drill down, refer to another site, and/or provide more information about a financial instrument. In some embodiments, FIG. 28 may represent a browser add-on (e.g., a tool bar) which may contain information about a financial instrument (e.g., real time odds or statistics associated with the financial instrument closing positive).

A user interface for navigating studies of financial instruments may provide an ability to scroll or otherwise navigate among a listing of studies. The listing of studies may include study details including name, creation date, author, description and other metadata. The listing of studies may also provide one or more metrics associated with the study such as, for example, a cumulative percent return, an average percent return, a geometric mean percent return, a best percent return, a worst percent return, a number of trades, a percentage of trades having a positive return, and a Sharpe ratio.

A user interface for navigating financial studies may also provide user interface controls to access further functionality. For example, a create new study user interface control (e.g., a button, a link, a drop down, etc.) may provide access to functionality for creating a new study. Studies of financial instruments may also be grouped or classified and user interface controls may be provided to access different groupings of financial instrument studies (e.g., featured studies, Kensho studies, studies grouped by author, studies classified by a currently logged in user, etc.) Clicking on a study may allow a user to drill down into or navigate to a study. Drilling down into a study may provide study details and functionality related to a study. Access to details of a study or functionality associated with a study may be determined by a user's permissions, roles, and access control list, group permissions, or other security mechanisms. Right clicking on a study in a listing may provide other user interface controls (e.g., publish a study, share a study, add to favorites, delete a study, etc.). In some embodiments, hovering over or mousing over a study in a listing may also provide additional functionality or further details.

A user interface for navigating studies of financial instruments, in accordance with an embodiment of the present disclosure provides a listing of further exemplary studies similar to those discussed above A user interface for viewing details of a study of financial instruments may include a description of the study, a title, an author, and access to study results and trade history. Additional functionality may be provided, such as, for example an ability to delete a study or modify a study. A study may be a group of financial instruments modeled to illustrate the effects of one or more market events or conditions. For example, FIG. 17 may depict a study of the Russell 3000 following the last dispute between President Obama and Republicans over raising the debt ceiling, which took place between July and August of 2011. During this period the credit-rating agency Standard & Poor's downgraded (on August 5th) the credit rating of US government bond for the first time in the country's history. Markets in the US then experienced their most volatile week since the 2008 financial crisis, with the Dow Jones Industrial Average plunging for 635 points (5.6%) in one day. An exemplary study in FIG. 17 may examine which equities across the entire Russell 3000 survived best under the extreme volatility and market stress that occurred during the debt ceiling sell-off of Jul. 22-Aug. 19, 2011.

One or more metrics associated with the study may be displayed above a fractal visualization. Study metadata may also be displayed (e.g., a study period of Jul. 22, 2011 to Aug. 19, 2011). Metrics associated with the study may include, for example, a cumulative percent return, an average percent return, a geometric mean percent return, a best percent return, a worst percent return, a number of trades, a percentage of trades having a positive return, and a Sharpe ratio.

A visualization of the study results may be a bar chart that may be interactive. According to some embodiments, the interactivity may be turned on or off via a user interface control (e.g., a link, a button, a drop down, etc.). Via an interactive user interface, a user may navigate study results by zooming in or out of a bar chart. Zooming in may allow a user to via a specific segment of study results. For example, FIG. 18 may depict the returns of stocks of the Russell 3000 stock index. Due to the large number of equities displayed (e.g., 3000 stocks), when the chart is zoomed out to view the full range or returns (e.g., the entire chart), the individual components may not be visible separately. According to some embodiments, one or more bench marks may be displayed. For example, a benchmark (e.g., the S&P 500) may be illustrated using a different colored bar.

Moving a cursor over components of a study or benchmarks included in a study may display metrics associated with the individual components. For example, moving a cursor over a bar representing the S&P 500 benchmark for an exemplary study of the Russell 3000 may provide metrics including a cumulative return of −16.39% during the study period.

A user interface for viewing component information of a financial instrument visualization, in accordance with an embodiment of the present disclosure may depict the study results with a lowest performing component of a study highlighted.

A user interface for viewing component information of a financial instrument visualization, in accordance with an embodiment of the present disclosure may depict the study results of with a highest performing component of a study highlighted.

A user may zoom in or out of study results using one or more methods (e.g., a track pad, a mouse wheel, an arrow key, an assigned function or letter key, etc.). According to some embodiments, when study results a zoomed in or focused such that an entire range of results may not be displayed on a user screen, a user may navigate among the results. For example, if a user drills down to focus on a subset of study components outperforming a benchmark (e.g., to the right of the S&P 500 indicator in a bar chart showing returns from lowest to highest), a user may navigate to underperforming components by clicking and dragging to the left of the benchmark indicator. Other forms of navigation may be possible (e.g., arrow keys, a track pad, etc.)

A user interface for focusing a financial instrument visualization, in accordance with an embodiment of the present disclosure may depict the study results focused or zoomed in to show a subset of study results. When a zoom or focus level is sufficient to provide display space, component metadata and metrics may be provided for one or more components (e.g., financial instruments) of a study. For example, if study results are focused enough a stock symbol, a return rate, a name, or other performance metric may be provided. Such a user interface may depict higher performing components of the Russell 3000 during a period of the study.

A user interface for focusing a financial instrument visualization, in accordance with an embodiment of the present disclosure may depict the study results focused or zoomed in to show a subset of study results. Such a user interface may depict lower performing components of the Russell 3000 during a period of the study.

Clicking on an individual component of a study may provide information about the component (e.g., a particular equity). Additional functionality may be provided (e.g., an ability to buy or sell the particular equity, an ability to view an impact of a particular equity to one or more portfolios, an ability to add a particular equity to a model portfolio, an ability to remove a particular equity from a model portfolio, etc.). If an individual component is an index or a benchmark, a user may drill down further. For example, if a user clicks on the S&P 500 they may drill down to view sector performance and then even further to view the performance of individual components of a sector.

According to some embodiments, a chart providing component metrics for a study may include for one or more components, for example, a stock symbol, a cumulative percent return, an average percent return, a geometric mean percent return, a best percent return, a worst percent return, a number of trades, a percentage of trades having a positive return, and a Sharpe ratio. Study result data may be presented in rows and may be sortable by one or more of the columns (e.g., alphabetically by stock symbol, lowest to highest by a particular metric, highest to lowest by a particular metric, etc.). A subset of results or all results may be selectable, exportable, printed, emailed, or shared electronically (e.g., emailed, posted, etc.). A study may also include a listing of trades associated with a study components. Trade information may include one or more of the following for components of a study including: a buy date for a component, a sell date for a component, a percentage return for a component, a buy price for a component, a sell price for a component, and a symbol for a component.

A user interface for creating a study of financial instruments, in accordance with an embodiment of the present disclosure can include a user interface control such as, for example, a drop down for creating one or more studies. Studies may include, for example, a conditional analysis, a cyclical analysis, an event analysis, a relative analysis, a relative analysis with multiple date ranges, a relative analysis from a starting date to present date, a relative analysis for a current year to date, or other studies. Further detail on creating studies is discussed below with respect to FIGS. 30-38.

User interface functionality may be provided for accessing an account), for password hints or resets ( ), for account creation, for account information and for additional functionality. Accounts may be required to access studies, to create studies, to edit studies, to delete studies, and/or to publish or share studies. Different levels of accounts may be provided that may have different functionality and/or access. Accounts may require a fee, a subscription, may be free, or may be provided on another basis. Different levels of access and functionality may require different subscriptions or fees.

Figure 30:
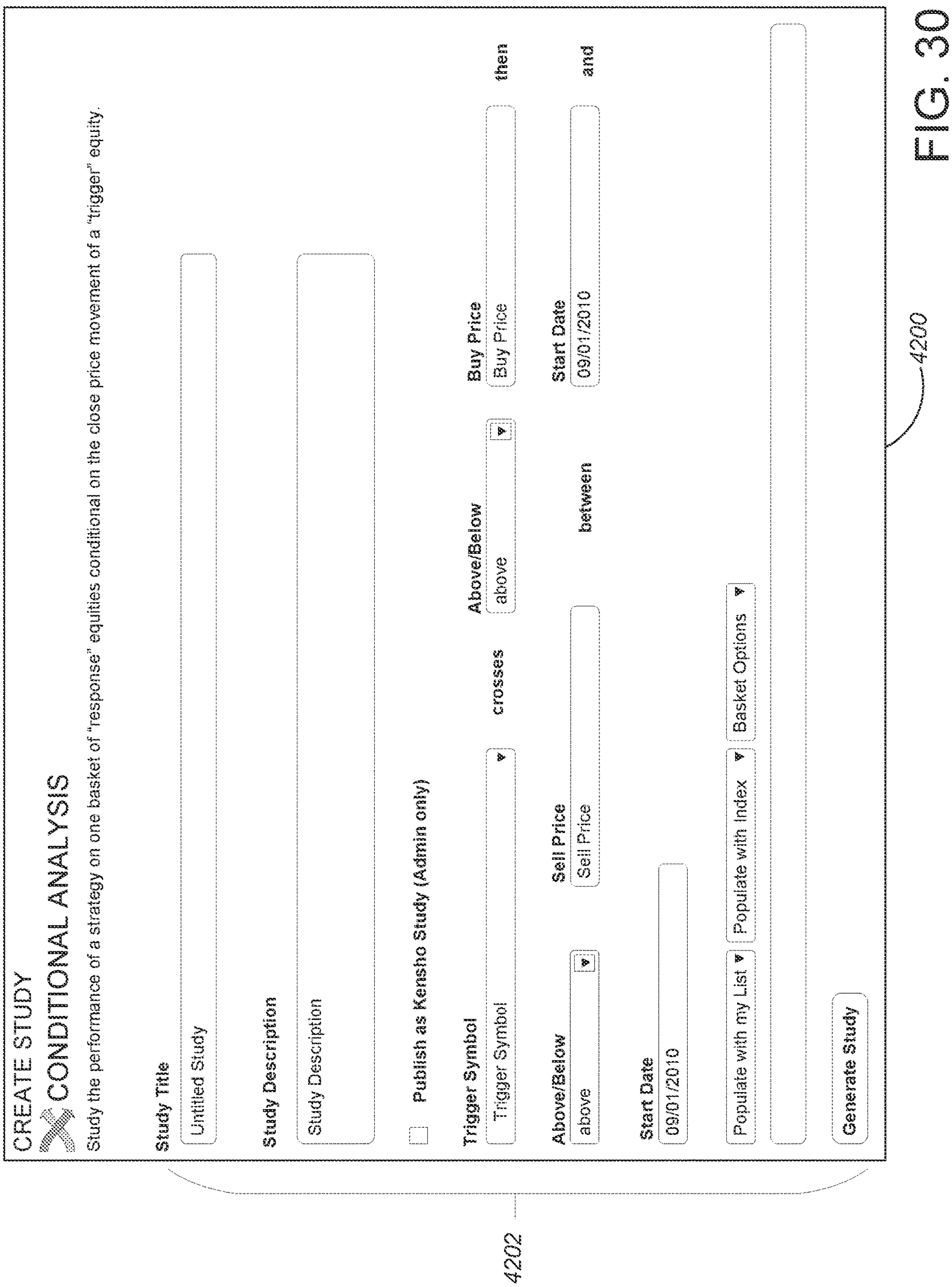
FIG. 30 depicts a user interface for creating a study of financial instruments, in accordance with an embodiment of the present disclosure.

FIG. 30 depicts a user interface 4200 for creating a study of financial instruments, in accordance with an embodiment of the present disclosure. FIG. 30 may depict a user interface for creation of a conditional analysis study which may accept one or more user inputs 4202 to generate a study. For example, user inputs 4202 may include: a study title, a study description, a trigger symbol (e.g., a stock symbol or benchmark used for conditional analysis), a threshold or above/below parameter, a buy price, a second above/below threshold parameter, a sell price, and a date range for a study (e.g., a start date and an ending date). Components of a study may be populated using tickers or financial instrument symbols, a user list or portfolio of holdings, an index (e.g., the Russell 3000, S&P 500, Sector components, etc.). Other functionality may be provided (e.g., share a study, publish a study, etc.) Generation of a study may allow a user to view results as described above.

Figure 31:
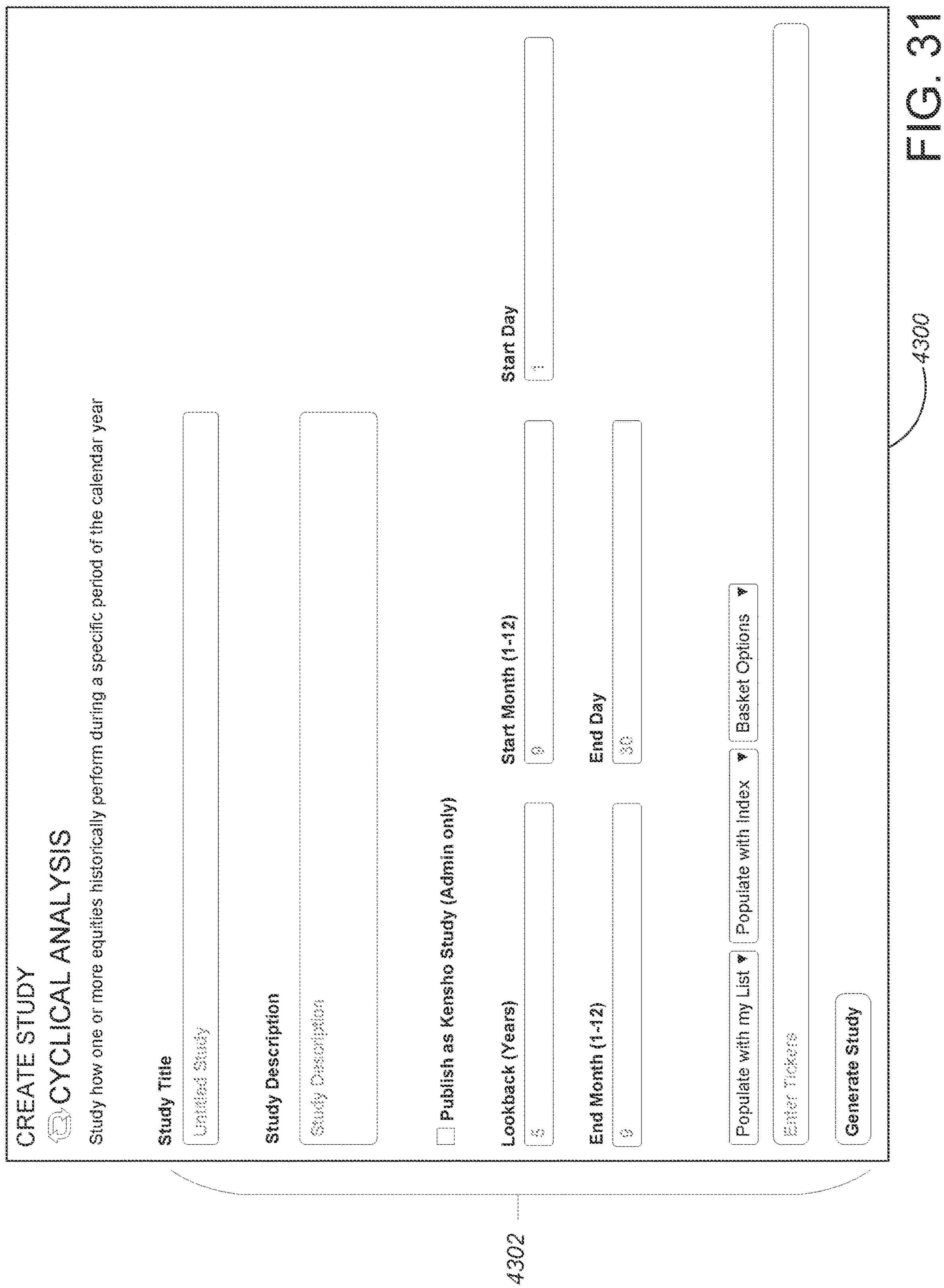
FIG. 31 depicts a user interface for creating a study of financial instruments, in accordance with an embodiment of the present disclosure.

FIG. 31 depicts a user interface 4300 for creating a study of financial instruments, in accordance with an embodiment of the present disclosure. FIG. 31 may depict a user interface for creation of a cyclical analysis study which may accept one or more user inputs 4302 to generate a study. For example, user inputs 4302 may include: a study title, a study description, a number of years to look back, a starting month, a starting day, an ending month, and an ending day. Components of a study may be populated using tickers or financial instrument symbols, a user list or portfolio of holdings, an index (e.g., the Russell 3000, S&P 500, Sector components, etc.) Other functionality may be provided (e.g., share a study, publish a study, etc.) Generation of a study may allow a user to view results as described above.

Figure 32:
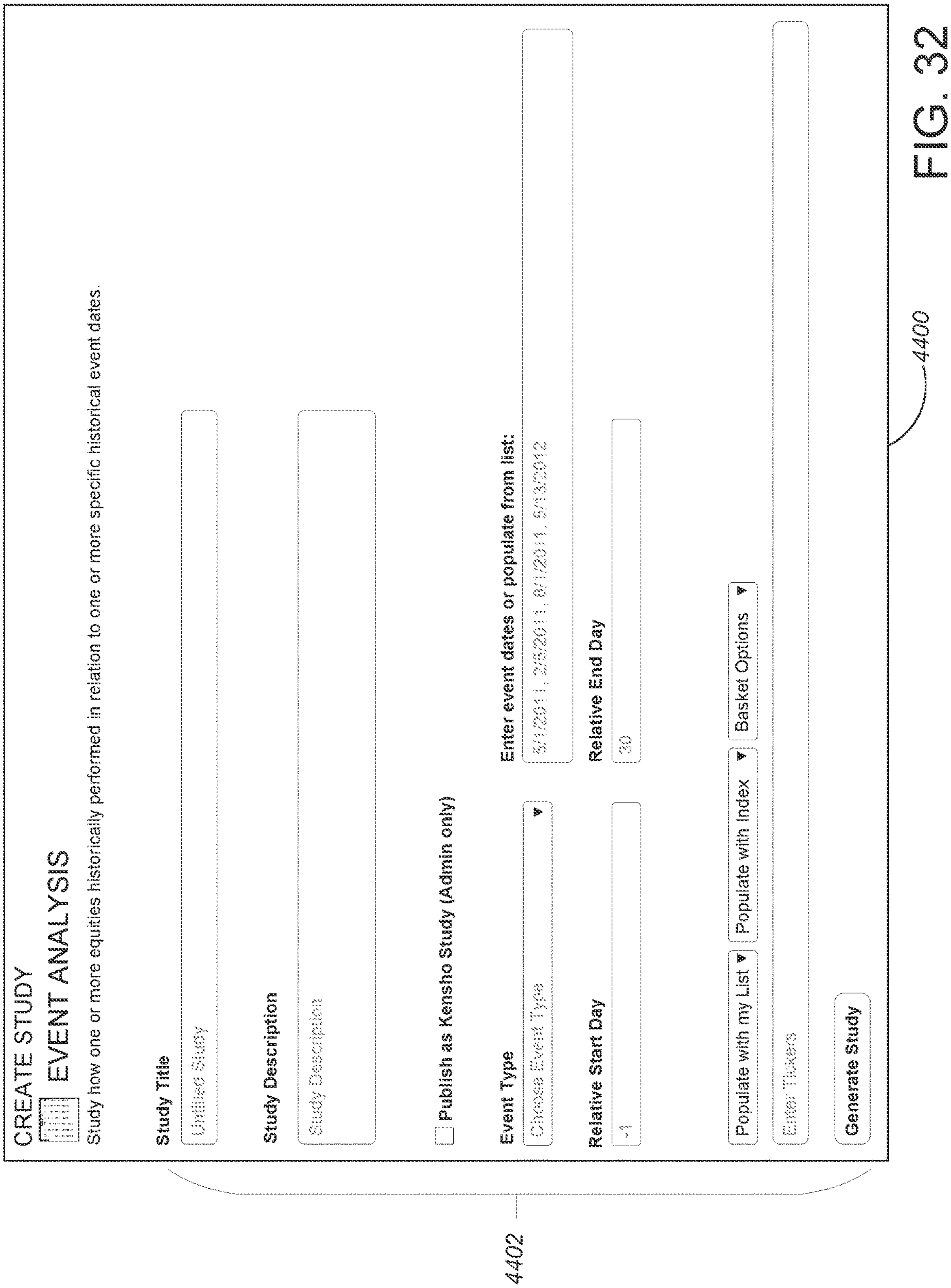
FIG. 32 depicts a user interface for creating a study of financial instruments, in accordance with an embodiment of the present disclosure.

FIG. 32 depicts a user interface 4400 for creating a study of financial instruments, in accordance with an embodiment of the present disclosure. FIG. 32 may depict a user interface for creation of an event analysis study which may accept one or more user inputs 4402 to generate a study. For example, user inputs 4402 may include: a study title, a study description, an event type, an event date, a relative start day, and a relative end day. Components of a study may be populated using tickers or financial instrument symbols, a user list or portfolio of holdings, an index (e.g., the Russell 3000, S&P 500, Sector components, etc.) Other functionality may be provided (e.g., share a study, publish a study, etc.) Generation of a study may allow a user to view results as described above. Events are not limited an may include market based announcements, government reports, political events, natural disasters, press releases, surveys, etc.

Figure 33:
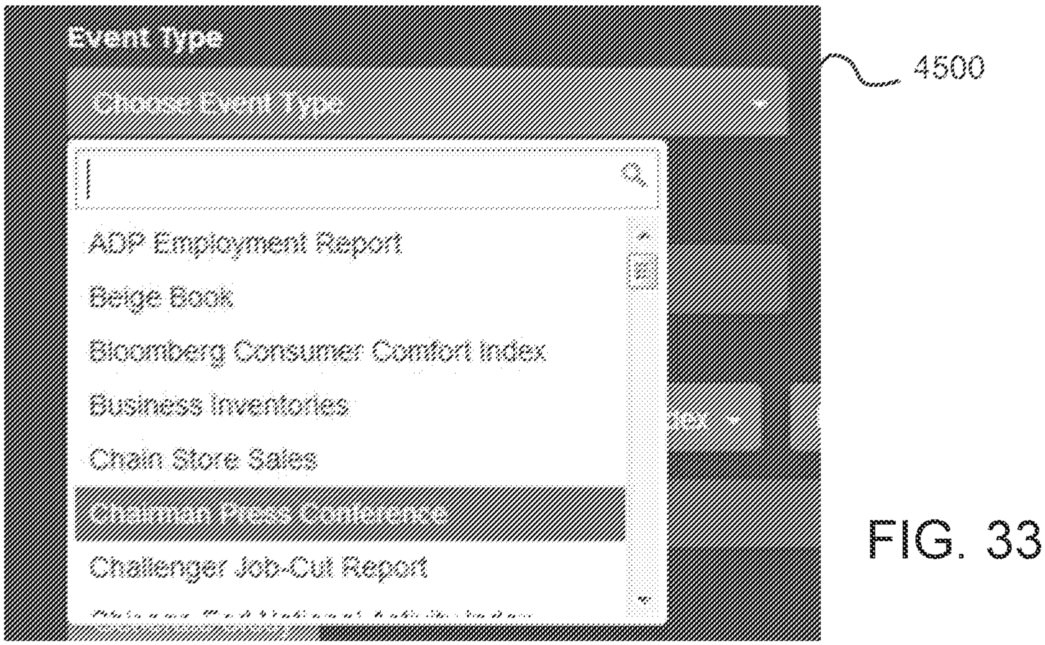
FIG. 33 depicts a user interface for entering parameters for creating a study of financial instruments, in accordance with an embodiment of the present disclosure.

FIG. 33 depicts a user interface 4500 for entering parameters for creating a study of financial instruments, in accordance with an embodiment of the present disclosure. FIG. 33 illustrates a user interface control with a partial listing of events available for an event analysis.

Figure 34:
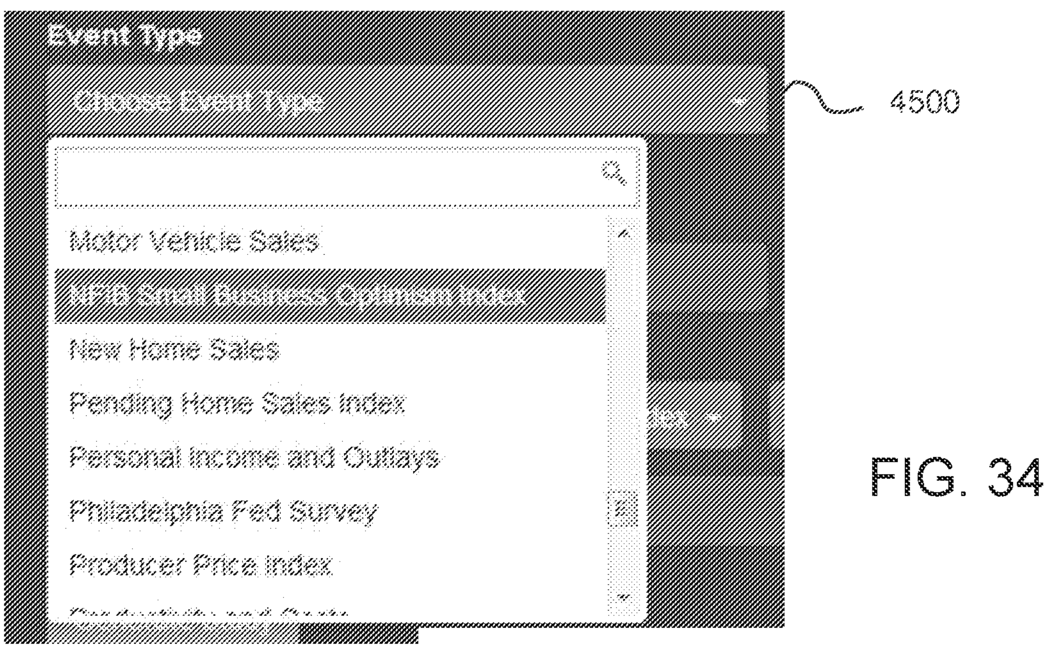
FIG. 34 depicts a user interface for entering parameters for creating a study of financial instruments, in accordance with an embodiment of the present disclosure.

FIG. 34 depicts a user interface 4500 for entering parameters for creating a study of financial instruments, in accordance with an embodiment of the present disclosure. FIG. 34 illustrates a user interface control with a partial listing of additional events available for an event analysis.

Figure 35:
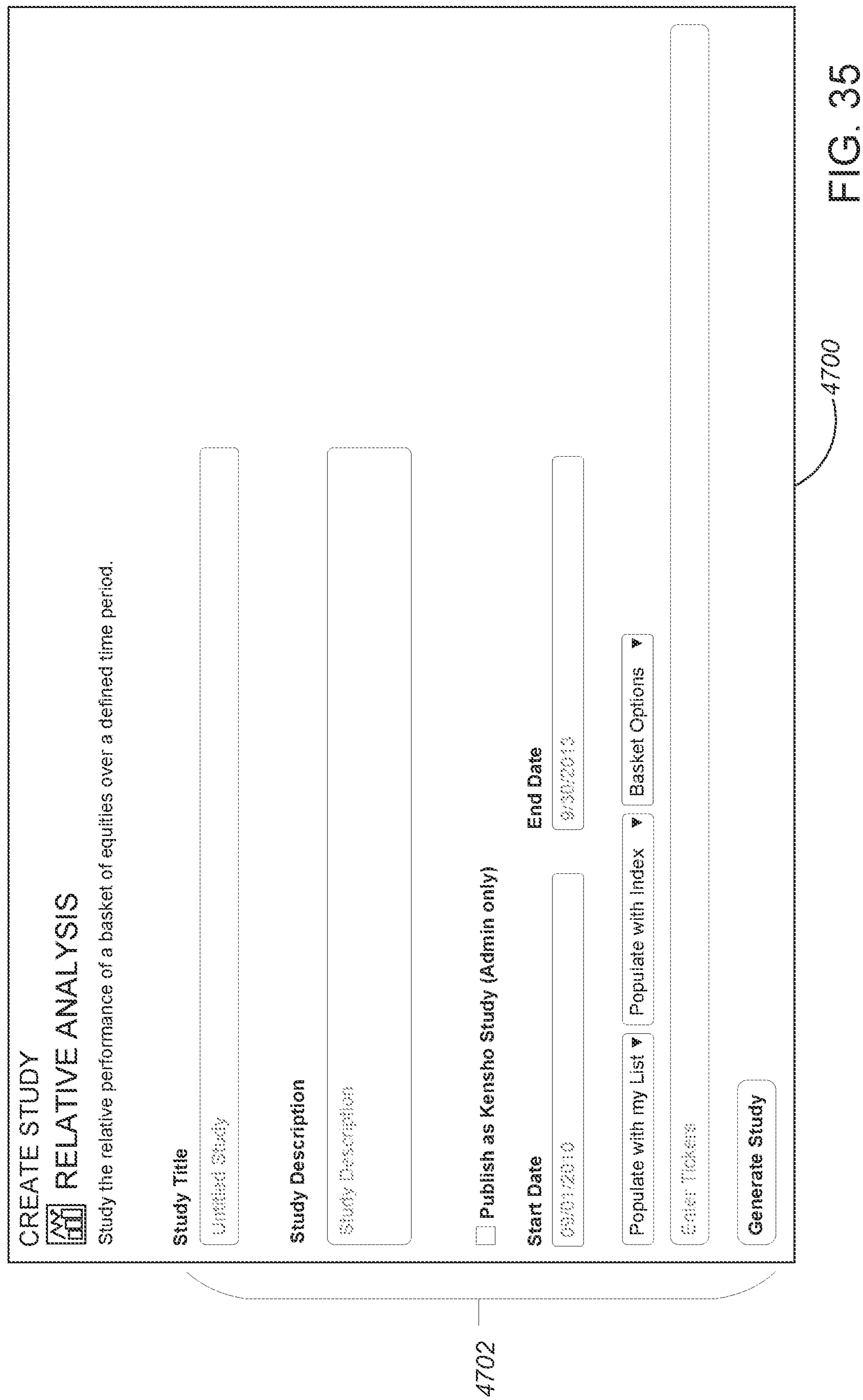
FIG. 35 depicts a user interface for creating a study of financial instruments, in accordance with an embodiment of the present disclosure.
Figure 36:
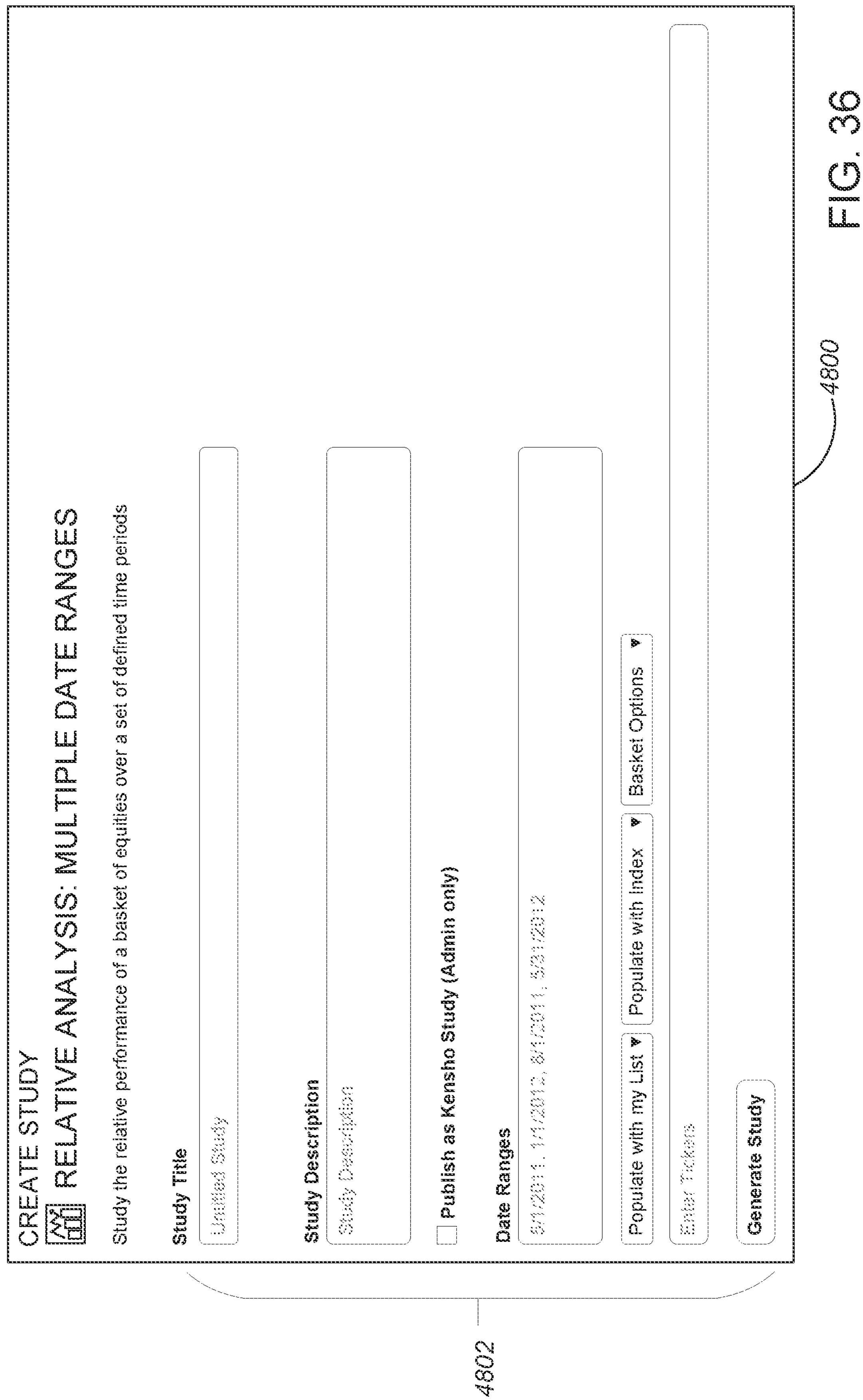
FIG. 36 depicts a user interface for creating a study of financial instruments, in accordance with an embodiment of the present disclosure.

FIG. 35 depicts a user interface 4700 for creating a study of financial instruments, in accordance with an embodiment of the present disclosure. FIG. 35 may depict a user interface for creation of a relative analysis study which may accept one or more user inputs 4702 to generate a study. For example, user inputs 4702 may include: a study title, a study description, a start day, and an end day. Components of a study may be populated using tickers or financial instrument symbols, a user list or portfolio of holdings, an index (e.g., the Russell 3000, S&P 500, Sector components, etc.) Other functionality may be provided (e.g., share a study, publish a study, etc.) Generation of a study may allow a user to view results as described above FIG. 36 depicts a user interface 4800 for creating a study of financial instruments, in accordance with an embodiment of the present disclosure. FIG. 36 may depict a user interface 4800 for creation of a relative analysis study with multiple date ranges. User inputs may be accepted via user input controls 4802.

Figure 37:
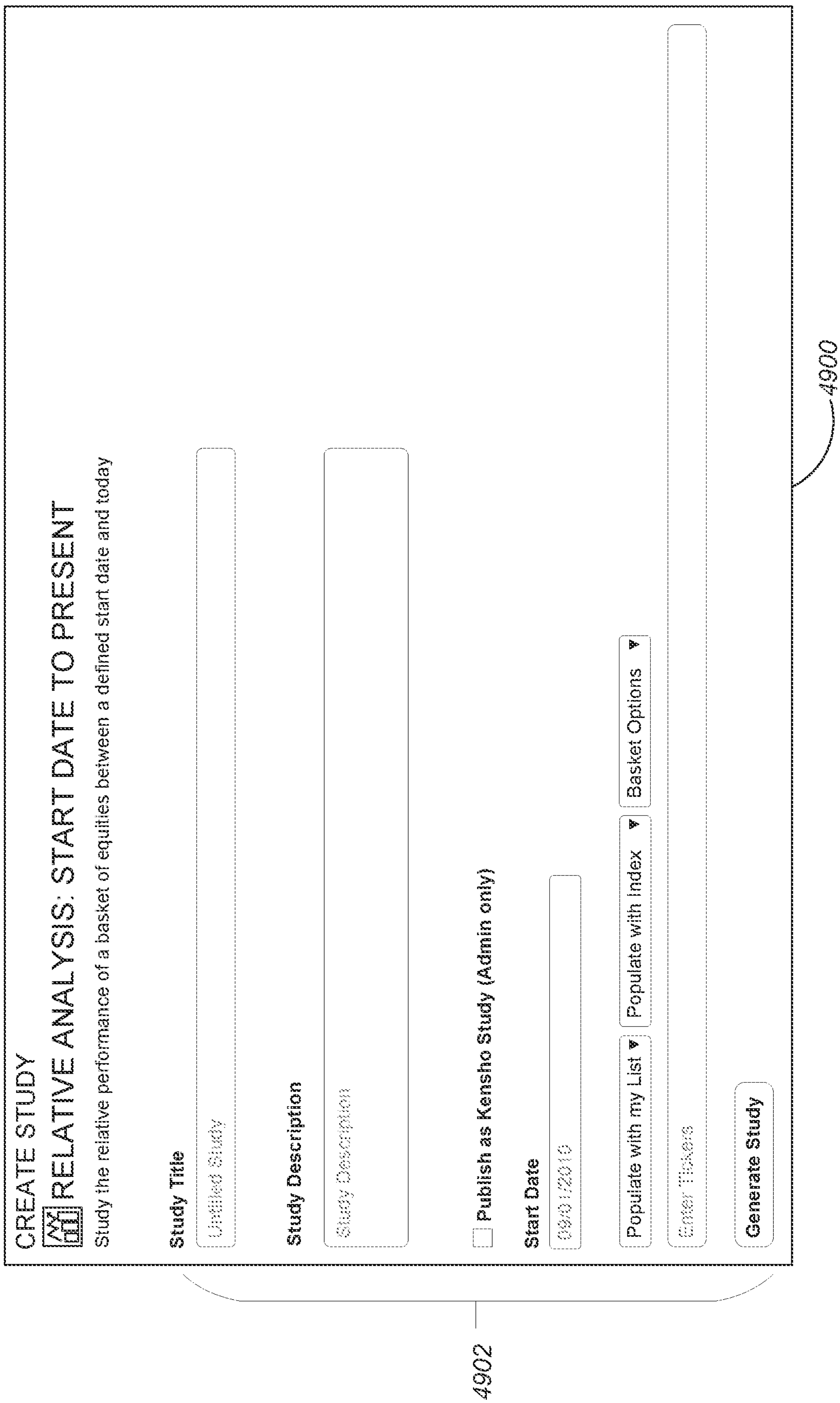
FIG. 37 depicts a user interface for creating a study of financial instruments, in accordance with an embodiment of the present disclosure.

FIG. 37 depicts a user interface 4900 for creating a study of financial instruments, in accordance with an embodiment of the present disclosure. FIG. 37 may depict a user interface 4900 for creation of a relative analysis study from a specified start date to a present date. User inputs may be accepted via user input controls 4902.

Figure 38:
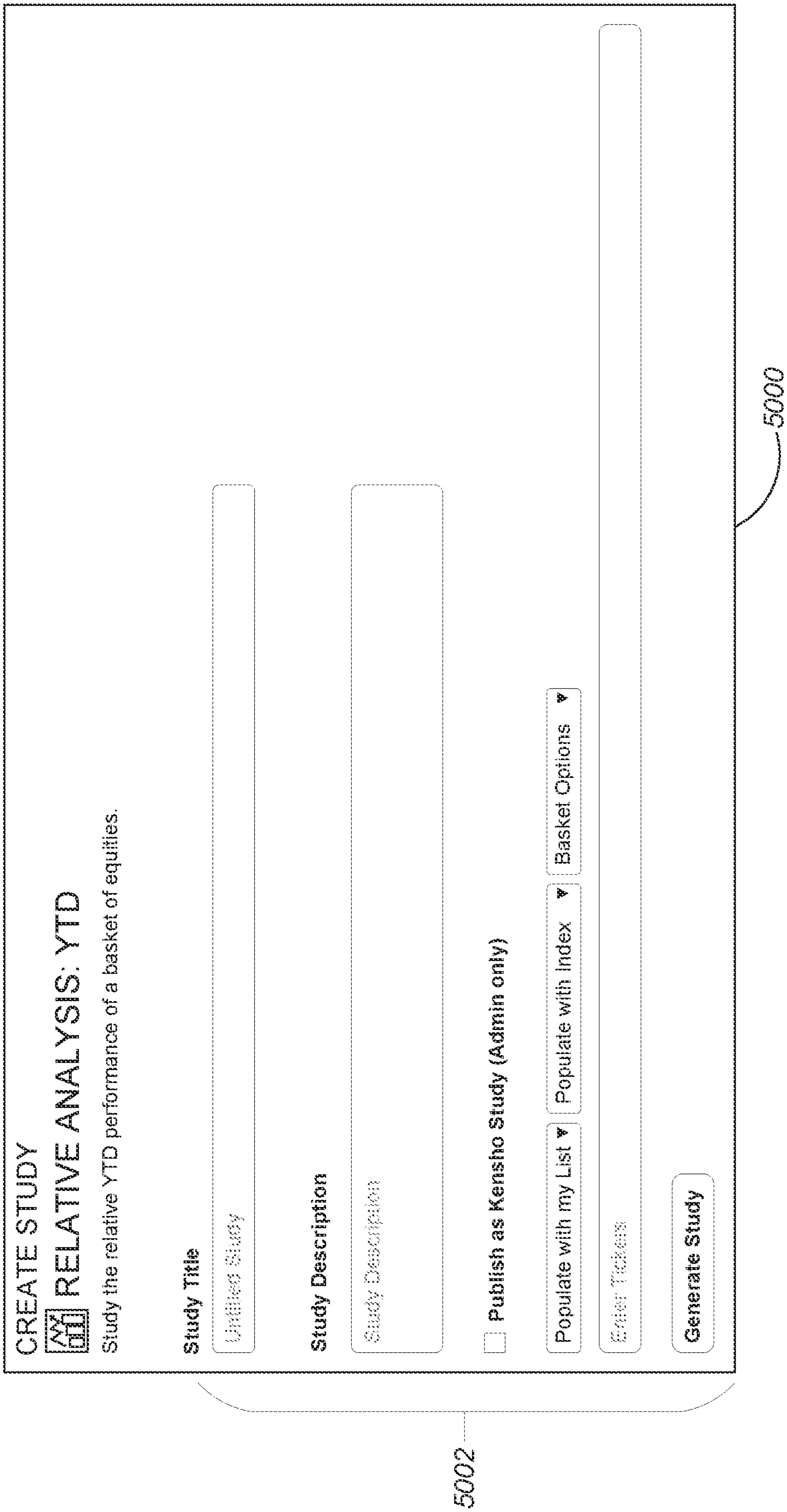
FIG. 38 depicts a user interface for creating a study of financial instruments, in accordance with an embodiment of the present disclosure.

FIG. 38 depicts a user interface 5000 for creating a study of financial instruments, in accordance with an embodiment of the present disclosure. FIG. 38 may depict a user interface for creation of a year-to-date relative analysis study. User inputs may be accepted via user input controls 5002.

A user interface for a financial instrument visualization, in accordance with an embodiment of the present disclosure may depict study results associated with a study of best performing energy companies in summer months. One or more metrics associated with the study may be displayed above a fractal visualization. Study metadata may also be displayed (e.g., a study period of June first to September first over the last 20 years). Metrics associated with the study may include, for example, a cumulative percent return, an average percent return, a geometric mean percent return, a best percent return, a worst percent return, a number of trades, a percentage of trades having a positive return, and a Sharpe ratio. As described above, a visualization of the study results may be a bar chart that may be interactive. According to some embodiments, the interactivity may be turned on or off via a user interface control (e.g., a link, a button, a drop down, etc.). Via an interactive user interface, a user may navigate study results by zooming in or out of a bar chart. Zooming in may allow a user to via a specific segment of study results.

A user interface for a financial instrument visualization, in accordance with an embodiment of the present disclosure may be a line graph corresponding to the study results and may be interpreted as a line graph wherein vertical or angled lines (either up or down) indicate that the given asset is being held during this time period, because a condition in a study defined by a user was active during that time period. Perfectly horizontal lines indicate that the given asset is not being held by the simulated study or strategy during this time period, because the necessary conditions defined by the user in the study were not all active during that time period. Therefore in the horizontal sections of the line, price changes during that period are not contributing to the total cumulative return or loss of the strategy, and are not counted.

According to some embodiments, the line graph shows the performance of the strategy asset-by-asset over time. This may be useful because it speaks to the consistency of the study or strategy both through time as well as across the assets in the basket. Typically, a user would want to see consistency across both dimensions. A good study or strategy may be one where (1) a given asset moves up on most of the event days/condition periods over time, and (2) on a given event day/condition period most assets in the study move up. Such a strategy or study has good risk-adjusted returns cross-sectionally and in the time-series is a win-win.

If the focus of the study is to see if a given event or condition period has an effect on assets, a user may look for assets to consistently move either up or down when the given event or condition period is active. If a user sees effects across some assets but not others, a user may remove the latter from the strategy and try finding others that more consistently move either up or down when the given event or period is active.

A user interface for a financial instrument visualization, in accordance with an embodiment of the present disclosure may depict study results associated with a study of U.S. equity performance during a last government shutdown of 1995-1996. The United States federal government shutdown of 1995 and 1996 was the result of conflicts between Democratic President Bill Clinton and the Republican Congress over funding for Medicare, education, the environment, and public health in the 1996 federal budget. The government shut down after Clinton vetoed the spending bill the Republican Party-controlled Congress sent him. The federal government of the United States put non-essential government workers on furlough and suspended non-essential services from Nov. 14 through Nov. 19, 1995 and from Dec. 16, 1995 to Jan. 6, 1996, for a total of 28 days. A study may identify the U.S. equities that led and lagged over these two periods. One or more metrics associated with the study may be displayed above a fractal visualization. Study metadata may also be displayed (e.g., a study period of Nov. 14, 1995-Nov. 19, 1995 and Dec. 16, 1995-Jan. 6, 1996). Metrics associated with the study may include, for example, a cumulative percent return, an average percent return, a geometric mean percent return, a best percent return, a worst percent return, a number of trades, a percentage of trades having a positive return, and a Sharpe ratio. As described above a visualization of the study results may be a bar chart that may be interactive. According to some embodiments, the interactivity may be turned on or off via a user interface control (e.g., a link, a button, a drop down, etc.). Via an interactive user interface, a user may navigate study results by zooming in or out of a bar chart. Zooming in may allow a user to via a specific segment of study results.

A user interface for a financial instrument visualization, in accordance with an embodiment of the present disclosure may be a line graph corresponding to the study results and may be interpreted as a line graph wherein vertical or angled lines (either up or down) indicate that the given asset is being held during this time period, because a condition in a study defined by a user was active during that time period. Perfectly horizontal lines indicate that the given asset is not being held by the simulated study or strategy during this time period, because the necessary conditions defined by the user in the study were not all active during that time period. Therefore in the horizontal sections of the line, price changes during that period are not contributing to the total cumulative return or loss of the strategy, and are not counted. An individual component or line of a graph may be highlighted and corresponding metadata for that component may be displayed. For example, metrics such as a rate of return for a highest performing component may be displayed (e.g., Chesapeake Energy).

According to some embodiments, a shade or color of a line may vary depending on performance. For example, a line may be a bright green for a high positive return percentage for the corresponding financial instrument during a period of the study. A line may be bright red for a high negative return during a period of a study. Other colors or indicators may be used. A line may change colors, shades, or indicators as the performance of a corresponding financial instrument changes. A user may determine color schemes or other indicators. In some embodiments, a user may indicate holdings of a specified portfolio with a specified indicator.

A user interface for a financial instrument visualization, in accordance with an embodiment of the present disclosure is another view of the line graph, but with a lowest performing component highlighted (e.g., Kla-Tencor Corp.).

According to some embodiments, line graphs may provide an ability for a user to zoom in or otherwise navigate view individual component or sector performance. Line graphs may also contain one or more benchmarks (e.g., S&P 500) that may be provided in a different color, a different line pattern, or with another distinctive indicator.

Figure 39:
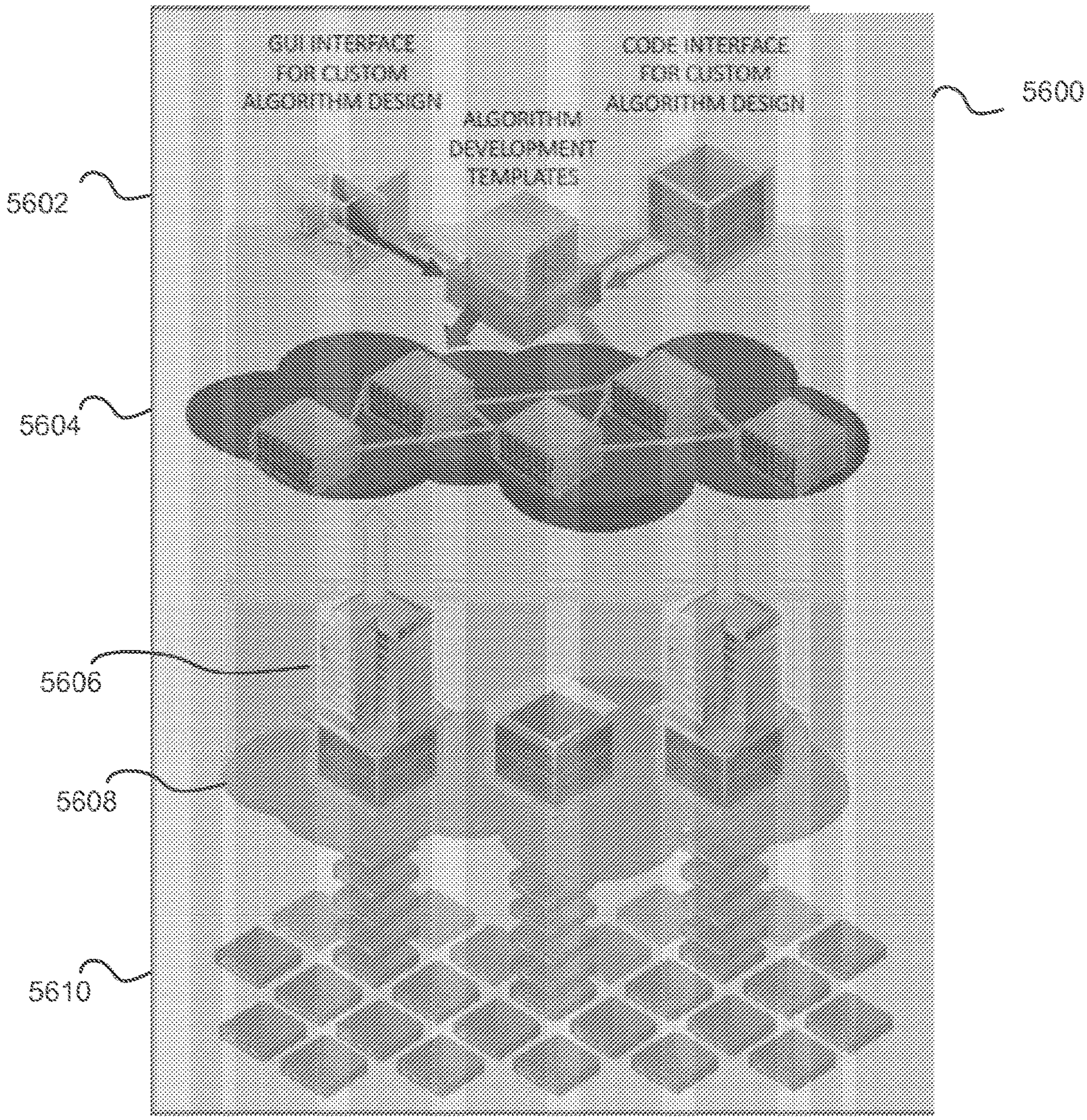
FIG. 39 depicts a platform for financial instrument visualization and modeling, in accordance with an embodiment of the present disclosure.

FIG. 39 depicts a platform 5600 for financial instrument visualization and modeling, in accordance with an embodiment of the present disclosure. Element 5602 may represent a user interface layer for developing and generating studies using templates, custom algorithms, or a code interface for custom algorithm design. Element 5604 may represent custom execution engines for processing large volumes of financial and modeling data. Processing for models may be distributed across multiple engines for better performance. Element 5606 may represent high speed data availability clusters. Element 5608 may represent cloud based infrastructure such as, for example, a financial cloud service provided by one or more exchanges. Element 5610 may represent large volumes of data (e.g., petabytes). Infrastructure such as that depicted in FIG. 39 may provide an ability for complex computation in near real time. It may also allow for the provision of software as a service SaaS. Clients may be browser based clients including PCs, laptops, mobile devices, etc. Platforms such as that depicted in FIG. 39 may allow for data preparation including, but not limited to, scrubbing of data, cleaning of data, standardizing of data (across multiple asset types and/or multiple markets). Platforms such as that depicted in FIG. 39 may also allow for high speed searching of large scale financial data, large scale financial data management, real-time probability analysis, predictive analytics, and financial visualization.

According to some embodiments, such platforms may allow for construction and modeling of synthetic assets (e.g., a set of financial instruments selected to closely track the performance of one or more other financial instruments, such as equities of a supply chain for a manufacturing based equity wherein the supply chain equities closely track the performance of the manufacturing equity).

According to some embodiments, platforms such as that depicted in FIG. 39 may provide machine learning. For example, historical data may be analyzed to predict how long to hold a position for a financial instrument.

A user interface for pushing statistical market content to a user, in accordance with an embodiment of the disclosure depicts a user interface for pushing statistical market content to a user which provides further statistical content of an event selected from an interface.

Notifications or alerts may be sent in advance of events (e.g., economic data releases, earnings releases, elections, other events scheduled or known in advance). The notifications may contain statistical content modeling the market impact of different scenarios based on surfaced (statistically identified in historical data) past results for each scenario. This may allow a user to position a trade or hedge in advance of a surprise. A user may thus hedge against previously unknown major market implications of certain scenarios (based on past reactions to similar cases and based on historical market data) statistically identified. For example, such a user interface may model the impact of a projected housing starts report on the return of one or more sectors or financial instruments in advance of the release of any report. A user may specify a projected report result and model an impact on the return of multiple sectors and financial instruments.

A user interface for modeling the impact of breaking political events, in accordance with an embodiment, depicts a chart illustrating an impact of the Indian general election. As illustrated, if the BJP wins the upcoming Indian General Election, the Rupee statistically will decline over the following week, temporarily reversing its secular rise since 2008, based on the five prior occasions when the BJP won state-level elections.

The system may include user interface for modeling the impact of breaking political events, in accordance with an embodiment. Whereas "Breaking" alerts covers geopolitical events that have just happened, "To Watch" alerts covers geopolitical events that are known in advance (e.g., an impact based on a modeled outcome in advance).

The system may include a user interface for modeling the impact of breaking political events, in accordance with an embodiment.

Figure 42:
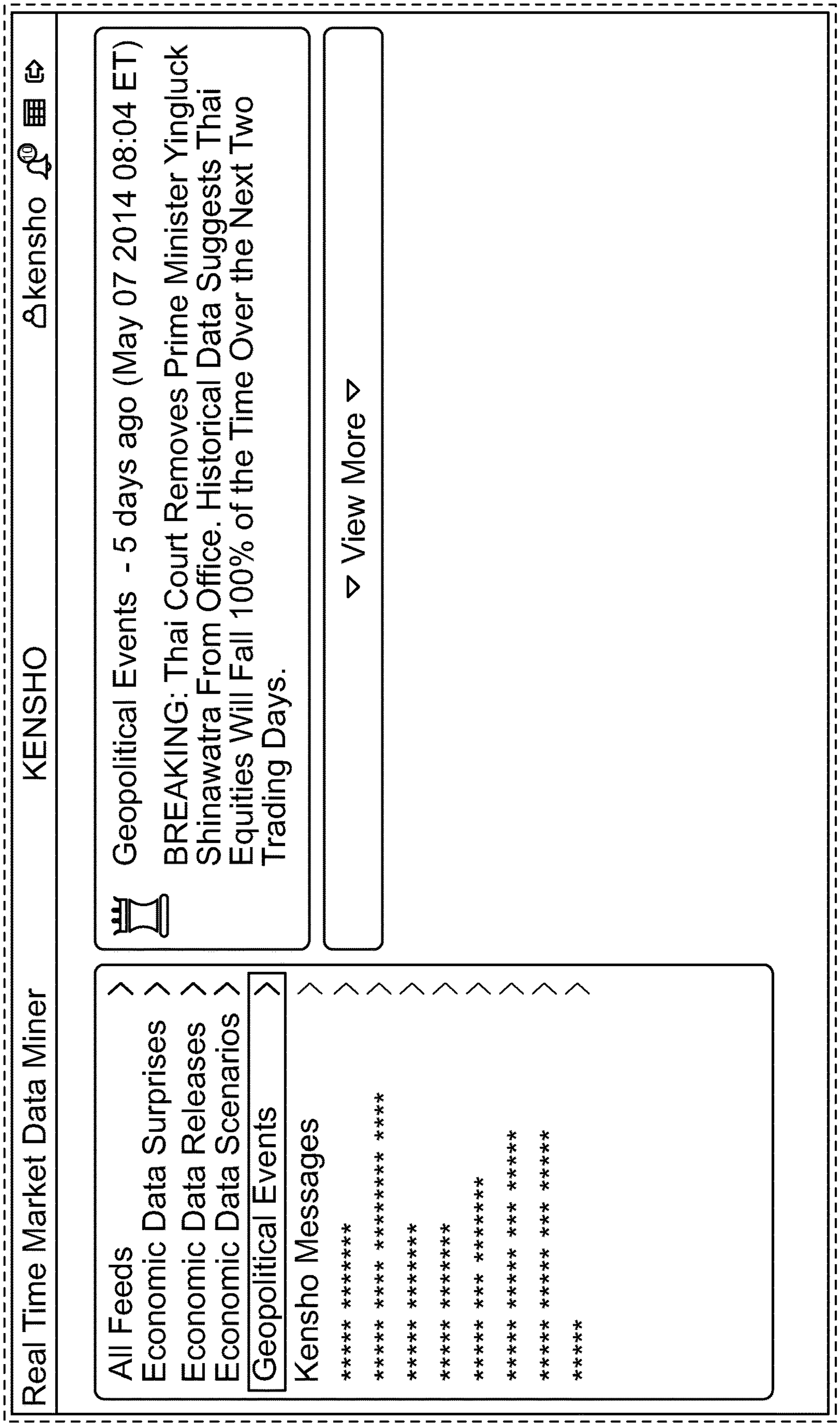
FIG. 42 depicts a user interface for modeling the impact of breaking political events, in accordance with an embodiment.

FIG. 42 depicts a user interface for modeling the impact of breaking political events, in accordance with an embodiment.

Figure 43:
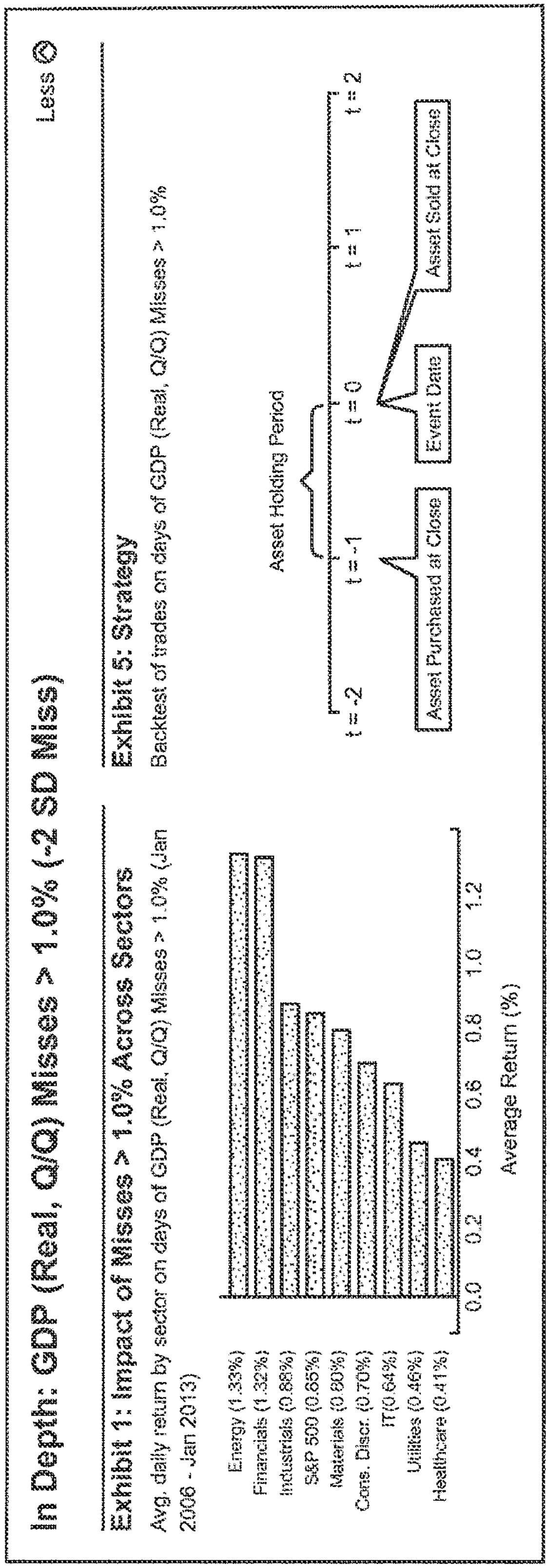
FIG. 43 depicts a notification modeling a market impact of a potential event, in accordance with an embodiment.

FIG. 43 depicts a notification modeling a market impact of a potential event, in accordance with an embodiment.

FIG. 44 depicts a notification modeling a market impact of a potential event, in accordance with an embodiment.

Figure 45:
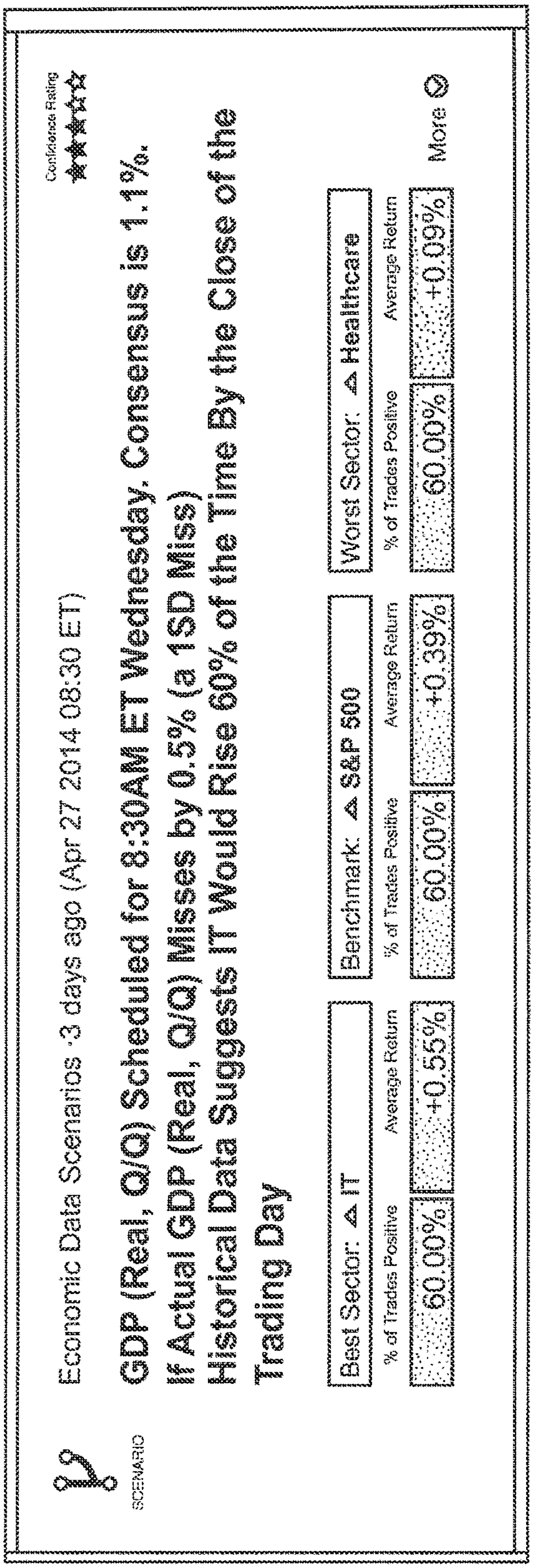
FIG. 45 depicts a notification modeling a market impact of a potential event, in accordance with an embodiment.

FIG. 45 depicts a notification modeling a market impact of a potential event, in accordance with an embodiment.

Figure 46:
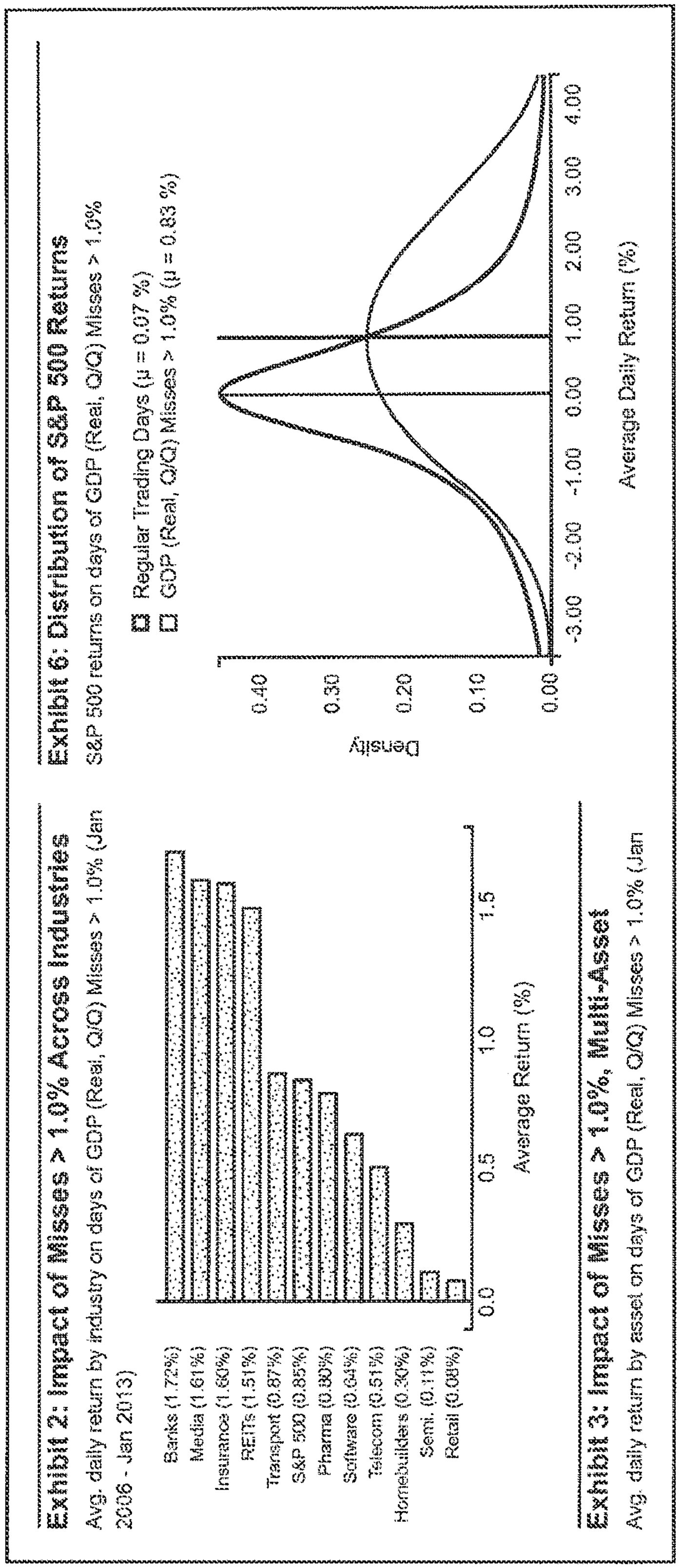
FIG. 46 depicts a notification modeling a market impact of a potential event, in accordance with an embodiment.

FIG. 46 depicts a notification modeling a market impact of a potential event, in accordance with an embodiment.

Figure 47:
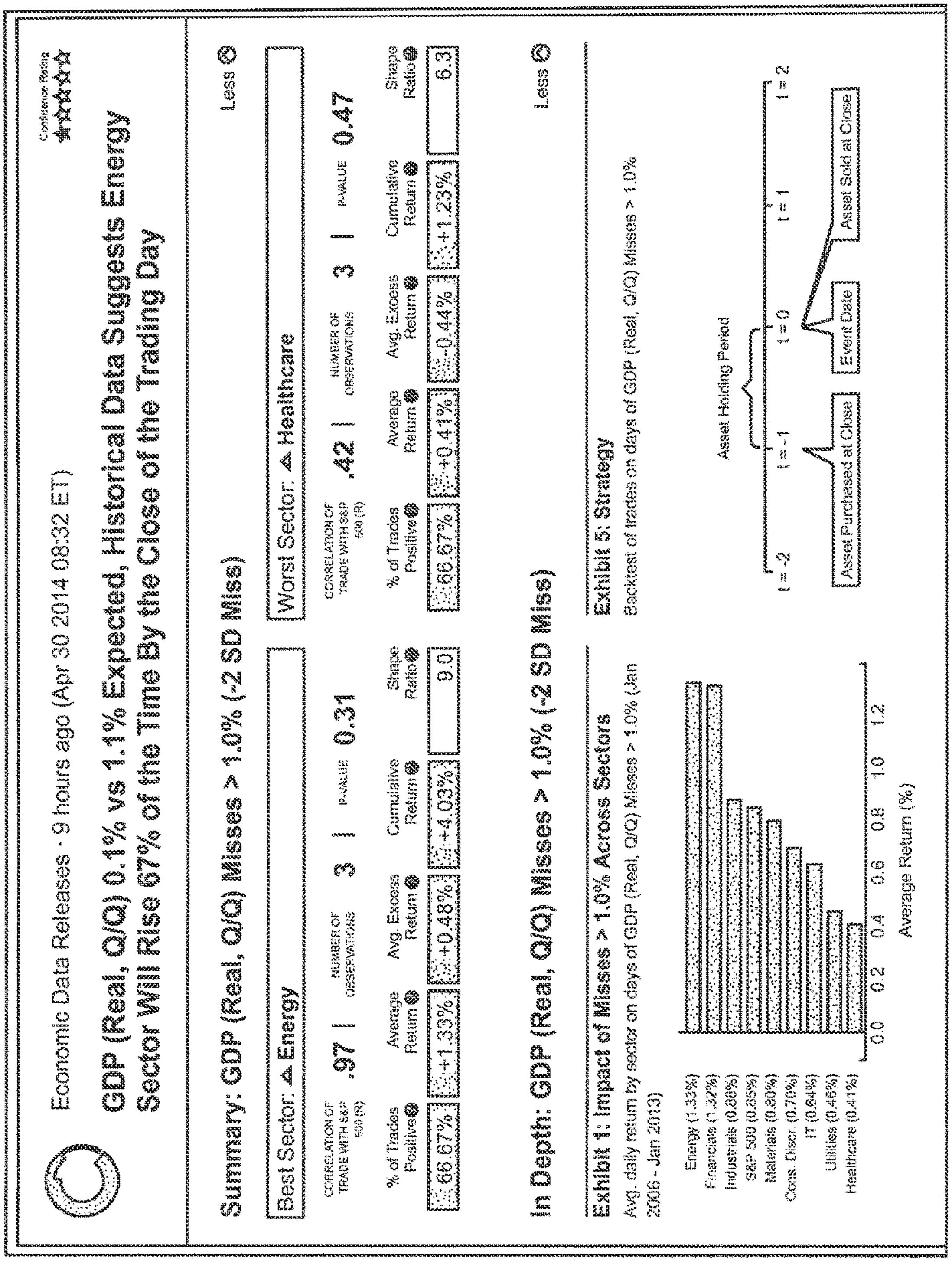
FIG. 47 depicts a notification modeling a market impact of a potential event, in accordance with an embodiment.

FIG. 47 depicts a notification modeling a market impact of a potential event, in accordance with an embodiment.

FIG. 48 depicts a notification modeling a market impact of a potential event, in accordance with an embodiment.

A user interface for modeling consensus and surprise analysis, in accordance with an embodiment provides a UI whereby a user can model how a basket of assets reacted to an arbitrary surprise or disappointment (meaning the difference between average consensus and actual number) for any major economic data release (such as Unemployment, CPI, PPI etc.). The user can choose the economic metric, and select any range of surprise or disappointment, expressed in the units of the metric, or in units of the standard deviations of prior surprises (e.g. a I.SD difference). The user can also choose the buy and sell days relative to the economic data release, and the assets modeled.

A system according to one embodiment can provide a user interface for economic regime analysis. A user can select a combination of macroeconomic factors (in this embodiment, US GDP growth, CPI, US Unemployment rates, US Federal Funds rate, and Volatility), and model how asset prices moved during periods when economic conditions reflected that precise combination of factors. The user is shown the range of those metrics (record high to record low) and can select, by means of sliders or other visual cues, the exact values within which the assets should be modeled. The system provides instant feedback to the user about the number of days since 1990 existed on which that combination of factors was true—this alone is a unique capability of the system and represents an enormous labor saving over current practice. The user can model any combination of assets during the periods when the selected factors had the values chosen. A user interface for modeling consensus and surprise analysis, in accordance with an embodiment provides a UI whereby a user can model how a basket of assets reacted to an arbitrary surprise or disappointment (meaning the difference between average consensus and actual number) for any major economic data release (such as Unemployment, CPI, PPI etc.). The user can choose the economic metric, and select any range of surprise or disappointment, expressed in the units of the metric, or in units of the standard deviations of prior surprises (e.g. a I.SD difference) . The user can also choose the buy and sell days relative to the economic data release, and the assets modeled.

A user can study what happens when economic data releases or earnings releases exceed or miss expectations, by entering different thresholds for either the absolute or relative value of the delta from consensus, (including specifying certain standard deviations from normal), by constraining the dates of the observations) and you can model the impact on different assets by entering them.

A user can select a combination of macroeconomic factors (in one embodiment, US GDP growth, CPI, US Unemployment rates, US Federal Funds rate, and Volatility), and model how asset prices moved during periods when economic conditions reflected that precise combination of factors. The user is shown the range of those metrics (record high to record low) and can select, by means of sliders or other visual cues, the exact values within which the assets should be modeled.

The system provides instant feedback to the user about the number of days since 1990 existed on which that combination of factors was true—this alone is a unique capability of the system and represents an enormous labor saving over current practice. The user can model any combination of assets during the periods when the selected factors had the values chosen.

Other embodiments are within the scope and spirit of the invention. For example, the functionality described above can be implemented using software, hardware, firmware, hardwiring, or combinations of any of these. One or more computer processors operating in accordance with instructions may implement the functions associated with generating and/or delivering electronic education in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A data processing system for near real-time processing of data records, the system comprising:

a database stored in a server computer, the database storing one or more first pre-generated data structures, wherein each of the one or more first pre-generated data structures includes data representing a pre-computed precedent wherein the pre-computed precedent includes data that identifies (i) an event type, and (ii) a historical probabilistic impact of the event type on a first asset;

a volatile memory that receives a stream of data records;

a parser that accesses at least a portion of the stream of data records in the volatile memory and parses at least a portion of the accessed data records to detect one or more data items in the stream, wherein the one or more data items include information (i) that is obtained from the data records and (ii) that identifies an event;

a platform configured to dynamically reshard data based on demand, the platform comprising: a mixer node configured to receive scoring requests and produce a time series, a plurality of compute nodes, each compute node configured to score a time series to produce a scored time series result, and a map reduce node configured to receive scored time series results and summarize the results; and a data analysis module comprising a baseline probability generation module, a data correlation module, a historical data matching module and a visualization module, the baseline probability generation module configured to: generate a baseline performance probability for the performance of the first asset, the data correlation module configured to identify second asset historical data for a second asset based on a minimum level of correlation between an attribute of the first asset and of the second asset, the historical data matching module, configured to match first asset attributes and second asset attributes to identify pre-computed precedents, the data analysis module configured to:

determine, by accessing the database stored on the server, that the one or more data items identifying the event corresponds to an event type of at least one of the precomputed precedents stored in the database;

determine, by processing at least some additional data stored in association with the precomputed precedent, a predicted impact of the identified event on the asset, wherein the predicted impact of the identified real-time event on the asset is determined by performing a calculation by accessing and processing the additional data stored by the server that identifies the historical probabilistic impact of the event on the asset from the pre-computed precedent, the baseline performance probability of the asset and at least a portion of the data from the stream of data records that is associated with the identified event;

the visualization module configured to:

generate first visualization data that, when rendered on a client device, displays a first visualization of the predicted impact of the event on the asset;

provide the first visualization data to the client device using one or more networks;

receive, using one or more networks, a zoom indication from the client device indicating a user's focus on an area of the first visualization;

responsive to receipt of the zoom indication, generate second visualization data that, when rendered on a client device, displays a second visualization of the predicted impact corresponding to a segment of the first visualization and including data for a component of the predicted impact that was not visible in the first visualization; and provide the generated second visualization data to the client device using one or more networks.

2. The data processing system of claim 1, wherein the impact module is further configured to determine that the one or more data items identifying the event corresponds to the event type in the pre-computed precedent based on comparing (i) an attribute associated with the one or more data items from the feed of data that identify the event and (ii) an attribute of the pre-computed precedent.

3. The data processing system of claim 1, wherein the probabilistic impact of the event is a pre-computed standard deviation.

4. The data processing system of claim 1, wherein the first visualization data comprises a confidence indicator.

5. The data processing system of claim 1, wherein the data correlation module is configured to determine a degree of correlation of historical attribute data of the second asset and current attribute data of the first asset and a degree of correlation of historical attribute data of a third asset and current attribute data of the first asset and weighting the historical attribute data of the second asset and of the third asset based on respective degrees of correlation.

6. The data processing system of claim 1, wherein accessing and processing the additional data stored by the server comprises correlating event data with decades of times series financial data.

7. A method for near real-time processing of data records, the method comprising:

storing a database of one or more first pre-generated data structures in a server computer, wherein each of the one or more first pre-generated data structures includes data representing a pre-computed precedent, wherein the pre-computed precedent includes data that identifies (i) an event type, and (ii) a historical probabilistic impact of the event type on a first asset;

receiving a stream of data records in a volatile memory;

parsing at least portions of contents of the data records of the stream that are stored in the volatile memory to detect one or more data items in the stream, wherein the one or more data items include information that identifies an event;

using a platform, dynamically resharding data based on demand, the platform comprising: a mixer node configured to receive scoring requests and produce a time series, a plurality of compute nodes, each compute node configured to score a time series to produce a scored time series result, and a map reduce node configured to receive scored time series results and summarize the results;

generating, using a baseline performance probability module, a baseline performance probability for the first asset;

determining, using a data correlation module, other asset historical data based on a minimum level of correlation of an attribute of the first asset and of other assets;

matching, using a historical data matching module and the other asset historical data, first asset attributes and second asset historical data attributes to identify a pre-computed precedent;

determining, by accessing the database stored on the server computer, that the one or more data items identifying the event corresponds to an event type of at least one of the precomputed precedents stored in the database;

determining, by processing at least some additional data stored in association with the pre-computed precedent, a predicted impact of the identified event on the first asset, wherein the predicted impact of the event on the instrument first asset is determined by performing a calculation by accessing and processing the additional data stored by the server that identifies the historical probabilistic impact of the event on the instrument first asset from the pre-computed precedent, the baseline performance probability and at least a portion of the data from the stream of data records that is associated with the identified event;

generating, using a visualization module, first visualization data that, when rendered on a client device, displays a first visualization of the predicted impact of the event on the first asset;

providing the generated first visualization data to the client device using one or more networks;

receiving, from across one or more networks and using the visualization module, a zoom indication from the client device indicating a user's focus on an area of the first visualization;

responsive to receipt of the zoom indication, generating, using the visualization module, second visualization data that, when rendered on a client device, displays a second visualization of the predicted impact corresponding to a segment of the first visualization and including data for at least one component of the predicted impact that was not visible in the first visualization; and providing the generated second visualization data to the client device using one or more networks.

8. The method of claim 7, wherein determining the predicted impact of the identified event on the first asset further comprises identifying a pre-computed precedent represented by the one or more pre-generated data structures stored in the database based on comparing (i) an attribute associated with the one or more data items from the feed of data that identifies the event and (ii) an attribute of the pre-computed precedent.

9. The method of claim 7, wherein the probabilistic impact of the event is a pre-computed standard deviation.

10. The method of claim 7, wherein the first visualization data comprises a confidence indicator.

11. The method of claim 7, wherein accessing and processing the additional data stored by the server comprises correlating event data with decades of times series financial data.

12. A computer-readable medium encoded with instructions that, when executed by or more computers, cause the one or more computers to perform the operations comprising:

storing a database of one or more first pre-generated data structures in a server computer, wherein each of the one or more first pre-generated data structures includes data representing a pre-computed precedent, wherein the pre-computed precedent includes data that identifies (i) an event type, and (ii) a historical probabilistic impact of the event type on a first asset;

receiving a stream of data records in a volatile memory;

parsing at least portions of contents of the data records of the stream that are stored in the volatile memory to detect one or more data items in the stream, wherein the one or more data items include information that identifies an event;

using a platform, dynamically resharding data based on demand, the platform comprising: a mixer node configured to receive scoring requests and produce a time series, a plurality of compute nodes, each compute node configured to score a time series to produce a scored time series result, and a map reduce node configured to receive scored time series results and summarize the results;

generating, using a baseline performance probability module, a baseline performance probability for the first asset;

determining, using a data correlation module, other asset historical data based on a minimum level of correlation of an attribute of the first asset and of other assets;

matching, using a historical data matching module and the other asset historical data, first asset attributes and second asset historical data attributes to identify a pre-computed precedent;

determining, by accessing the database stored on the server computer, that the one or more data items identifying the event corresponds to an event type of at least one of the precomputed precedents stored in the database;

determining, by processing at least some additional data stored in association with the pre-computed precedent, a predicted impact of the identified event on the first asset, wherein the predicted impact of the event on the instrument first asset is determined by performing a calculation by accessing and processing the additional data stored by the server that identifies the historical probabilistic impact of the event on the instrument first asset from the pre-computed precedent, the baseline performance probability and at least a portion of the data from the stream of data records that is associated with the identified event;

generating, using a visualization module, first visualization data that, when rendered on a client device, displays a first visualization of the predicted impact of the event on the first asset;

providing the generated first visualization data to the client device using one or more networks;

receiving, from across one or more networks and using the visualization module, a zoom indication from the client device indicating a user's focus on an area of the first visualization;

responsive to receipt of the zoom indication, generating, using the visualization module, second visualization data that, when rendered on a client device, displays a second visualization of the predicted impact corresponding to a segment of the first visualization and including data for at least one component of the predicted impact that was not visible in the first visualization; and providing the generated second visualization data to the client device using one or more networks.

* * * * *